Nov. 7, 1967  D. D. HAMILTON  3,351,107
TREE PROCESSING MACHINE
Filed Sept. 8, 1965  57 Sheets-Sheet 3

Douglas D Hamilton
INVENTOR

By Martin J Morris
ATTORNEY

Nov. 7, 1967  D. D. HAMILTON  3,351,107
TREE PROCESSING MACHINE
Filed Sept. 8, 1965  57 Sheets-Sheet 5

Douglas D Hamilton
INVENTOR
By Martin J Marren
ATTORNEY

Nov. 7, 1967　　　D. D. HAMILTON　　　3,351,107
TREE PROCESSING MACHINE
Filed Sept. 8, 1965　　　　　　　　　　　57 Sheets-Sheet 6

DOUGLAS D. HAMILTON
INVENTOR
By
ATTORNEY

Nov. 7, 1967

D. D. HAMILTON 3,351,107

TREE PROCESSING MACHINE

Filed Sept. 8, 1965

DOUGLAS D HAMILTON
INVENTOR

By *[signature]*
ATTORNEY

Nov. 7, 1967  D. D. HAMILTON  3,351,107
TREE PROCESSING MACHINE
Filed Sept. 8, 1965  57 Sheets-Sheet 9

DOUGLAS D HAMILTON
INVENTOR

By Martin O Marcus
ATTORNEY

Nov. 7, 1967  D. D. HAMILTON  3,351,107
TREE PROCESSING MACHINE
Filed Sept. 8, 1965  57 Sheets-Sheet 10

DOUGLAS D HAMILTON
INVENTOR

By Martin J Marcus
ATTORNEY

Nov. 7, 1967  D. D. HAMILTON  3,351,107
TREE PROCESSING MACHINE
Filed Sept. 8, 1965  57 Sheets-Sheet 14

DOUGLAS D. HAMILTON
INVENTOR
BY
Martin J Marcus
ATTORNEY

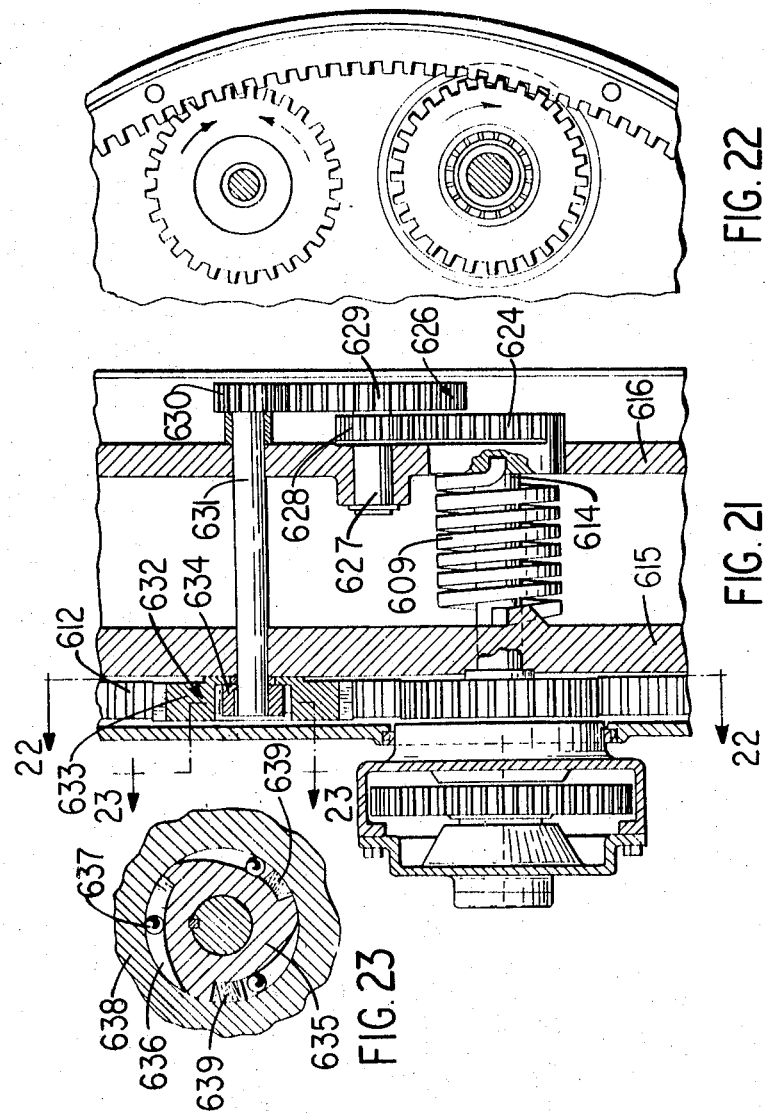

Nov. 7, 1967    D. D. HAMILTON    3,351,107
TREE PROCESSING MACHINE
Filed Sept. 8, 1965    57 Sheets-Sheet 18

Douglas D. Hamilton
INVENTOR
By Martin J Marcus
ATTORNEY

Nov. 7, 1967  D. D. HAMILTON  3,351,107
TREE PROCESSING MACHINE
Filed Sept. 8, 1965  57 Sheets-Sheet 20

DOUGLAS D HAMILTON
INVENTOR

By Martin Omarcus
ATTORNEY

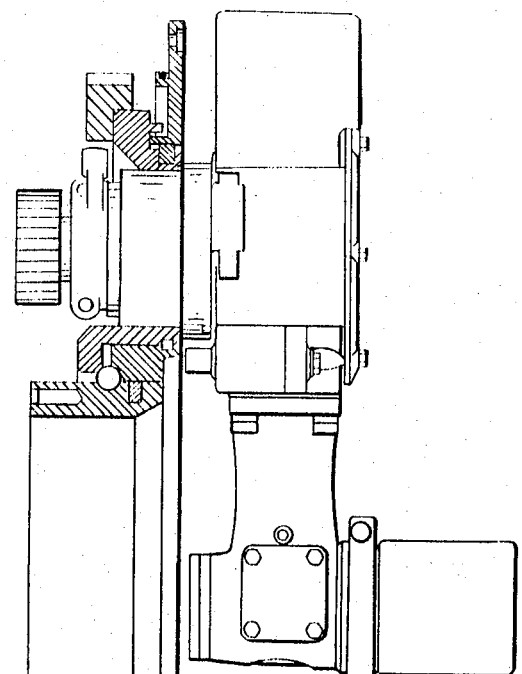
FIG. 29
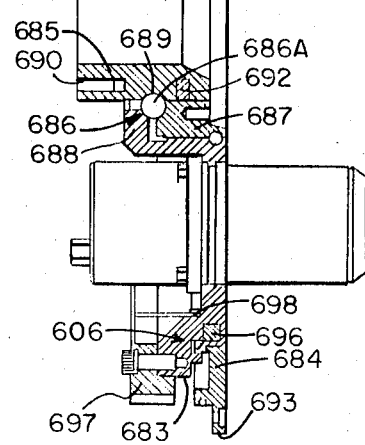

Nov. 7, 1967   D. D. HAMILTON   3,351,107
TREE PROCESSING MACHINE

Filed Sept. 8, 1965   57 Sheets-Sheet 25

DOUGLAS D. HAMILTON
INVENTOR

By Martin Marcus
ATTORNEY

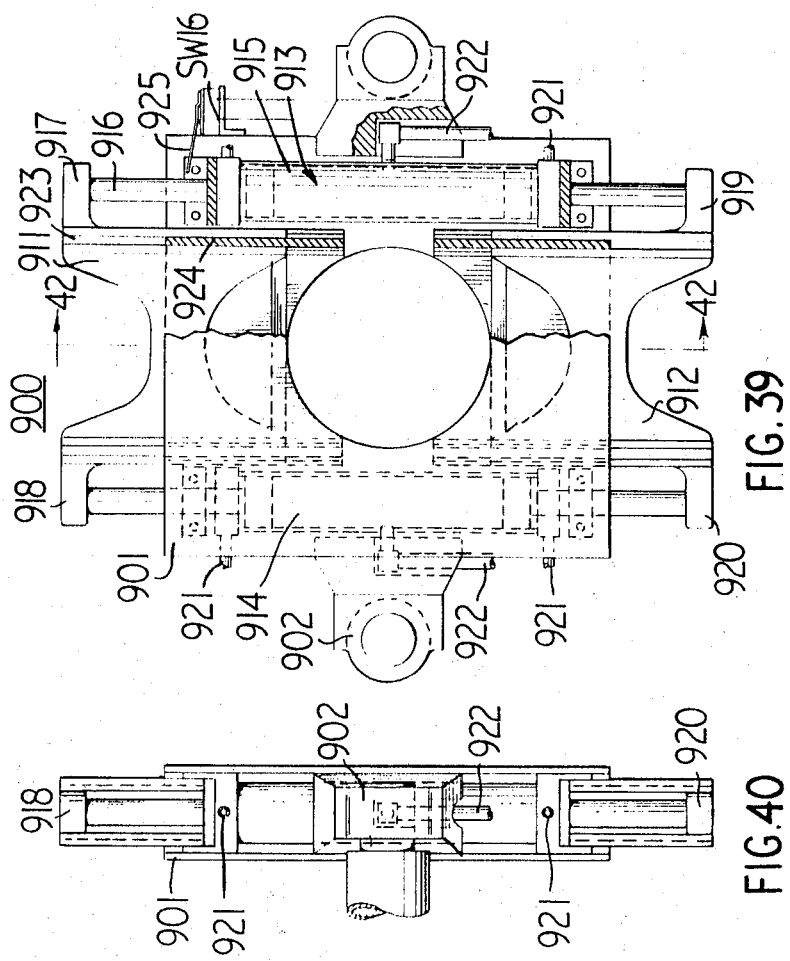

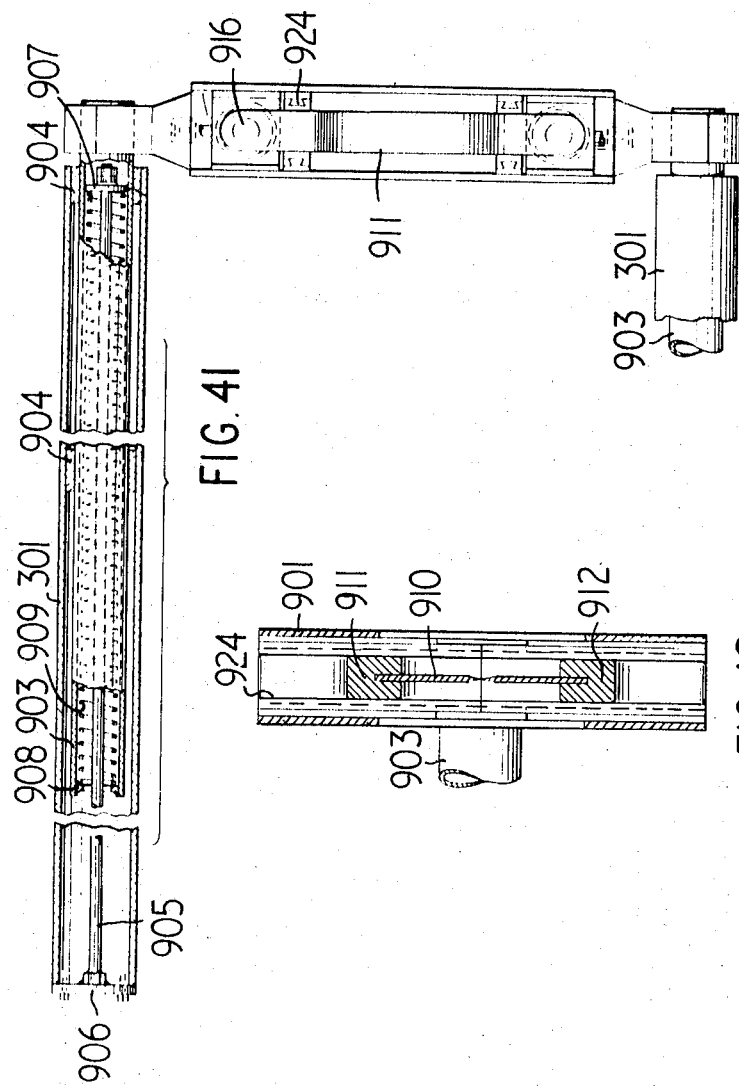

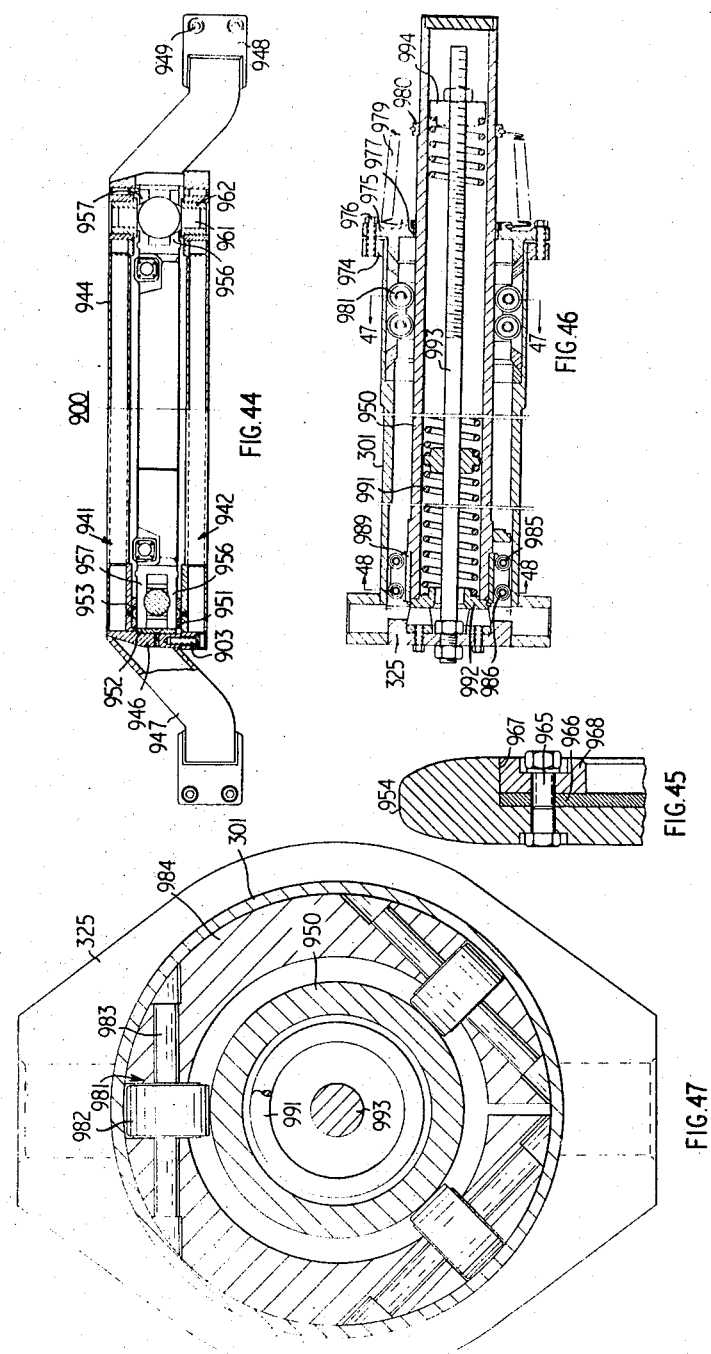

Nov. 7, 1967   D. D. HAMILTON   3,351,107
TREE PROCESSING MACHINE
Filed Sept. 8, 1965   57 Sheets-Sheet 32

DOUGLAS D. HAMILTON
INVENTOR

By *Martin J Mason*
ATTORNEY

Nov. 7, 1967  D. D. HAMILTON  3,351,107
TREE PROCESSING MACHINE

Filed Sept. 8, 1965  57 Sheets-Sheet 33

Douglas D. Hamilton
INVENTOR
BY
Martin J Marcus
ATTORNEY

Nov. 7, 1967  D. D. HAMILTON  3,351,107
TREE PROCESSING MACHINE
Filed Sept. 8, 1965  57 Sheets-Sheet 34

DOUGLAS D HAMILTON
INVENTOR
By Martin O'Meara
ATTORNEY

Nov. 7, 1967    D. D. HAMILTON    3,351,107
TREE PROCESSING MACHINE
Filed Sept. 8, 1965    57 Sheets-Sheet 36

DOUGLAS D HAMILTON
INVENTOR
By Martin J Marcus
ATTORNEY

Nov. 7, 1967     D. D. HAMILTON     3,351,107

TREE PROCESSING MACHINE

Filed Sept. 8, 1965     57 Sheets-Sheet 37

DOUGLAS D HAMILTON
INVENTOR

By [signature]
ATTORNEY

Nov. 7, 1967  D. D. HAMILTON  3,351,107
TREE PROCESSING MACHINE

Filed Sept. 8, 1965  57 Sheets-Sheet 38

Nov. 7, 1967  D. D. HAMILTON  3,351,107
TREE PROCESSING MACHINE
Filed Sept. 8, 1965  57 Sheets-Sheet 39

Douglas D Hamilton
INVENTOR

By Martin Marcus
ATTORNEY

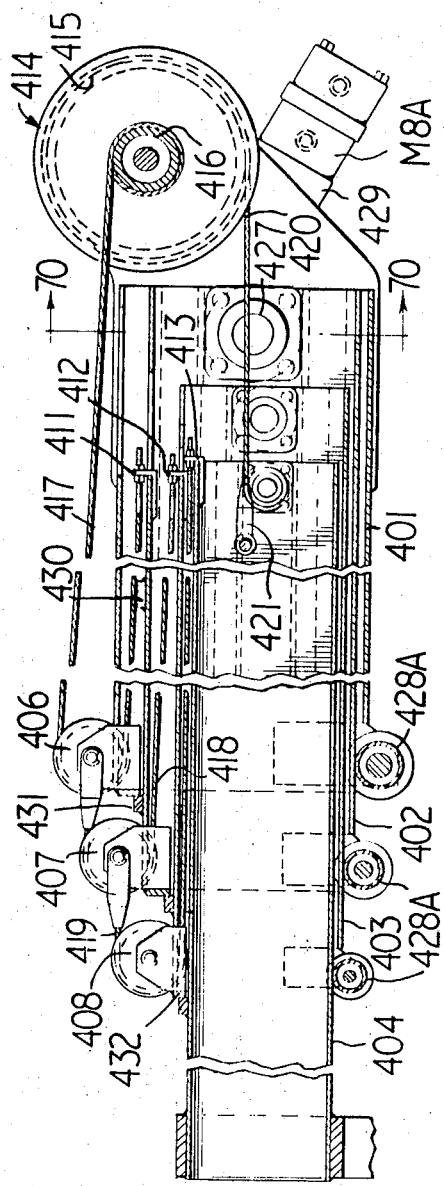

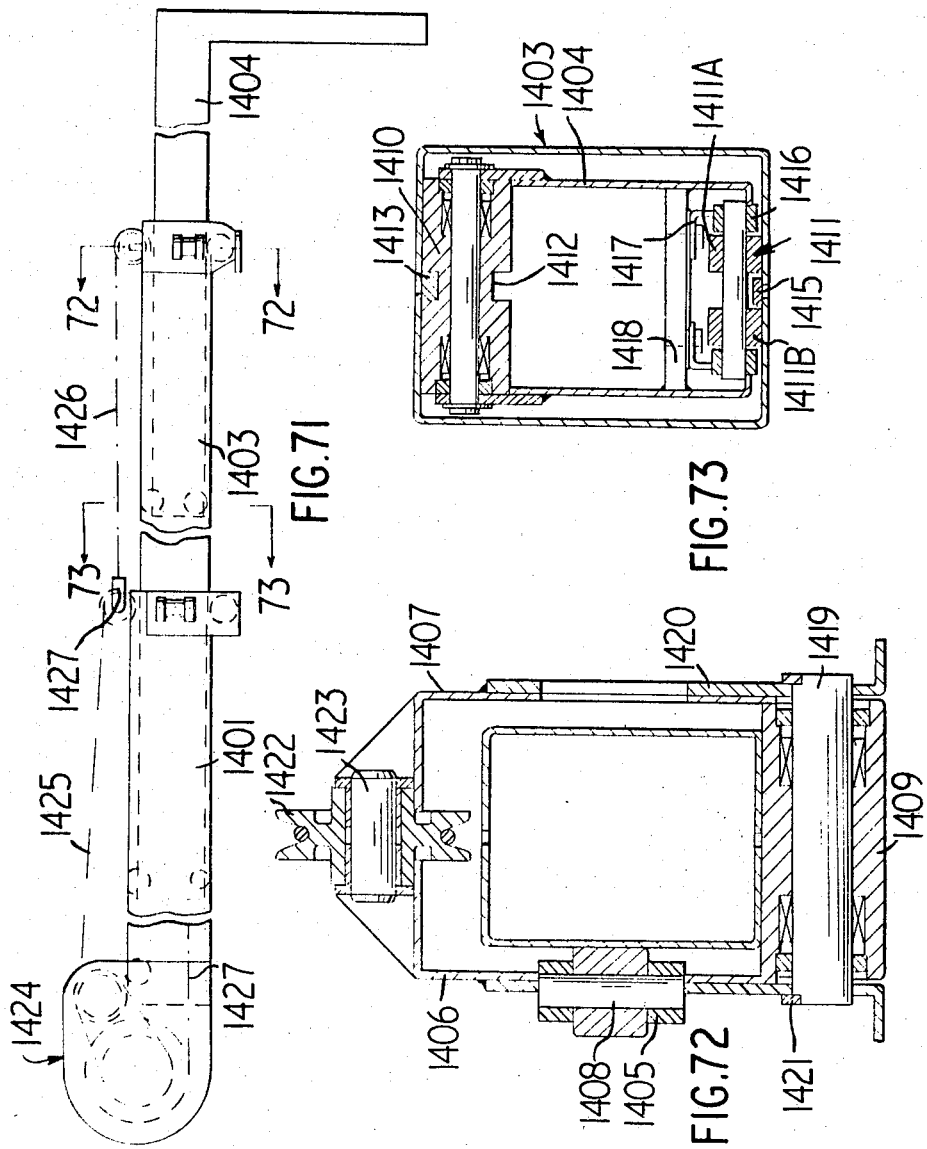

Nov. 7, 1967 D. D. HAMILTON 3,351,107
TREE PROCESSING MACHINE
Filed Sept. 8, 1965 57 Sheets-Sheet 43

DOUGLAS D HAMILTON
INVENTOR

By Martin J Marius
ATTORNEY

Nov. 7, 1967   D. D. HAMILTON   3,351,107
TREE PROCESSING MACHINE
Filed Sept. 8, 1965   57 Sheets-Sheet 44

DOUGLAS D. HAMILTON
INVENTOR
BY
Martin J Marcus
ATTORNEY

Nov. 7, 1967   D. D. HAMILTON   3,351,107
TREE PROCESSING MACHINE
Filed Sept. 8, 1965   57 Sheets-Sheet 45
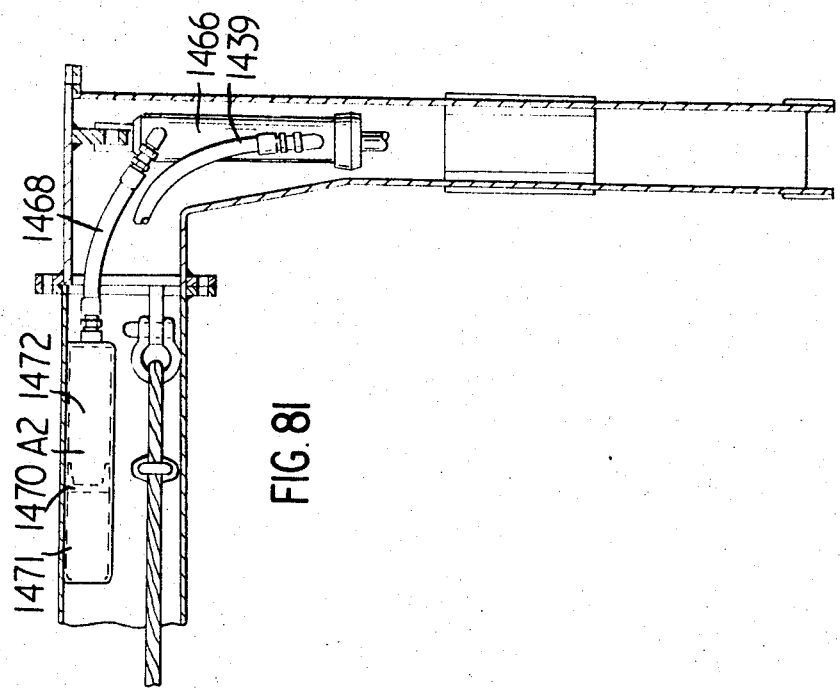
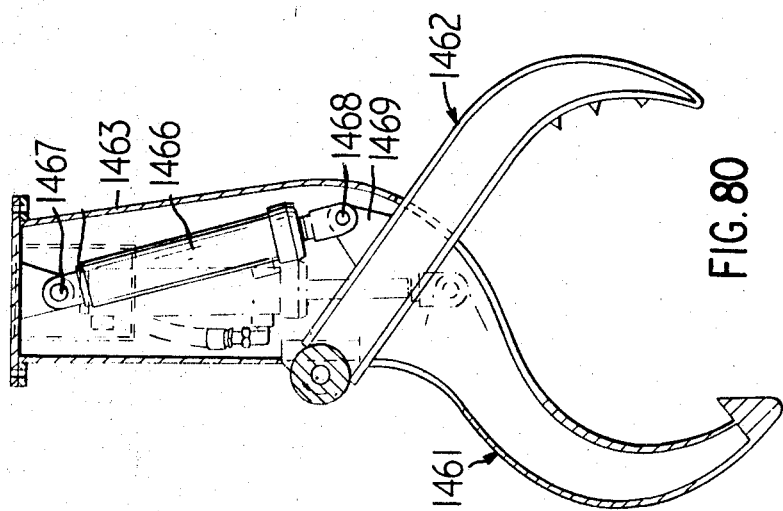

Nov. 7, 1967     D. D. HAMILTON     3,351,107

TREE PROCESSING MACHINE

Filed Sept. 8, 1965     57 Sheets-Sheet 50

DOUGLAS D HAMILTON
INVENTOR
BY
Martin J Marcus
ATTORNEY

Nov. 7, 1967   D. D. HAMILTON   3,351,107
TREE PROCESSING MACHINE
Filed Sept. 8, 1965   57 Sheets-Sheet 51

DOUGLAS D. HAMILTON
INVENTOR

BY *Martin J Marcus*
ATTORNEY

Douglas D. Hamilton
INVENTOR

Nov. 7, 1967  D. D. HAMILTON  3,351,107
TREE PROCESSING MACHINE
Filed Sept. 8, 1965  57 Sheets-Sheet 54

DOUGLAS D. HAMILTON
INVENTOR
BY
Martin J Marun
ATTORNEY

United States Patent Office 3,351,107
Patented Nov. 7, 1967

3,351,107
TREE PROCESSING MACHINE
Douglas D. Hamilton, Mount Royal, Quebec, Canada, assignor of one-third to Canadian International Paper Company, Montreal, Quebec, Canada, one-third to Quebec North Shore Paper Company, Montreal, Quebec, Canada, and one-third to Abitibi St. Anne Paper Limited, Beaupre, Quebec, Canada, all corporations of Canada
Filed Sept. 8, 1965, Ser. No. 485,807
Claims priority, application Great Britain, Sept. 17, 1964, 38,069/64
229 Claims. (Cl. 144—3)

This application is a continuation-in-part of application Ser. No. 40,294, filed July 1, 1960 and now abandoned.

This invention relates to the art of processing raw timber.

More particularly, the present invention relates to the following raw timber processing techniques:

(1) The handling of felled trees and the subsequent delimbing of the handled trees;

(2) The handling of felled trees and the subsequent debarking of the felled tree;

(3) The handling of felled trees and the sequential steps of subsequent delimbing of the felled tree and the subsequent debarking of the delimbed tree;

(4) The handling of a felled tree, and the sequential steps of subsequent delimbing of the felled tree and the subsequent receiving and stacking of the delimbed tree;

(5) The handling of a felled tree and the sequential steps of the subsequent debarking of the felled tree and the subsequent receiving and stacking of the debarked tree;

(6) The handling of felled trees and the sequential steps of the subsequent delimbing of the felled tree, the subsequent debarking of the delimbed tree and the subsequent receiving and stacking of the delimbed and debarked tree;

(7) The handling of felled trees and the subsequent shearing of the processed tree into bolts of predetermined length;

(8) The handling of felled trees, the subsequent delimbing of the handled trees, and the subsequent shearing of the processed tree into bolts of predetermined length;

(9) The handling of felled trees, the subsequent debarking of the felled tree, and the subsequent shearing of the processed tree into bolts of predetermined length;

(10) The handling of felled trees and the sequential steps of subsequent delimbing of the felled tree, the subsequent debarking of the delimbed tree and the subsequent shearing of the processed tree into bolts of predetermined length;

(11) The handling of a felled tree, and the sequential steps of subsequent delimbing of the felled tree, the subsequent shearing of the processed tree into bolts of predetermined length, and the subsequent receiving and stacking of the delimbed tree;

(12) The handling of a felled tree and the sequential steps of the subsequent debarking of the felled tree, the subsequent shearing of the processed tree into bolts of predetermined length, and the subsequent receiving and stacking of the debarked tree;

(13) The handling of felled trees and the sequential steps of the subsequent delimbing of the felled tree, the subsequent debarking of the delimbed tree, the subsequent shearing of the processed tree into bolts of predetermined length, and the subsequent receiving and stacking of the delimbed, debarked tree.

In a timber operation of the type to which this invention particularly relates, trees are felled in the forest, the limbs removed and the trunk or bole is cut into predetermined lengths, called bolts, which are then transported to a mill. To a large extent, the removal of the limbs has been performed by hand after the tree has been felled. At the mill, the bark has been removed, if necessary, and the processed logs are then ready for their intended later use.

In many operations, or later use of the bolts, it is not necessary to remove the bark from the felled tree. Such operations include the use of wood as saw logs. In other operations, for example, where the bolts are used for pulp wood, the bark cannot be used and, accordingly, must be removed. As mentioned previously, this normally has been done as a separate operation and usually at the mill.

The procedure in the past has necessitated several independent steps usually carried out manually or by manually operated individual machines. For example, in processing wood for pulp, after the tree had been felled, the felled tree was passed through the processing steps first to remove the limbs, second, to cut the delimbed tree into sections, and third, to remove the bark from the delimbed tree and cut tree sections. Equipment, however, has not been known whereby these operations can be carried out simultaneously on the same log in a sequence of operations.

In the past the felled trees have usually been delimbed by a manual operation, there not being any machines capable of handling the log and feeding it through a mechanical delimber. The equipment which was known or could be used consisted of a series of independent pieces of equipment, not necessarily designed to operate together.

Processing trees in the manner outlined above which has consisted of a series of independent operations has been time consuming and costly. By independent operations is meant that only one operation is being performed on one single tree trunk at one time.

An object of a broad aspect of this invention is the provision of a machine which can carry out a single processing operation or predetermined sequence of a number of individual processing operations simultaneously on a single tree bole, while the tree moves continuously through the machine thereby to simplify and expedite the processing of felled trees and to minimize handling of the tree. A plurality of single tree boles are fed successively into the machine such that the processing operations are carried out while the tree boles successively pass therethrough.

An object of a further aspect of this inevntion is to provide a machine which can be operated to engage a selected pre-felled tree from a plurality of pre-felled trees, to feed that selected tree into the machine and while being fed therethrough, remove the limbs from the tree bole.

It is an object of a further aspect of the present invention to provide a processing machine which can be operated to engage a selected tree from a plurality of pre-felled trees, to feed that tree into the machine and while the tree is being fed into the machine to remove the bark from the tree bole.

An object of a still further aspect of this invention is to provide a processing machine which can be operated to engage a selected pre-felled tree from a plurality of pre-felled trees, to feed that tree into the machine, and while the tree is being fed into the machine, to remove the limbs from the bole, and then to remove the bark from the so delimbed bole, usually while another portion of the tree bole is still being delimbed, the two processing operations thus being conducted simultaneously on the tree bole but at different locations along the length of the tree bole.

An object of a further aspect of the present invention is to provide a machine which can be operated to engage a selected felled tree from a plurality of pre-felled trees, to feed that tree into the machine and while being fed therethrough, to remove the limbs from the tree bole and to stack a plurality of tree boles processed in sequence.

It is an object of a still further aspect of the present invention to provide a processing machine which can be operated to pick up a selected tree from a plurality of pre-felled trees, to feed the selected tree into the machine and while the tree is being fed into the machine, to remove the bark from the tree bole and then to stack a plurality of tree boles processed in sequence in a neat pile.

An object of a still further aspect of this invention is to provide a processing machine which can be operated to engage a selected pre-felled tree from a plurality of pre-felled trees, to feed that selected tree into the machine, and while the tree is being fed into the machine, to remove the limbs from the bole, and then remove the bark from the so delimbed bole, while another portion of the tree bole is still being delimbed, the two processing operations being conducted simultaneously on the tree bole but at different locations along the length of the tree bole and then to stack a plurality of tree boles processed in sequence in a neat pile.

An object of a further aspect of this invention is to provide a machine which can be operated to engage a selected pre-felled tree from a plurality of pre-felled trees, to feed the tree directly into the machine and while being fed therethrough, to cut the tree, as it is moving, into bolts of predetermined length.

It is an object of a further aspect of the present invention to provide a processing machine which can be operated to engage a selected tree from a plurality of pre-felled trees, to feed that tree directly into the machine and while the tree is being feed into the machine, to remove the limbs from the tree bole, and then to cut the tree, as it is moving, into bolts of predetermined length.

It is an object of a further aspect of this invention to provide a machine which can be operated to engage a selected tree from a plurality of pre-felled trees, to feed that tree directly into the machine, and while being fed therethrough to remove the bark from the tree bole, and then to cut the tree, as it is moving, into bolts of predetermined length.

An object of a still further aspect of this invention is to provide a processing machine which can be operated to engage a selected pre-felled tree from a plurality of pre-felled trees, to feed that tree into the machine, and while the tree is being fed into the machine, to remove the limbs from the bole, then to remove the bark from the so delimbed bole, usually while another portion of the tree bole is still being delimbed, and then to cut the tree, as it is moving, into bolts of predetermined length, the three processing operations thus being conducted simultaneously on the tree bole but at different locations along the tree bole.

An object of a further aspect of the present invention is to provide a processing machine which can be operated to pick up a selected felled tree from a plurality of pre-felled trees, to feed that tree into the machine and while being fed therethrough, to remove the limbs from the tree bole then to cut the tree, as it is moving, into bolts of predetermined length, and then to stack the processed trees in a neat pile or selected arrangement of stacked tree boles.

It is an object of a still further aspect of the present invention to provide a processing machine which can be operated to engage a selected tree from a plurality of pre-felled trees, to feed the felled tree into the machine and while the tree is being fed into the machine, to remove the bark from the tree bole, then to cut the tree, as it is moving, into bolts of predetermined length, and then to stack the processed trees in a neat pile or selected arrangement of stacked tree boles.

An object of a still further aspect of this invention is to provide a processing machine which can be operated to engage a selected pre-felled tree from a plurality of pre-felled trees, to feed that tree into the machine, and while the tree is being fed into the machine, to remove the limbs from the bole, then remove the bark from the so delimbed bole, while another portion of the tree bole is still being delimbed, then to cut the tree, as it is moving, into bolts of predetermined length, the three processing operations being conducted simultaneously on the tree bore but at different locations along the tree bole, and then to stack the processed trees in a neat pile or selected arrangement of stacked tree boles.

It is an object of a still further aspect of the present invention to provide a machine of the foregoing type which is mobile whereby it may be readily moved from one location to another. Preferably the mobility is provided by a self-propelled unit; however, this need not necessarily be so as it may be readily towed or otherwise moved by other motive means.

In accordance with one aspect of the present invention, there is provided a machine for processing felled trees wherein such machine includes tree handling means in order that a selected pre-felled tree may be picked up from an array of pre-felled trees and be fed along a selected path, said tree handling means preferably consisting of a tree engaging member adapted to grasp the tree and move the grasped tree along a path in alignment with the axis of a series of processing units in tandem alignment mounted on the machine and operative to delimb or to debark or to carry out both processes in sequence on the tree being fed therethrough by the log handling means.

By a further aspect of the present invention, there is provided a machine for processing felled trees which consists of tree handling means in order that a selected pre-felled tree may be picked up from an array of pre-felled trees and be fed along a selected path, such tree handling means preferably consisting of a telescopically extendable and retractable boom with article engaging means mounted thereon adjacent the forward end of said boom, said machine including a processing unit or a series of processing units located in the feed path and operative to delimb or to debark or to carry out both processes in sequence on the tree being fed therethrough by the log handling means. The log handling means is adapted to elevate at least one end of the selected tree and fed such elevated end directly into the processing unit and in this way the tree is introduced into a predetermined feed path. The processing units are mounted whereby they may pivot about a substantially horizontal axis such that the processing units maintain alignment with a changing feed path caused by the trailing end of the tree initially being supported on the ground but having its inclination to the horizontal axis continuously changing while passing through the processing units.

In accordance with a still further aspect of the present invention, there is provided a machine for processing felled trees wherein such machine includes tree handling means in order that a selected pre-felled tree may be picked up from an array of pre-felled trees and be fed along a selected path, said tree handling means preferably consisting of a telescopically extendable and retractable boom with article engaging means mounted thereon, usually grapple tongs, adjacent the forward end of said boom, said machine including a processing unit or a series of units located in the feed path and operative to delimb or to debark or to carry out both processes in sequence on the tree being fed thereto by the log handling means. The log handling means is adapted to elevate at least one end of the selected tree and feed such elevated end directly into the processing unit. In this way the tree is introduced into a predetermined feed path. Means are also provided whereby the processed logs are selectively arranged and stacked at a receiving station.

In a further aspect of the present invention, there is provided a machine for processing felled trees which consists of tree handling means in order that a selected pre-felled tree may be picked up from an array of pre-felled trees and be fed along a selected path, said tree handling means including a telescopically extendable and retractable boom with article engaging means mounted thereon, usually grapple tongs, adjacent the forward end of said boom, said machine including a processing unit or a series of units located in the feed path and operative to delimb or to debark or to carry out both processes in sequence on the tree being fed thereto by the log handling means, said boom and article engaging means being adapted to elevate at least one end of the selected tree and feed such elevated end directly into the processing unit and thereby introducing the tree into a predetermined feed path, said processing units being pivotally mounted on said machine whereby they may pivot about a substantially horizontal axis such that the processing units maintain alignment with a changing feed path caused by the trailing end of the tree being initially supported on the ground but having its inclination to the horizontal axis continuously changing while passing through the processing units. Means also may be provided whereby the processed logs are selectively arranged and stacked at a receiving station.

In another preferred embodiment of this invention, the telescopic boom comprises a first member pivotally mounted on said support, a plurality of members telescoped within said first member, guide means on said first member and said plurality of members telescoped therein for supporting and guiding said plurality of members for movement into and out of said first member, and means interconnecting said first member and said plurality of members for extending said plurality of members outward from said first member to lengthen said boom for moving said members inward to shorten said boom.

In another preferred embodiment of this invention, there is provided means to operate the telescopic boom such means including a sheave system, a cable system interconnecting said movable sections to one another and to said fixed section and entraining said sheave system, means for rotating said sheave system in one direction for extending said movable sections outwardly from said fixed section and with respect to one another, and means for rotating said sheave system in an opposite direction for retracting said movable sections into one another and with respect to said fixed section.

In another preferred embodiment of this invention the sheave includes a pair of drums mounted on respective ones of a pair of spaced, substantially parallel shafts interconnected in driving relationship, a further sheave being secured to a selected one of the sheaves and rotatable therewith for receiving and winding a further flexible cable thereon.

In another preferred embodiment of this invention, the article engaging means is a grapple, which includes a pair of jaws each movable and means for opening and closing said jaws selectively for engaging said pre-felled tree from a plurality of pre-felled trees.

Preferably, the drive means for the grapple jaws includes a driven pinion gear, a plurality of planetary gears rotatably secured on one of said jaws and meshing with said pinion and a sun gear fixed to the other jaw and meshing with said planetary gears.

Alternatively, by this embodiment of the invention, the grapple may include a first tong portion rigidly secured to and projecting downwardly from said boom and having an inwardly directed hooked terminal end portion, the second jaw member pivotally mounted on said first jaw member intermediate the ends thereof and having a terminal end portion turned inwardly towards the terminal end of the fixed member and means biasing said movable member towards said fixed member whereby said jaw is normally closed and means for moving said movable jaw against the resilient bias for opening the jaw.

Preferably, the means to operate the movable jaws includes an hydraulic cylinder resiliently urged or biased to normally retain the jaw in a closed position by an hydraulic accumulator, said hydraulic cylinder being connected to an hydraulic system, the line for connecting the cylinder to the system being mounted on the boom and movable therewith, said line being wound upon the third sheave in a sheave system as hereinbefore defined.

By another embodiment of this invention the boom is mounted on said frame to pivot about a horizontal axis located vertically above said processing units, and may include an hydraulic cylinder interconnecting said frame and boom at a position remote from the pivot axis and thereby providing means to raise and lower the free end of said boom. Preferably, the horizontal pivot axis is intermediate the ends of said boom, the hydraulic cylinder being connected at one end to said frame and to the boom at the other end at a position intermediate the pivotal connection with the frame and the grapple end of the boom.

Alternatively, the pivotal connection between the boom and the frame is located intermediate the ends of the boom, said hydraulic cylinder being connected to the end of the boom remote from the grapple and to a further rigid part of said machine.

By one embodiment of the invention, the processing unit is a delimber of the type including a plurality of cutter heads engageable with said tree to delimb said tree and mounted on a member circumferentially about said tree, said member being rotatable about an axis substantially coincident with the longitudinal axis of said tree, but preferably wherein each of the cutter heads of said delimber is pivotally mounted on an arm and positively driven, each of said arms being mounted on said rotatable member to oscillate about an axis generally parallel to the rotation of said member and biased inwardly whereby the cutter heads remain in contact with the tree being processed irrespective of the diameter thereof.

By another embodiment of the invention, the processing unit is a debarker, of the type including a plurality of tool members engageable with said tree to remove said bark by scraping action or by cambium fracture, said tool members being mounted on a member circumferentially about said tree, said member being rotatable about an axis substantially coincident with the longitudinal axis of said tree, and preferably wherein the tool members of said debarker consist of a plurality of arcuate arms having tips engageable with said tree, each of said arms being pivotally mounted and biased inwardly so as to remain in contact with said tree during the processing operation.

By another embodiment of this invention, there are provided one, and possibly two sets of feed rolls, each set being of the type including a plurality of driven rollers each having a circumferential surface grippingly engaging said tree, at least one of said rollers being biased inwardly toward said tree, said rollers being disposed about the periphery of said tree, whereby said rollers clampingly engage said tree therebetween, but preferably wherein said feed rollers include three arms, each pivotally mounted to a frame at the apex of a triangle, said arms being directed inwardly toward a respective one of said arms and biased to the center of such triangle, a roller having an arcuate spiked surface rotatably mounted on the free end of a respective one of said arms, and driven to rotate about an axis substantially perpendicular to said feed path, said spiked surfaces being disposed about the periphery of said tree.

By another embodiment of this invention, the processing unit includes mechanism for cutting trees into logs of predetermined length, said mechanism comprising a plurality of relatively movable cutting knives, a housing for said knives, means in said housing for moving at least one of said knives toward and away from an axial path to cut a tree into logs of a predetermined length; and mounting means for said housing to allow said housing and said knives to move axially with said tree while said knives are in engagement with said tree and for returning said housing to its initial position when said knives are moved away from said tree.

By still another embodiment of this invention, the processing units may consist of the following combinations:

(1) Delimber, feed rolls;
(2) Delimber, debarker;
(3) Delimber, shear;
(4) Delimber, feed rolls, debarker;
(5) Delimber, feed rolls, shear; and
(6) Delimber, feed rolls, debarker, shear;

wherein there may be used one or two sets of feed rolls.

By another embodiment of this invention, in each of the combinations referred to above, there may be added a receiving and stacking means, such as one comprising a cradle associated with said frame and including a base, and posts upstanding from said base adjacent a pair of opposed marginal edges of said base, or of the type comprising a main frame rigidly secured to the machine and including uprights providing a pair of vertically disposed, horizontally spaced tracks, a cradle mounted in said tracks, means for sliding said cradle for vertical movement to raise and lower said cradle, said cradle having a trap door in the base thereof and movable from a closed to an open position for release of the processed trees stacked in said cradle.

By another embodiment of this invention, in each of the combinations referred to above, there may alternatively or additionally be added means downstream of the processing units for removing the processed tree from the machine, preferably where the means includes a speed-up roll rotatably mounted on said machine and having the surface thereof disposed for rolling contact with the processed tree, said roller being driven and having said surface tractively engaging the processed tree.

In the event the delimbing is unnecessary, as in the case where inconsequential limbs are present, the tree bole can be passed directly into the above specified debarker. Also the handled bole of tree may be disposed on receiving and stacking apparatus to form on a unitary piece of equipment. Various combinations may be utilized, the basic requirement being that there is provided handling apparatus for feeding the tree to the further processing units. Obviously the debarking unit may be substituted for the delimbing and these two units may be used in combination or various sub-combinations with receiving and stacking apparatus.

By yet another embodiment of this invention there is provided a machine for processing felled trees, comprising:

(a) A frame
(b) Log handling means associated with said machine, including log engaging means
(c) At least one processing unit mounted on said frame
(d) Means for operating said log handling means to engage a selected pre-felled tree from a plurality of such pre-felled trees, and
(e) Means for feeding said tree directly into said processing unit by moving said log engaging means along an axial path substantially in alignment with the longitudinal axis of said processing units and guided in its movement along an axis parallel to said longitudinal axis.

By still another aspect of this invention there is provided in a machine for processing trees, the combination of:

(a) A frame, and
(b) A sub-frame assembly on said frame, said sub-frame assembly having secured thereon a plurality of processing units including (1) A delimber secured
(2) A debarker in spaced relation with respect to said delimber and in axial alignment therewith, and
(3) Feed roller means for feeding a tree to be processed through said processing units.

Alternatively, there may be provided, by this aspect of the invention, in a tree processing apparatus (a) Sub-frame assembly including a base
(b) A pair of spaced, substantially parallel beams supported on said sub-frame assembly, and
(c) A plurality of processing units disposed between said beams and secured thereto to rigidify said sub-assembly, said processing units being disposed in axial end-to-end alignment relative to the length of said beams.

By another embodiment of this invention there is provided, in combination, at least one tree processing unit an a framework for detachably securing said unit, said framework comprising (a) A base;
(b) A pair of transversely spaced apart longitudinally extending rails vertically spaced from and secured to said base; and
(c) Means connected to said processing unit for mounting said unit on and between said rails, thereby rigidifying said framework.

It is an important facet of the above three embodiments of this invention, that the sub-frame assembly be pivotally mounted on the frame.

It is another important facet of the above there embodiments of this invention, that the processing units be detachably secured to the sub-frame assembly. They may be detachably secured so that they may be slid therealong for removal, or they may be so secured that they may be individually and selectively removed from the beams without necessarily removing the non-selected unit.

In another embodiment of such machine, the center of gravity of the processing units is initially upstream of the pivotal axis of said sub-frame assembly, and wherein the inclination of said feed path axis changes as the center of gravity of the processing units and the tree fed therethrough proceeds downstream of the pivotal axis of said sub-frame assembly.

In the above three embodiments, the procssing units may be any one or a combination of the aforedescribed delimber, debarker, feed rolls, flying shear, speed-up roll or cradle.

By one preferred embodiment, the frame includes a pair of transversely spaced apart A frames, each provided with a pin associated with a cross member between the legs of the A for pivotally suspending a hanger securing said rails, and a notch at the upper surface thereof for accommodating a pin secured to extendible and retractable boom means to said frame about a horizontal axis located vertically above said processing units.

By another preferred embodiment, the frame includes a pair of transversely spaced apart A frames, each provided with a notch in its upper surface for accommodating a pin secured to a hanger assembly securing said rails for freely pivoting said rails, and a second A frame secured to the top of said first A frame for pivotally securing thereto extendible and retractable boom means to said frame about a horizontal axis located vertically above said processing units.

By another embodiment of this invention there is provided a delimber comprising: an annular housing fixed to a support means and encircling a linear feed path; said annular housing carrying a plurality of rotatable supports; the supports being oscillatable and being spaced circumferentially around said housing adjacent the outer periphery thereof, a plurality of arms, each of said arms being fixed to an associated one of said supports, the opposite ends of each of said arms being movable towards and away from said feed path by oscillation of said supports, said ends carrying delimbing means thereon, and means for oscillating each of said plurality of supports in one direction for moving said arms towards said feed path and in another direction for moving said arms away from said feed path.

In an embodiment of such delimber, there is provided an annular housing fixed to a support means and encircling a linear feed path, said annular housing carrying a plurality of rotatable shafts, the shafts being spaced circumferentially around said housing, a plurality of arms, each of said arms being fixed to one of said shafts, the opposite end of each of said arms being movable towards and away from said feed path by rotation of said shafts; delimbing means carried on said arms; and means for rotating each of said plurality of shafts in one direction for moving said arms toward said feed path and in another direction for moving said arms away from said feed path.

In another embodiment of such delimber, there is provided means for supporting a tree fed axially along a substantially linear feed path; an annular housing fixed to said support means and encircling said linear feed path, said annular housing carrying a plurality of rotatable collars, the collars being spaced circumferentially around said housing and having one end projecting therefrom; a plurality of arms, each of said arms being fixed at one of its ends to one of said collars, the opposite end of the arm being movable towards and away from the feed path by rotation of its respective collar, a second shaft rotatably mounted on opposite end of said arm, delimbing means carried by each of said second shafts; and means for rotating each of said collars in one direction for moving said arms towards said feed path and in another direction for moving said arms away from said feed path.

According to another aspect of this invention, there is provided a boom for feeding a selected article along an axial path into a machine, said boom comprising: a support, a first member pivotally mounted on said support; at least one member telescoped within said first member, guide means on said first member and each of said members telescoped therein for supporting and guiding said member for movement into and out of said first member, means interconnecting said first member and said telescoped member for extending said telescoped members outwardly from said first member to lengthen said boom and for moving said telescoped member inward into said first member to shorten said boom; a grapple suspended from said boom and including a pair of relatively movable jaws for engaging said selected article; and heeling means associated with said boom.

By an embodiment of this aspect of the invention, the boom includes a first member pivotally mounted for rotation about a horizontal axis on said support; means for pivoting said first member about said horizontal axis; a second member telescoped in said first member; a third member telescoped in said second member; a fourth member telescoped in said third member and extending outwardly therefrom; a guide roller mounted on said first member intermediate said support and said grapple means; means for raising and lowering said guide roll; means interconnecting said first member, said second member, said third member and said fourth member for moving said second member, said third member and said fourth member outwardly and inwardly with respect to said first member and with respect to one another; means for selectively operating said interconnecting means; and means mounted intermediate said first, second, third and fourth members for guiding and supporting said members for movement into and out of each other.

By another embodiment of this aspect of the invention, the means to actuate the boom includes a sheave system, a cable system interconnecting said movable sections to one another and to said fixed section and entraining said sheave system, means for rotating said sheave system in one direction for extending said movable sections outwardly from said fixed section and with respect to one another, and means for rotating said sheave system in an opposite direction for retracting said movable sections into one another and with respect to said fixed section.

By another embodiment of this aspect of the invention, the grapple includes a pair of jaws each movable and means for opening and closing said jaws selectively for engaging said pre-felled tree from a plurality of pre-felled trees. In such embodiment, the means to drive the jaws may include a driven pinion gear, a plurality of planetary gears rotatably secured on one of said jaws and meshing with said pinion and a sun gear fixed to the other jaw and meshing with said planetary gears.

By another embodiment of this aspect of the invention, the grapple includes a first tong portion rigidly secured to and projecting downwardly from said boom and having an inwardly directed hooked terminal end portion, the second jaw member pivotally mounted on said first jaw member intermediate the ends thereof and having a terminal end portion turned inwardly towards the terminal end of the fixed member and means biasing said movable member towards said fixed member whereby said jaw is normally closed and means for moving said movable jaw against the resilient bias for opening the jaw. In such embodiment, the means to operate the movable jaws may include an hydraulic cylinder resiliently urged or biased to normally retain the jaw in a closed position by an hydraulic accumulator, said hydraulic cylinder being connected to an hydraulic system, the line for connecting the cylinder to the system being mounted on the boom and movable therewith, said line being wound upon the third sheave in a sheave system as hereinbefore defined.

By another embodiment of this aspect of the invention the heeling means may include operating means secured thereto and to said support and operative to vary the angle of inclination of said heeling means. In such embodiment, the heeling device may include an inverted Y-shaped member, the stem thereof being pivotally secured to said operating means, and guide means interconnecting said legs of said Y-shaped member.

By another aspect of this invention there is provided receiving and stacking means comprising a frame; a cradle associated with said frame and including a base, and posts upstanding from said base adjacent a pair of opposed marginal edges of said base, means for supporting said cradle relative to said frame and means for elevating and lowering said cradle with respect to said support means. In one embodiment of this aspect, the main frame includes a trap door, and such trap door includes a pair of doors slidably mounted in arcuate channels, a plurality of rollers in said channels and means interconnecting said frame to an associated adjacent door to move said door through an arcuate path. In another embodiment of this aspect, the means to slide the cradle for vertical movement includes a roller mounted at each of the four corners of said cradle, pairs of rollers adjacent the side walls of the frame to follow in said tracks and a cable system operatively connected to the frame, whereby movement of the cable raises and lowers the cradle frame.

By another aspect of this invetnion, there is provided a machine for processing a felled tree, said machine comprising:

(a) Support means;

(b) Feed means for feeding a tree bole axially along a substantially linear feed path;

(c) Cutting means on said support means and located in said feed path for cutting said tree bole passing along said path into a plurality of portions; and, (d) Mounting means for said cutting means to allow said cutting means to move along said path during said cutting operation and for returning said cutting means to its initial position when said cutting operation is terminated.

By another aspect of this invention, there is provided apparatus for subdividing a tree bole into a plurality of portions comprising:

(a) Feed means to move said bole endwise along a path substantially coincident with the longitudinal axis of said bole;

(b) A frame;

(c) Tree cutting means engageable with said bole to subdivide the same and mounted on said frame to reciprocate along an axis parallel to the path of said bole, said bole moving said cutting means on engagement therewith along said axis from an initial first position during said subdividing of said bole; and, (d) Means returning said cutting means to said first position upon disengagement of said cutting means from said bole.

In these two embodiments, the feed means may be mounted directly on the machine. It may include feed rolls, as hereinbefore described, or a telescopic boom, also as hereinbefore described, including, the grapple thereon as hereinbefore described.

By an embodiment of this invention, the cutting means includes a plurality of cutting knives; means for feeding a selected tree in an axial path between said cutting knives; a housing for said knives; and means in said housing for moving said knives toward and away from said axial path to cut said selected tree into logs of a predetermined path.

In the slasher as described hereinabove, there may also be included any one or a combination of the hereinbefore described delimber or debarker. In addition the hereinbefore described speed-up roll or receiving and stacking means may also be added thereto.

In the flying shear, the knives may preferably both be movable, and be driven towards and away from each other to intersect said axial path by means of hydraulic cylinders. The hydraulic cylinders may be fixed to the movable cutter frame and to the knives, or they may be pivotally secured to the knives and/or the movable cutter frame.

The flying shear, in another embodiment, also includes a fixed shear frame provided with a pair of parallel spaced apart horizontal hollow beams, and wherein the movable shear frame is provided with a pair of parallel spaced apart horizontal beams telescoped therein whereby movement of said movable frame from said first position to said second position is guided by sliding cooperation between said beams. In that embodiment, a coil spring is disposed within the inner telescoped beam to bias said movable shear frame to its first position.

The guide means between the inner and outer beams of this embodiment includes at least two brackets secured to and disposed about the outer circumference of the inner beam of the aft end thereof, each bracket pivotally mounting rollers thereon adapted to roll on the inner circumference of the outer beam and at least two brackets secured to and disposed about the inner circumference of the outer beam at the fore end thereof, each bracket pivotally mounting rollers therein adapted to roll on the outer circumference of the inner beam.

In another embodiment of this invention, the movable shear frame is provided with switch means operative to initiate the downward and the upward movement of said knives. In this aspect there may also be provided feed rolls to feed logs therethrough along said axial path, and wherein said switch means is associated with said feed rolls. Alternatively or additionally, there may be provided, by this aspect, log measuring means associated with said fixed cutter frame, and wherein said switch means is associated with said log measuring means. By this embodiment, the log measuring means comprises a framework; means mounting said frame on said fixed cutter frame downstream of said cutter but disposed in a horizontal plane above said axial path; downwardly depending legs, pivotally secured to said framework and extending across said axial path and switch means operated by pivotal movement of said downwardly depending means.

According to another embodiment of this invention, there is provided a method of logging in which at least two operations are performed on a tree, which method comprises continuously feeding said tree along a feed path, continuously performing a first operation on said tree while it is moving along said feed path, and sequentially performing a second operation on one portion of said tree while it is moving along said path while substantially simultaneously performing said first operation on another portion of said tree.

By yet another aspect of this invention, there is provided a method of logging in which felled trees are subdivided into pieces of predetermined length, which process comprises; selecting a pre-felled tree from a plurality of pre-felled trees; relatively moving said tree along a feed path; removing the limbs from said tree as it is relatively moved along said feed path; sensing the diameter of said tree as it is relatively moved along said feed path; activating a shear including a pair of relatively movable knives intersecting said feed path by the relative movement of said tree along said feed path; severing said tree by said knives as said tree is relatively moved along said feed path; and returning said knives to an unactivated position in which the vertical spacing between said knives is dependent upon the diameter sensed and is controlled by said switches.

By another aspect of this invention there is provided a method of tree processing which comprises feeding a tree to be processed to a processing unit by a tree engaging means along an axis coincident with the longitudinal axis of said tree processing unit while guiding said tree engaging means along an axis parallel to said longitudinal axis, thereby aligning said tree to be processed.

In the accompanying drawings:

FIGS. 1 to 8 inclusive illustrate the overall arrangement of a mobile processing machine wherein:

Figure 1:
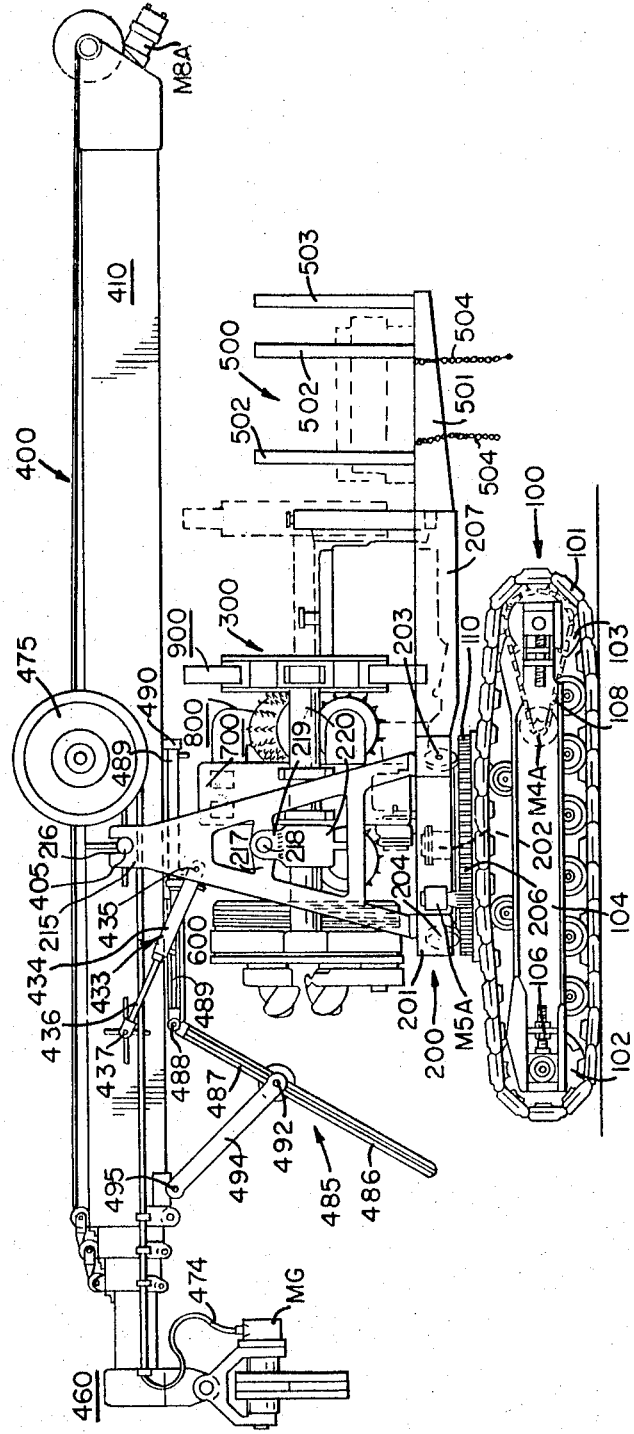
FIG. 1 is a side elevational view of one embodiment of a mobile processing machine constructed in accordance with the present invention.
Figure 10:
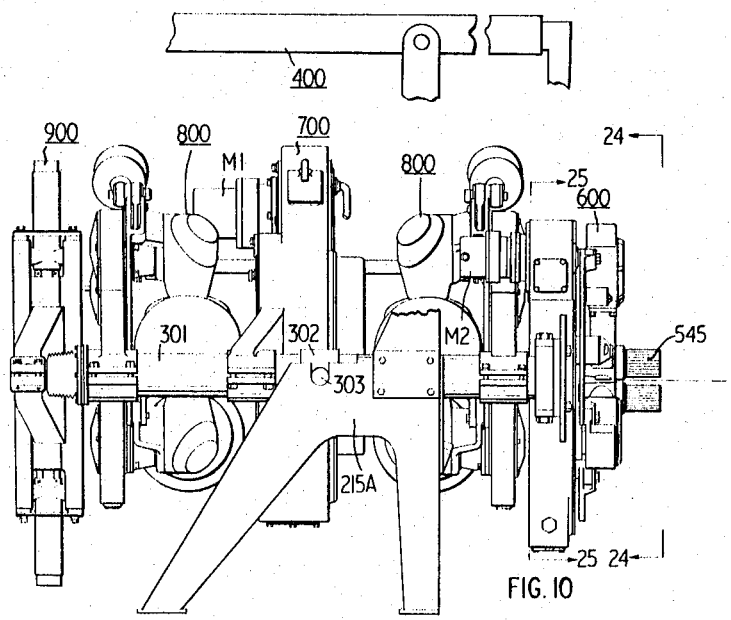
Figure 9:
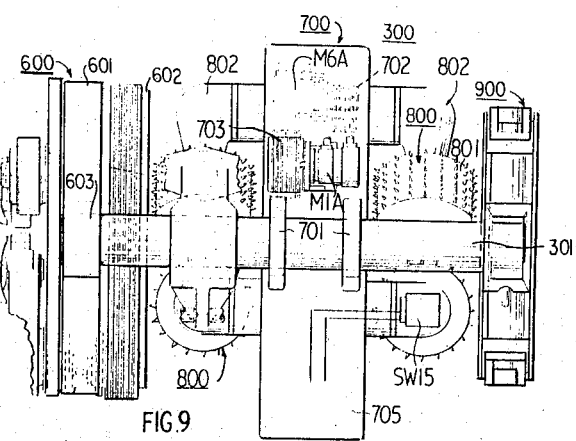
Figure 13:
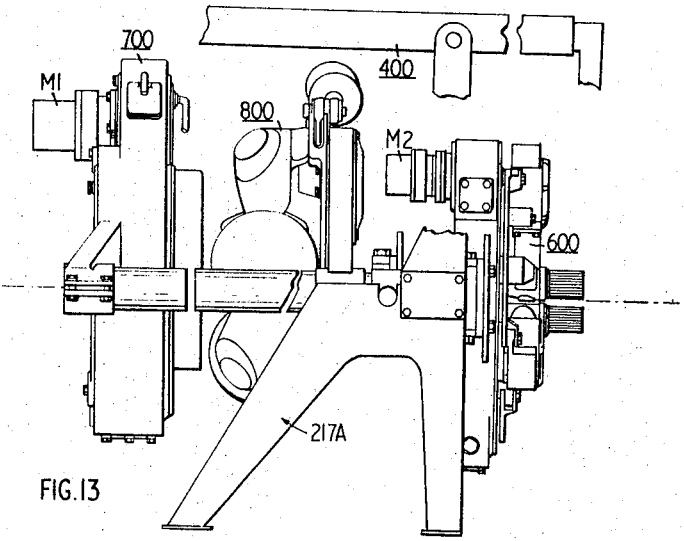
Figure 11:
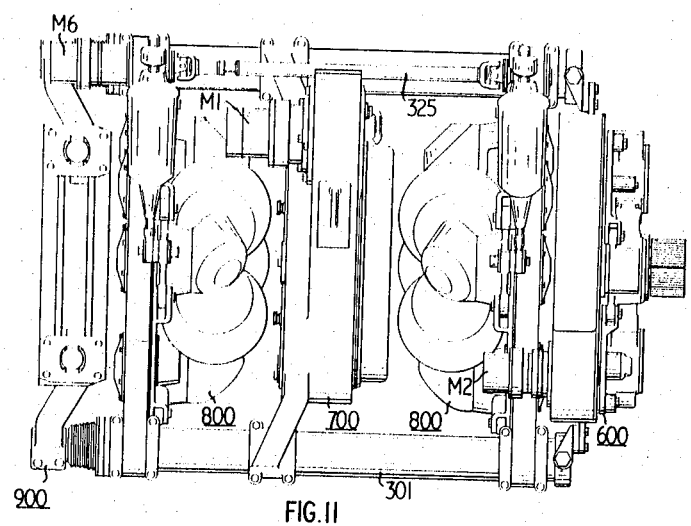
Figure 12:
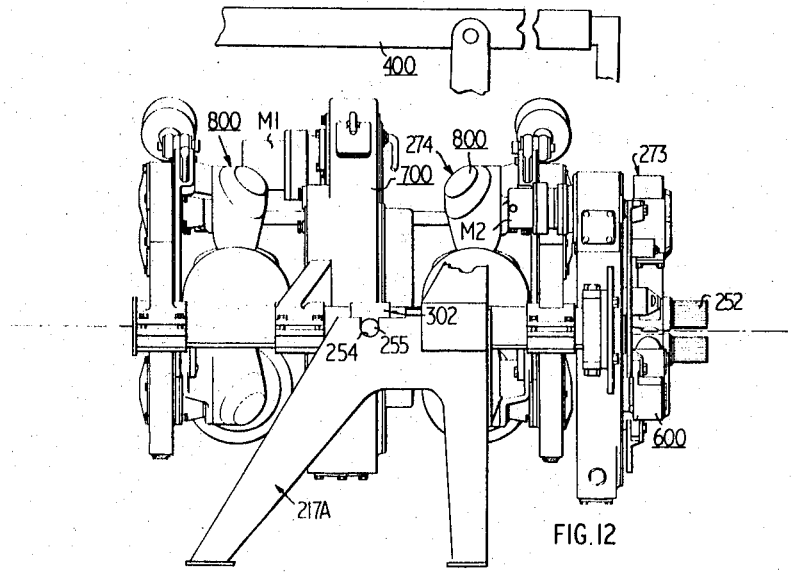
Figure 14:
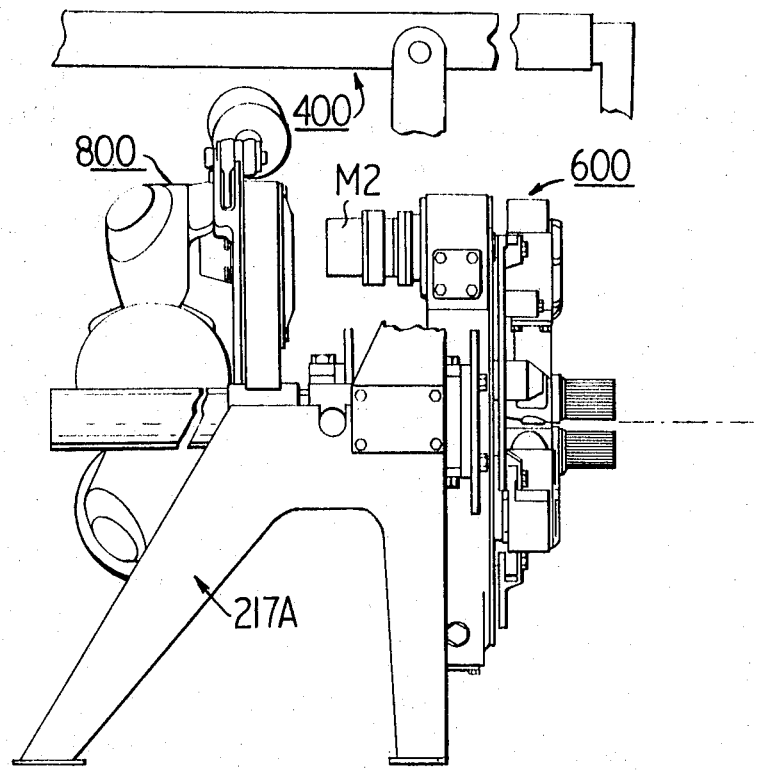
Figure 15:
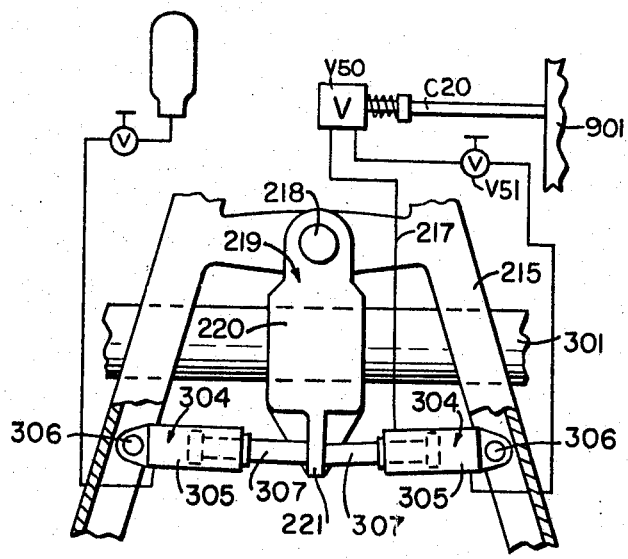
Figure 16:
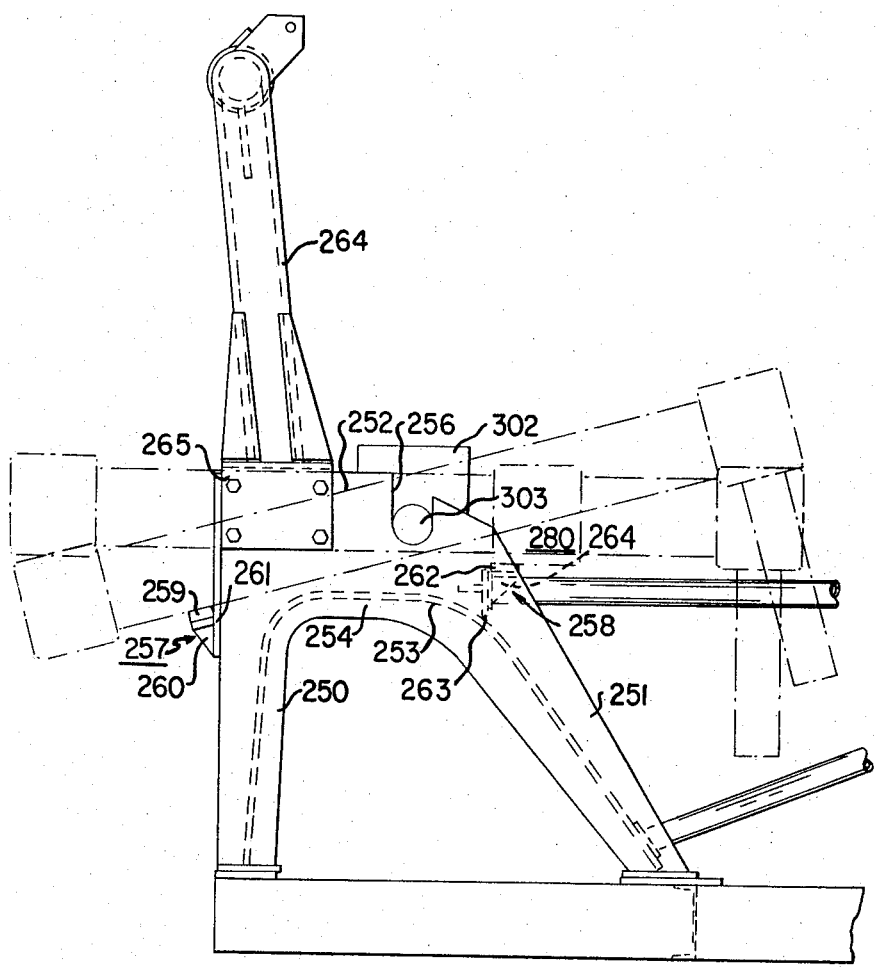
Figure 17:
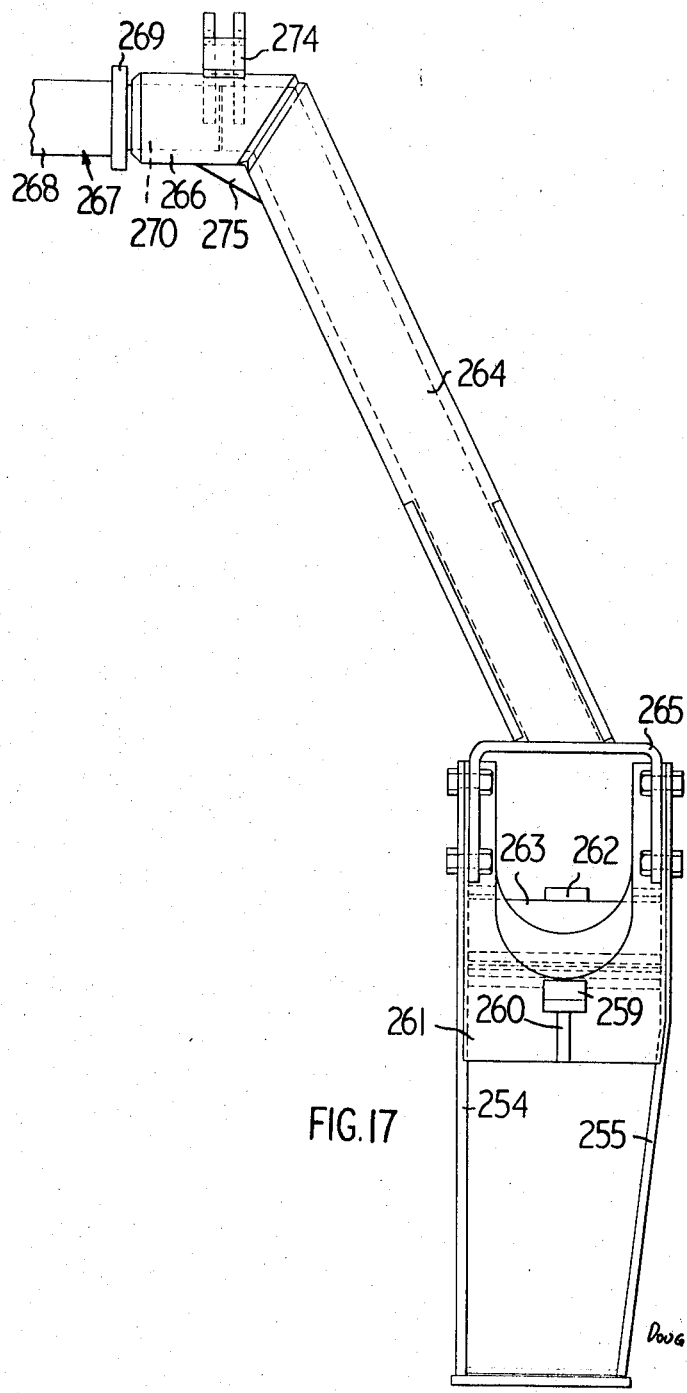

FIGS. 9 to 14 inclusive illustrate generally a sub-frame assembly with various combinations and sub-combinations of processing units;

FIG. 9 is a side elevational view of a delimber, a debarker, and a shear or slasher unit, together with two sets of feed rolls mounted on a pair of beams;

FIG. 10 is a side elevational view, opposite to that of FIG. 9, illustrating modified processing units which include a delimber, a debarker, a shear and two independent sets of feed rolls secured to a pair of beams pivotally mounted on a frame;

FIG. 11 is a top plan view of the processing units secured to a pair of beams shown in FIG. 10;

FIG. 12 is a side elevational view similar to FIG. 10 illustrating the combination of a delimber, a debarker and two sets of feed rolls pivotally mounted upon a frame and including log handling means for feeding a tree bolt to the processing units;

FIG. 13 is a side elevational view similar to FIGS. 10 and 12 illustrating the combination of a delimber, a debarker, one set of feed rolls pivotally mounted upon a frame and including a boom and grapple means for feeding a log to the processing units;

FIG. 14 is a side elevational view similar to FIG. 10 illustrating the combination of a delimber and one set of feed rolls pivotally mounted upon a frame and including tree handling means for feeding a tree bole to the processing units;

FIGS. 15 to 17 inclusive illustrate two alternative means of mounting the sub-frame assembly wherein;

FIG. 15 is a side elevational view, partially in section, illustrating in detail the mounting, for a sub-frame assembly on a tractor unit of the type illustrated in FIG. 1;

FIG. 16 is a side elevational view of a portion of the mounting frame on the machine illustrated in FIGS. 4 to 7 inclusive; and FIG. 17 is a front elevational view of the right hand half portion of FIG. 16.

Figure 18:
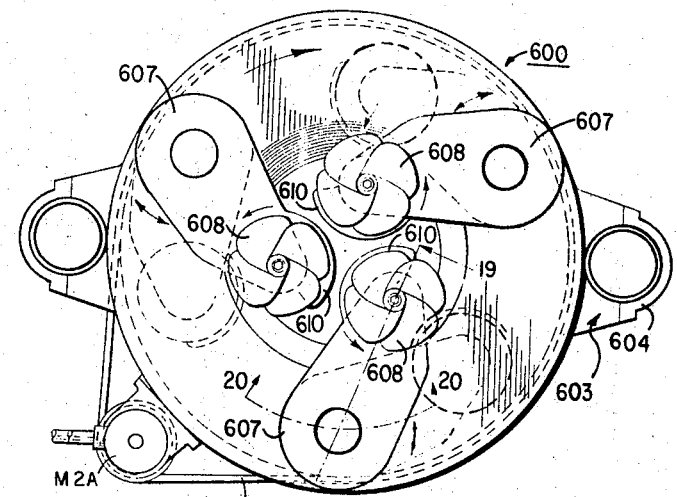
Figure 19:
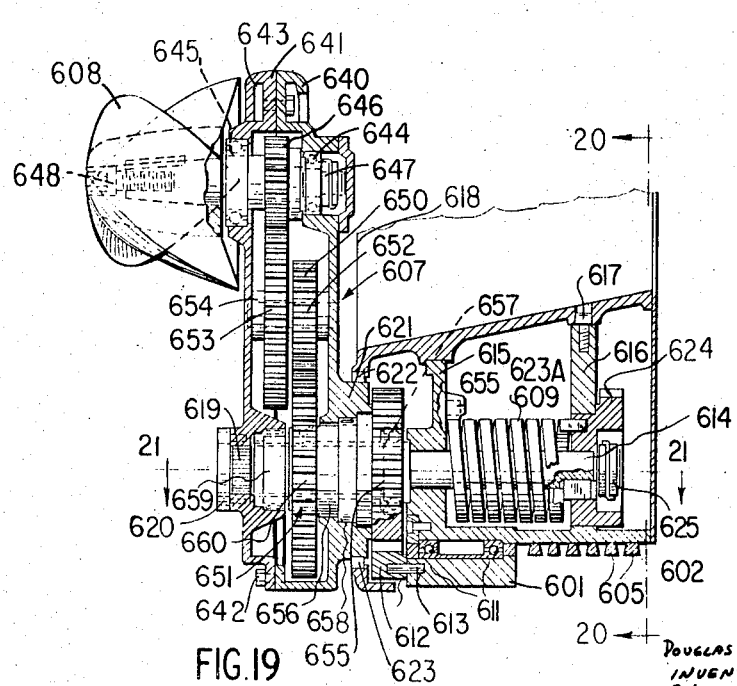
Figure 20:
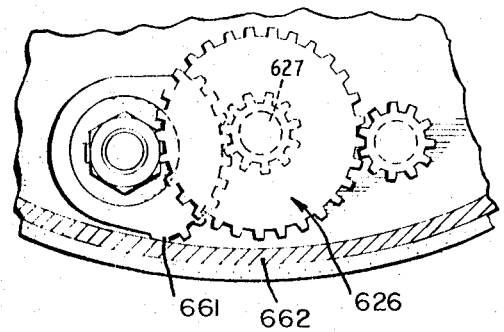
Figure 24:
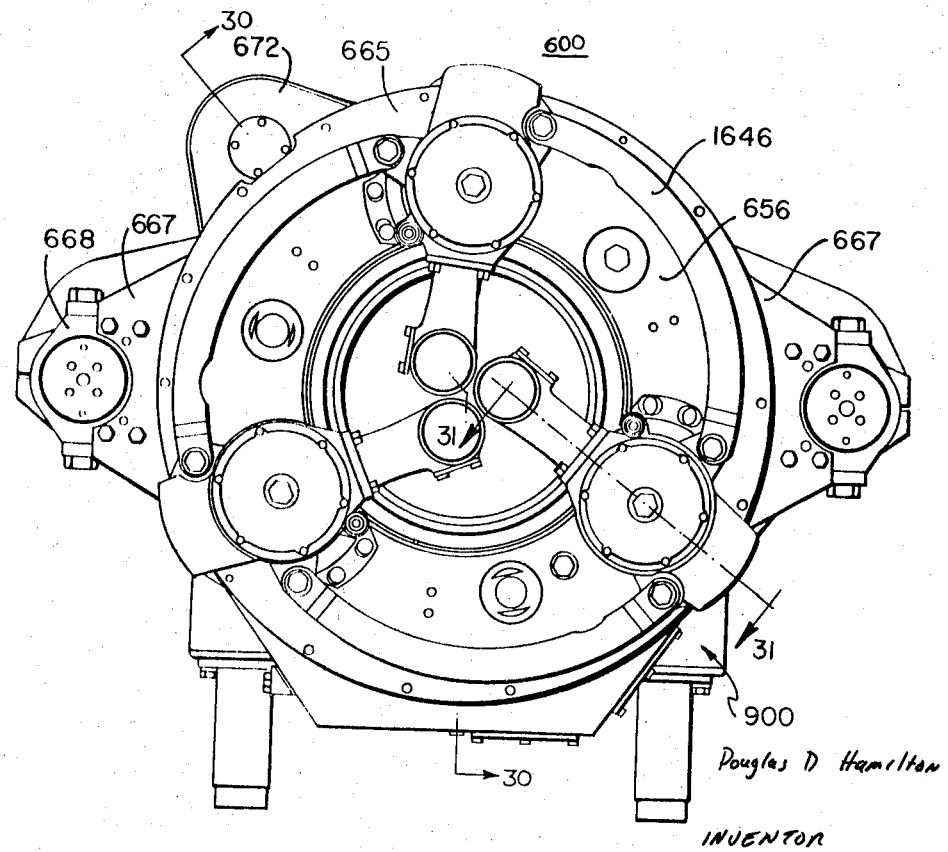
Figure 25:
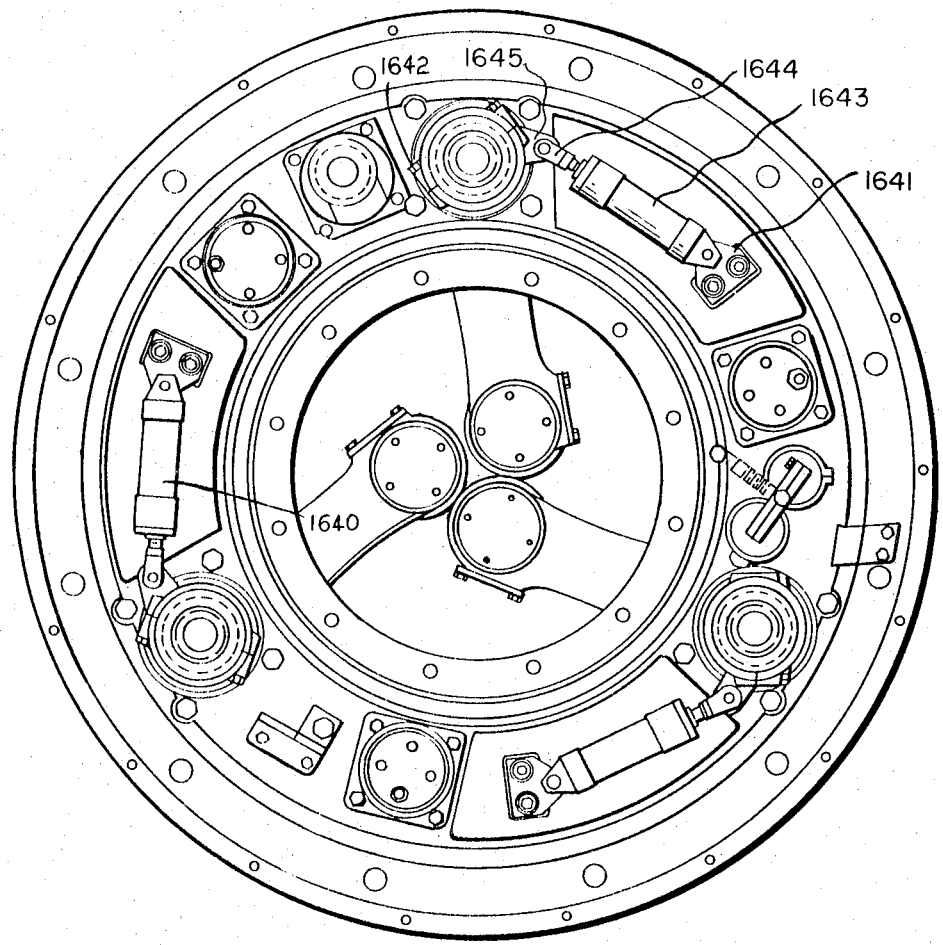
Figure 26:
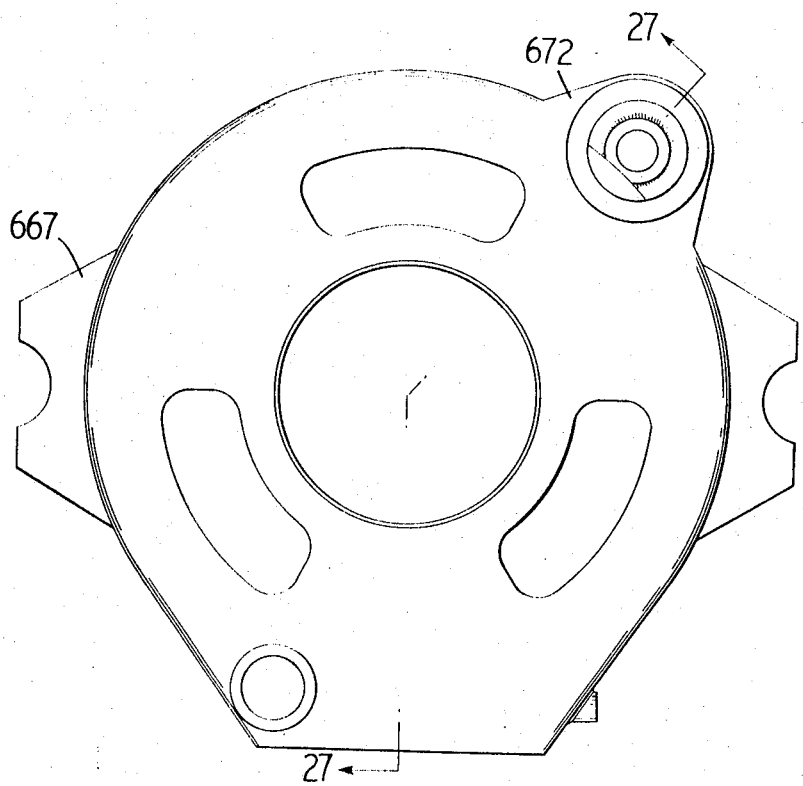
Figure 27:
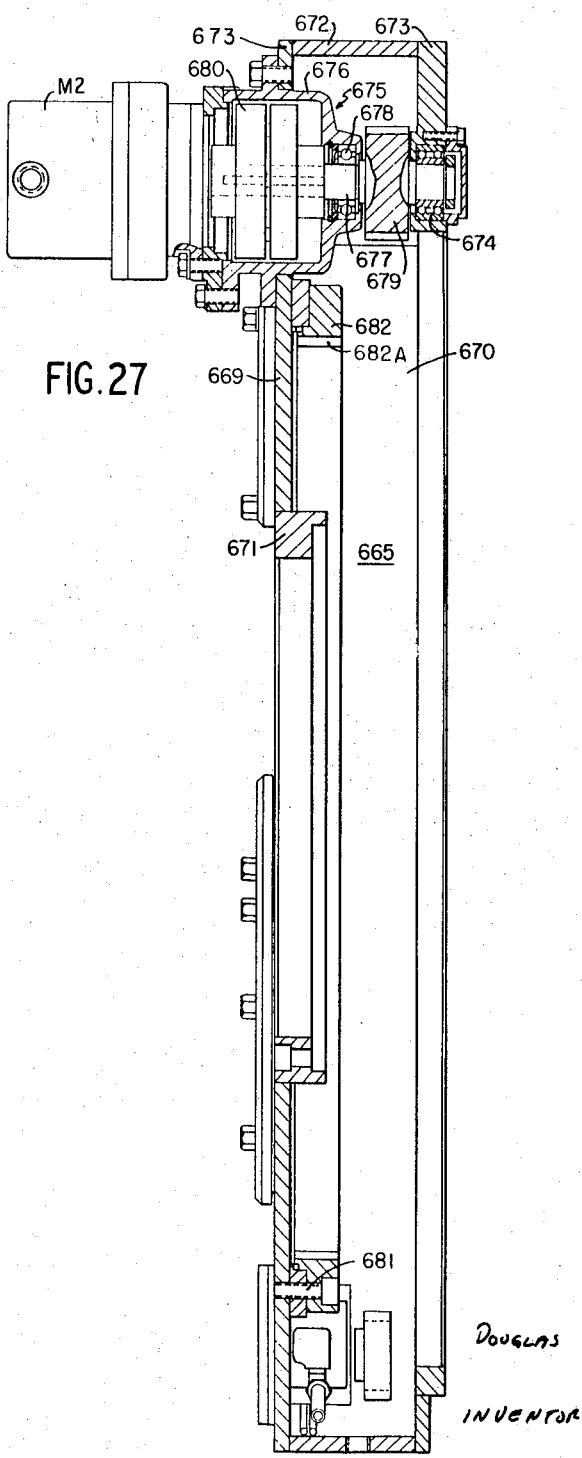
Figure 28:
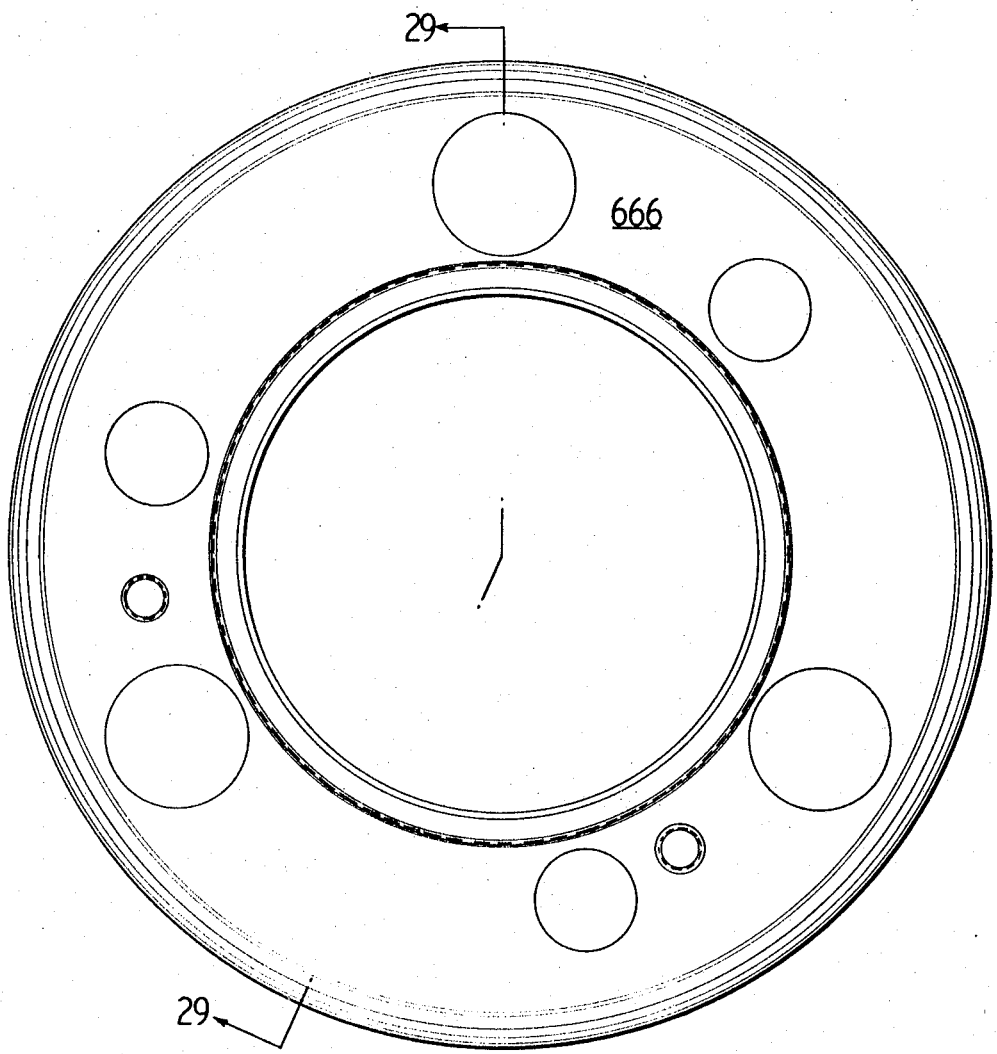
Figure 30:
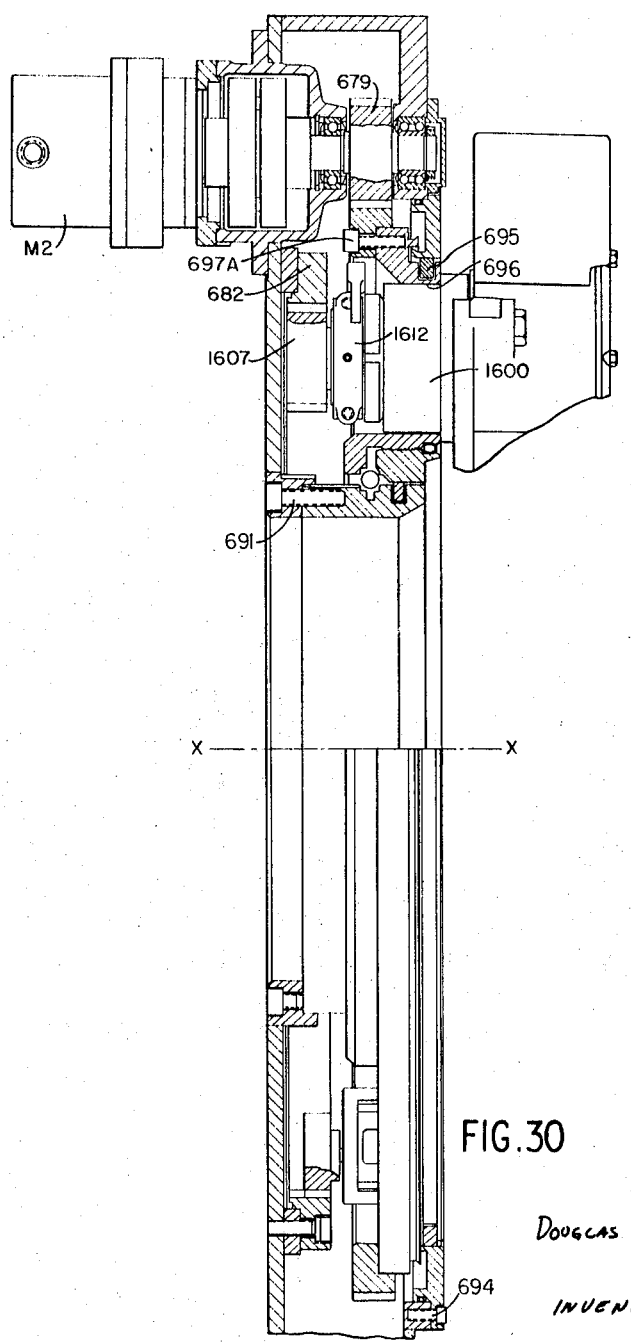
Figure 31:
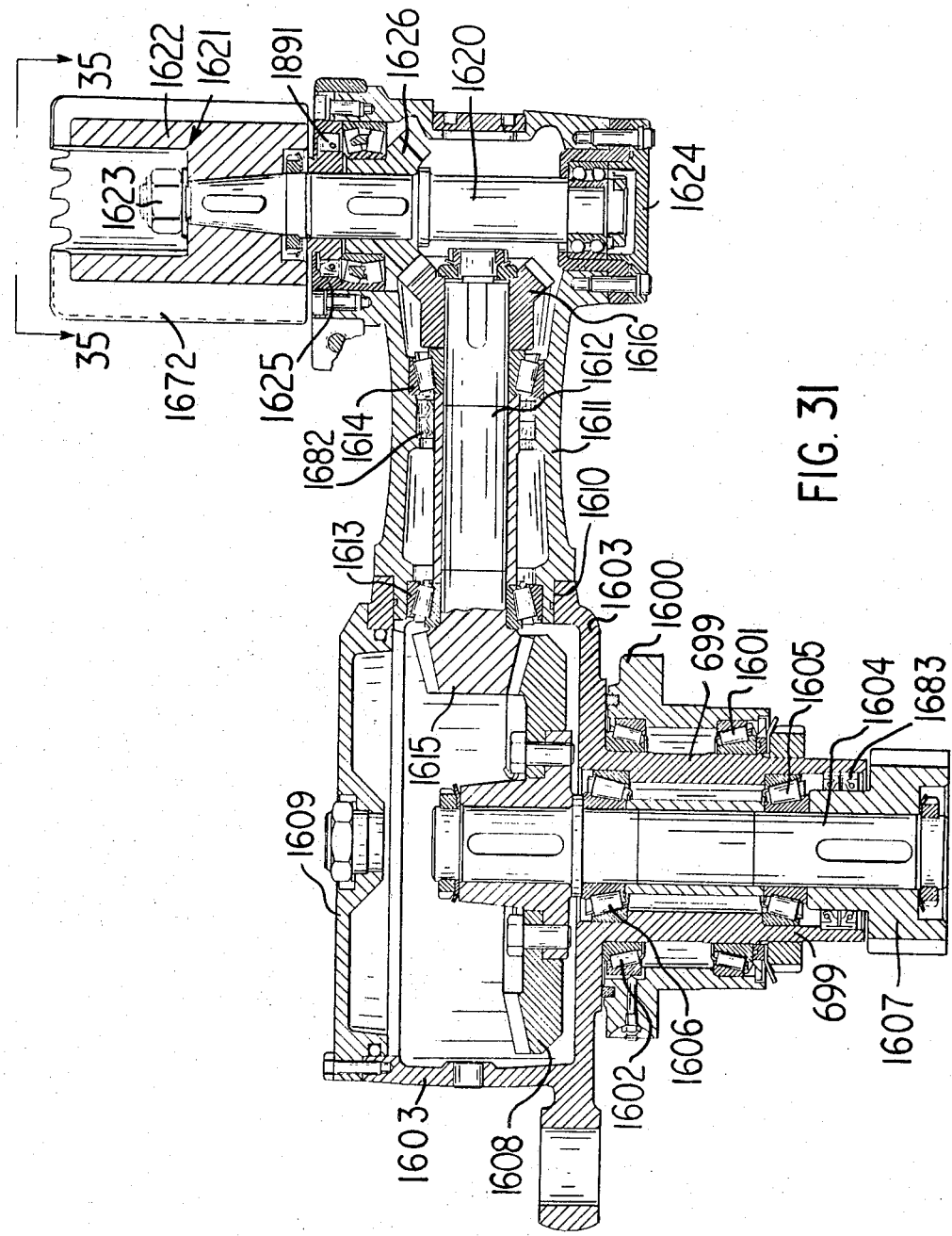
Figure 32:
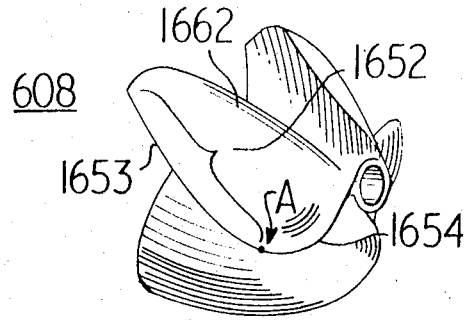
Figure 33:
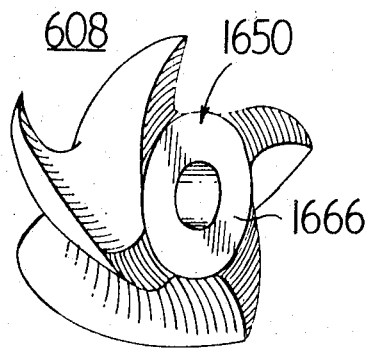
Figure 34:
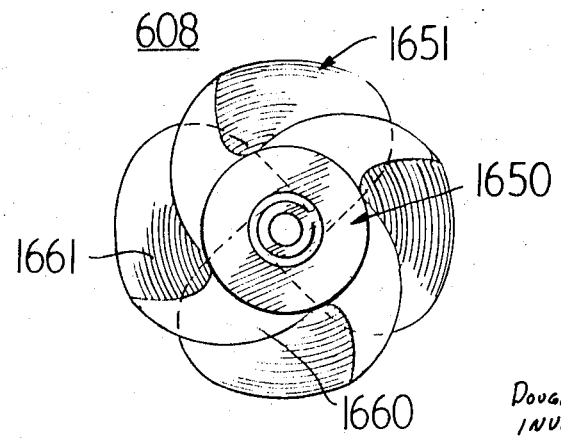
Figure 35:
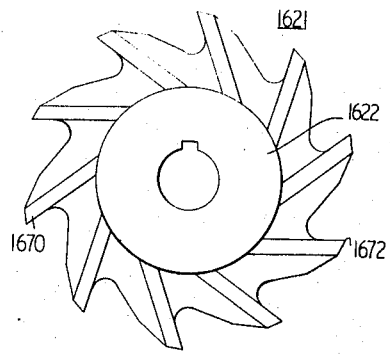
Figure 36:
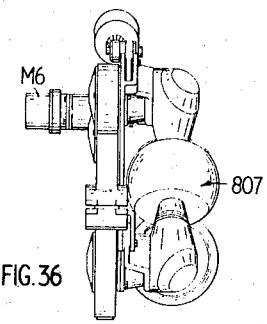
Figure 37:
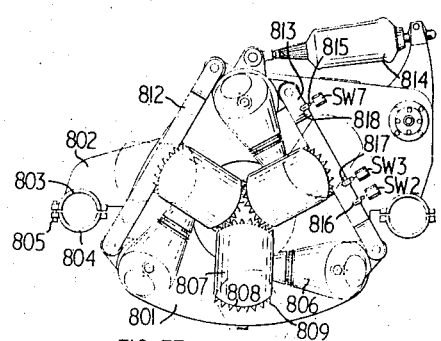
Figure 37A:
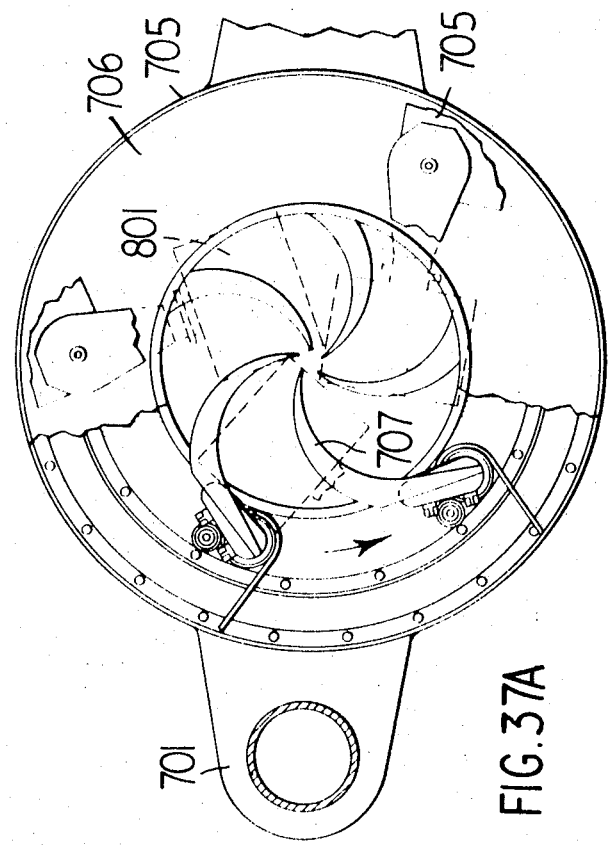
Figure 38:
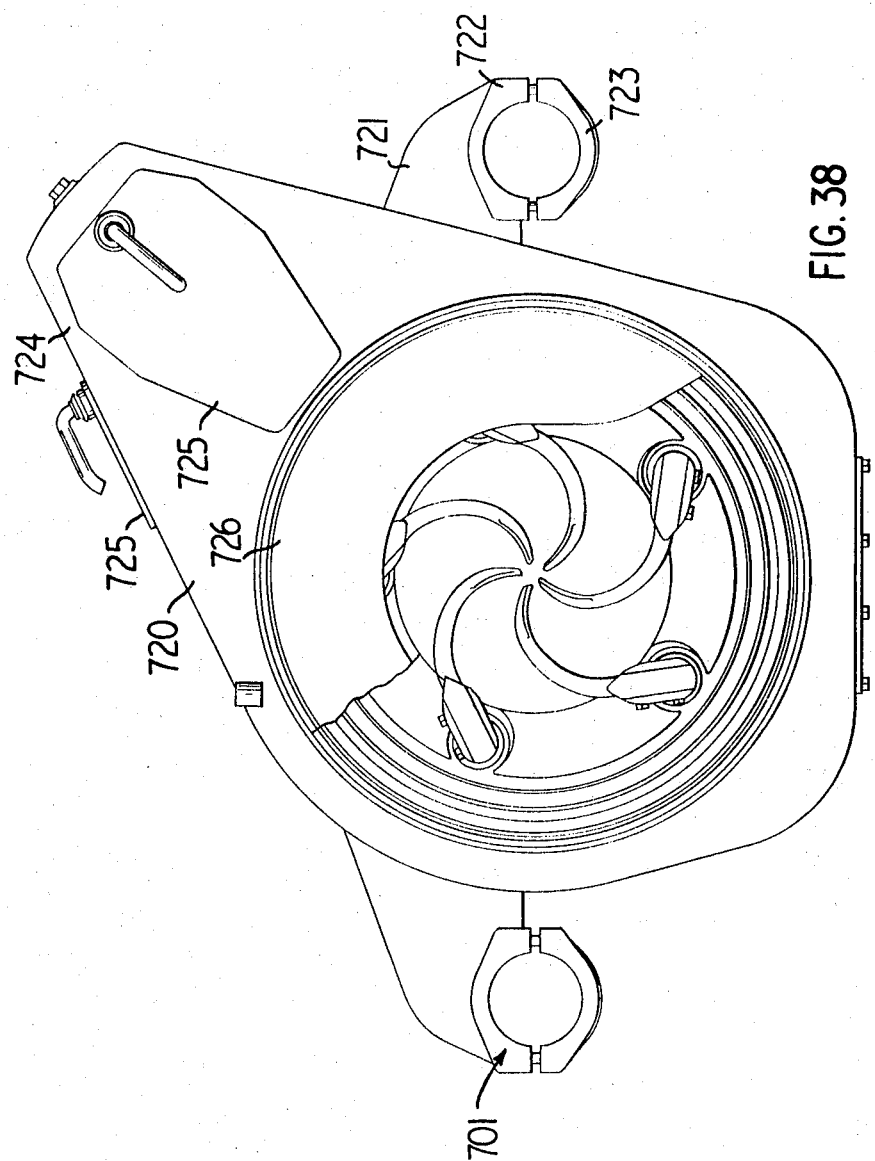
Figure 43:
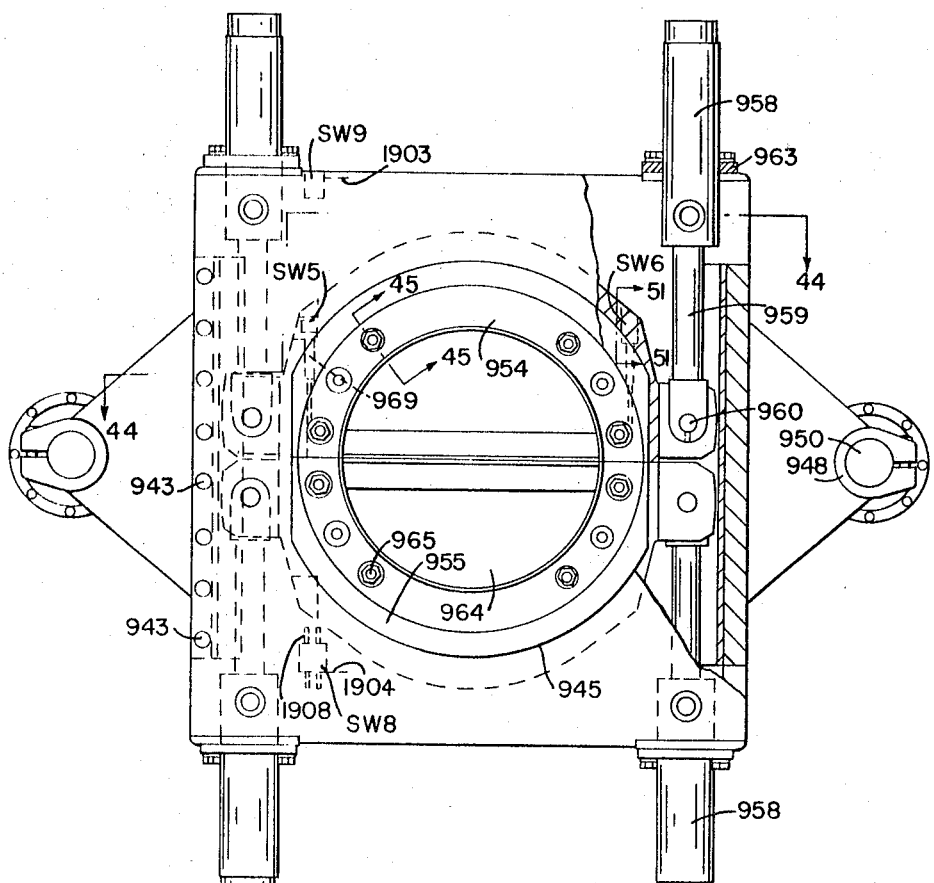
Figure 48:
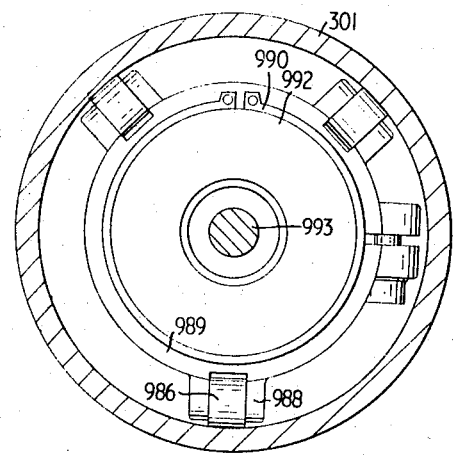
Figure 49:
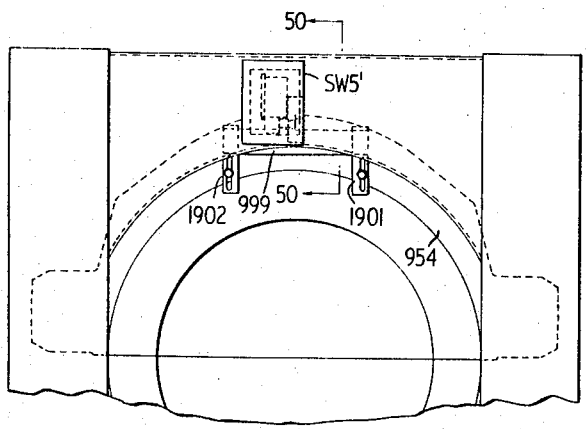
Figure 52:
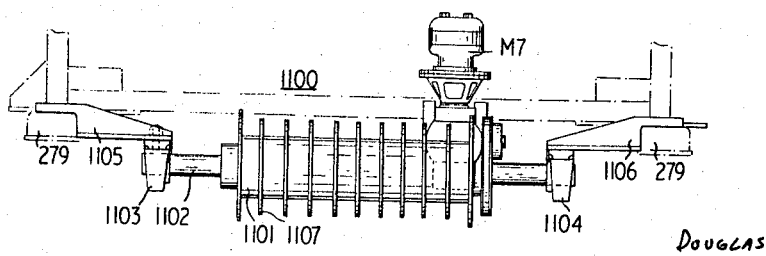
Figure 50:
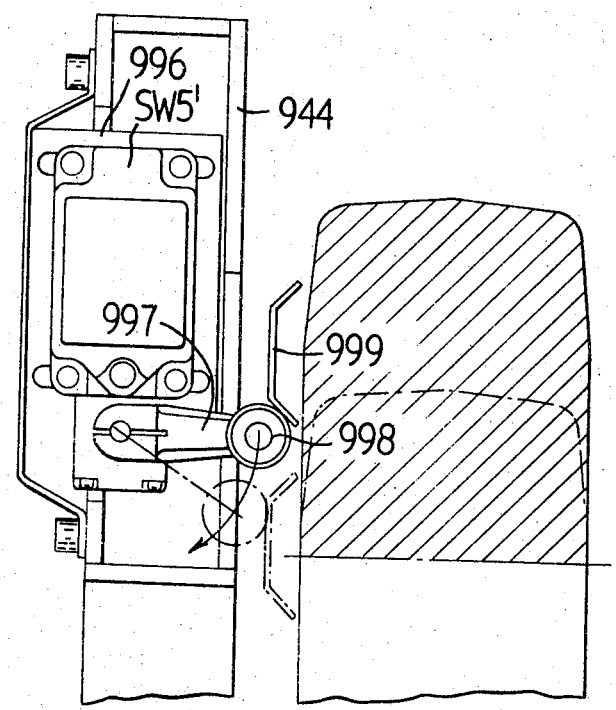
Figure 51:
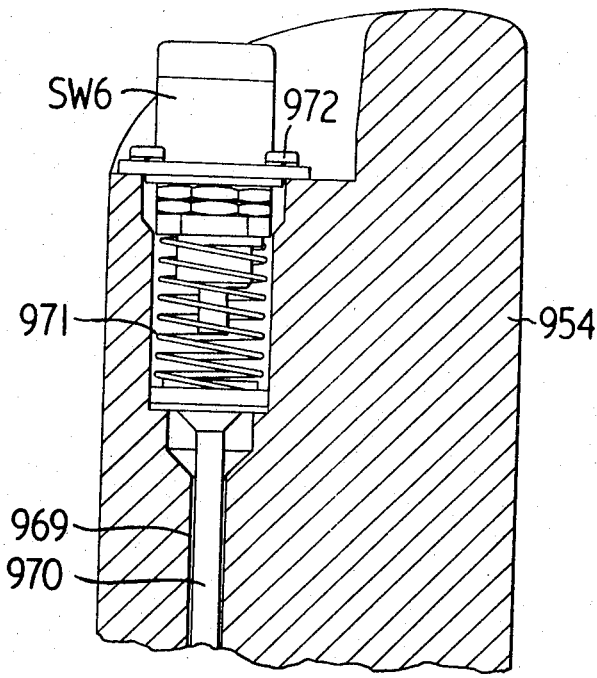
Figure 54:
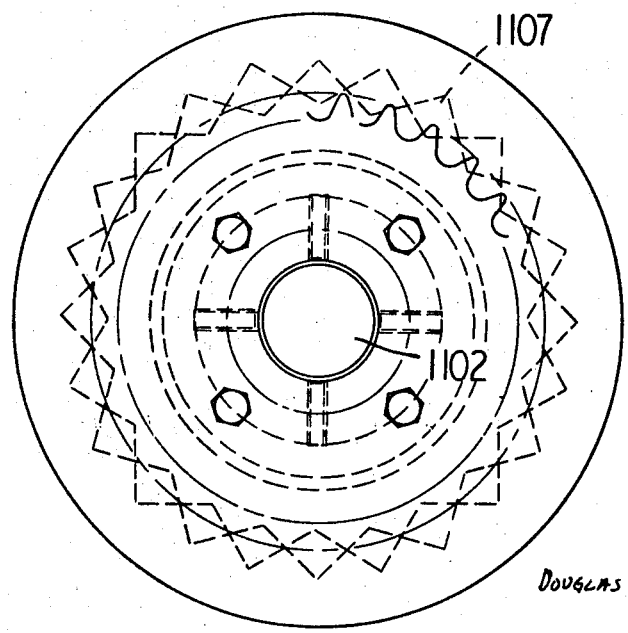
Figure 53:
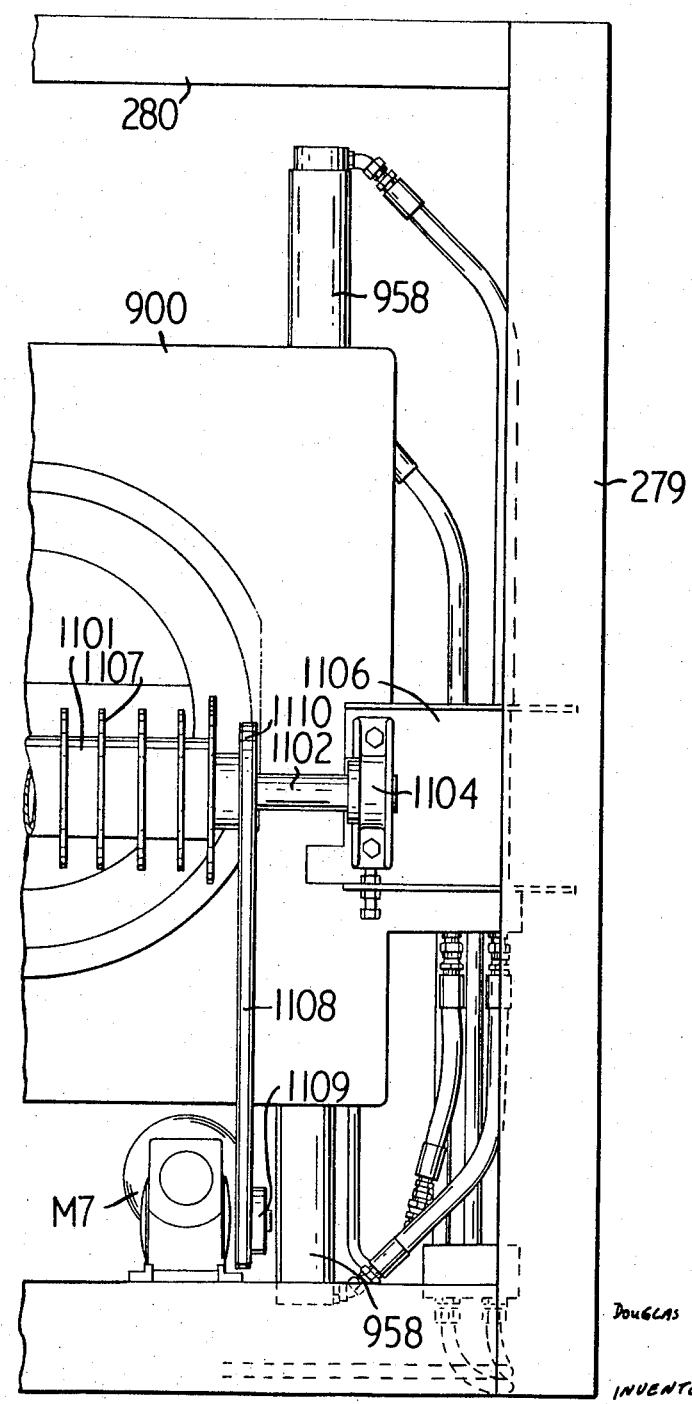
Figure 55:
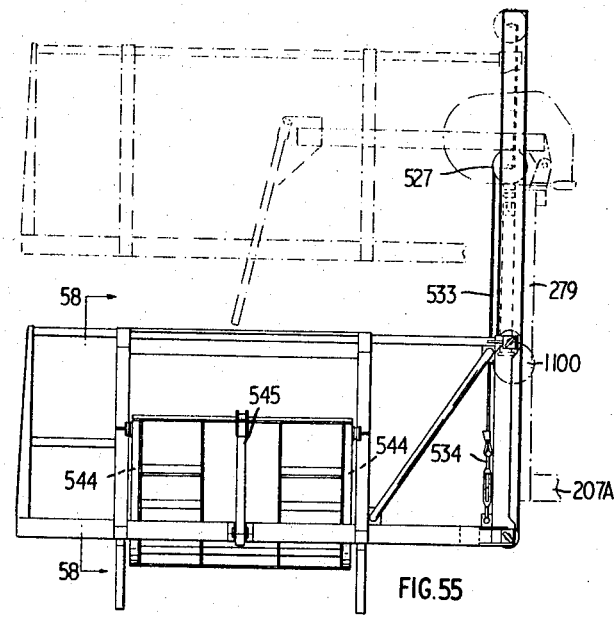
Figure 56:
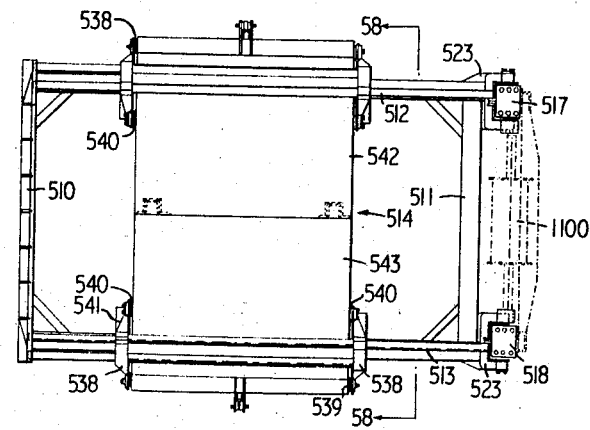
Figure 57:
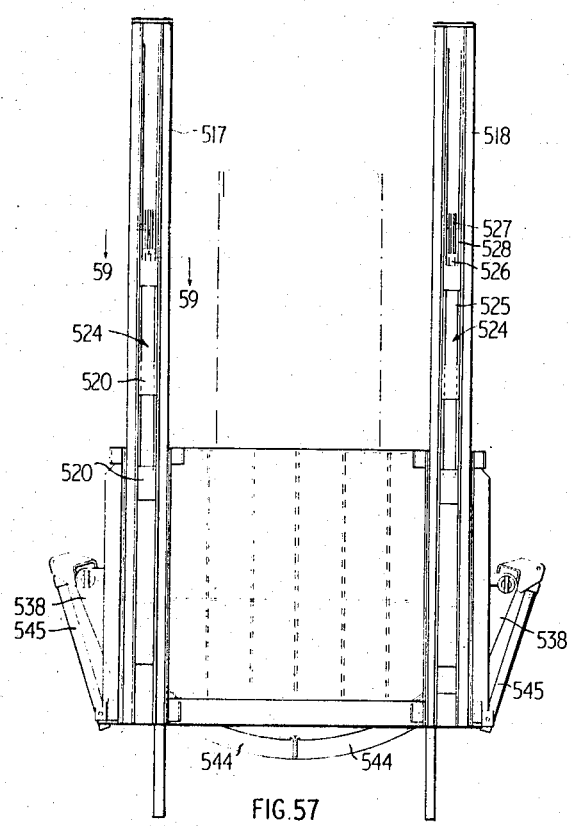
Figure 58:
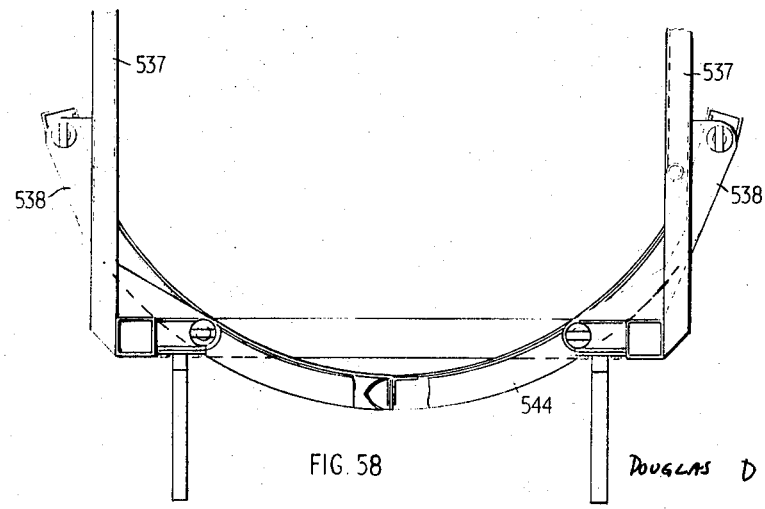
Figure 59:
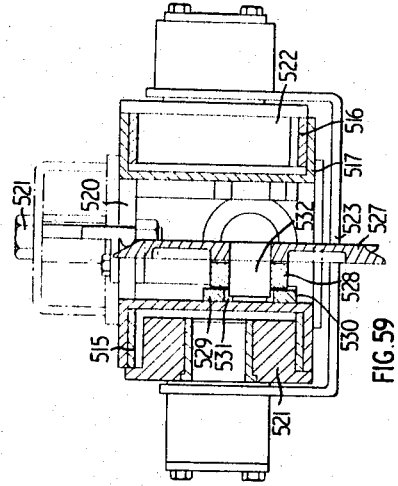

FIGS. 18 to 51 inclusive are various details of the processing units which include the delimber, the debarker, the feed rolls and the shears, and various alternative embodiments of the same wherein;

FIG. 18 is a front elevational view of the delimber processing unit illustrated in FIG. 9;

FIG. 19 is a cross-sectional detail view along section 19—19 of FIG. 18 illustrating the drive and mounting of an arm carrying one of the cutter heads on the delimber unit;

FIG. 20 is a fragmentary end sectional view along section 20—20 of FIG. 19;

FIG. 21 is a horizontal partial sectional view substantially along section 21—21 of FIG. 19;

FIG. 22 is a fragmentary sectional view along section 22—22 of FIG. 21;

FIG. 23 is a fragmentary cross-sectional view along section 23—23 of FIG. 21;

FIG. 24 is a front elevational view of a delimber unit of the type illustrated in FIG. 10 and taken substantially along line 24—24 of FIG. 10;

FIG. 25 is a vertical sectional view in the opposite direction taken substantially along section 25—25 of FIG. 10;

FIG. 26 is a front elevational view of a stator of the delimber illustrated in FIGS. 10, 24 and 25;

FIG. 27 is a vertical cross-sectional view substantially along section 27—27 of FIG. 26 but including additional parts and detail;

FIG. 28 is a front elevational view of the rotor of the delimber of the type illustrated in FIG. 10;

FIG. 29 is a vertical cross-sectional view substantially along section 29—29 of FIG. 28 but including additional parts and detail;

FIG. 30 is a vertical cross-sectional view of the stator and rotor of FIGS. 27 and 29 in an assembled position taken substantially along the same section as section 29—29 in FIG. 28;

FIG. 31 is a detailed cross-sectional view of one of the arm assemblies having a cutter head mounted thereon taken along section 31—31 of FIG. 24;

FIGS. 32 to 34 inclusive are various views of the cutter head for the delimber unit shown in FIGS. 18 and 19;

FIG. 35 is an end view of the cutter taken substantially along line 35—35 of FIG. 31;

FIG. 36 is a side elevational view of one independent set of feed rolls;

FIG. 37 is a front vertical elevational view of FIG. 36;

FIG. 37A is a front elevational, fragmentary sectional view of a debarker and feed rolls mounted thereon in FIG. 9;

FIG. 38 is a front elevational view of the debarker of the type illustrated in FIG. 10;

FIG. 39 is a rear elevational view of the shear illustrated in FIG. 9;

FIG. 40 is a vertical side elevational view of FIG. 39;

FIG. 41 is a plan view of FIG. 39 illustrating the mounting in partial section;

FIG. 42 is a vertical sectional view along section 42—42 of FIG. 39;

FIGS. 43 to 50 inclusive are various detailed views of a modified form of slasher or shear wherein;

FIG. 43 is a rear elevational view in partial section illustrating a shear of the type illustrated in FIG. 10;

FIG. 44 is a sectional view substantially along section 44—44 of FIG. 43;

FIG. 45 is a detailed exploded view substantially along section 45—45 of FIG. 43;

FIG. 46 is a detailed cross-sectional view of a mounting for the slasher of the type illustrated in FIGS. 43 and 44;

FIG. 47 is a cross-sectional view along section 47—47 of FIG. 46;

FIG. 48 is a cross-sectional view along section 48—48 of FIG. 46;

FIG. 49 is a partial vertical elevational view illustrating an electrical switch mounted for actuation by movement of the shear yoke;

FIG. 50 is a vertical sectional view along section 50—50 of FIG. 49;

FIG. 51 is a sectional view along section 51—51 of FIG. 43;

FIGS. 52 to 54 inclusive illustrate various views of a clearing roll wherein;

FIG. 52 is a top plan view of a driven clearing roll for assisting in removing the processed trees from the processing machine;

FIG. 53 is a rear vertical elevational view of one-half of the clearing roll illustrated in FIG. 52; and, FIG. 54 is a side elevational view of the driven clearup roll shown in FIGS. 52 and 53;

FIGS. 55 to 59 inclusive are various views of a cradle assembly for receiving the processed logs wherein;

FIG. 55 is a side vertical elevational view of the cradle assembly;

FIG. 56 is a top plan view of FIG. 55;

FIG. 57 is a rear elevational view of FIG. 55;

FIG. 58 is a partial vertical sectional view substantially along section 58—58 of FIG. 55; and, FIG. 59 is a stepped horizontal sectional view along section 59—59 of FIG. 57.

Figure 2:
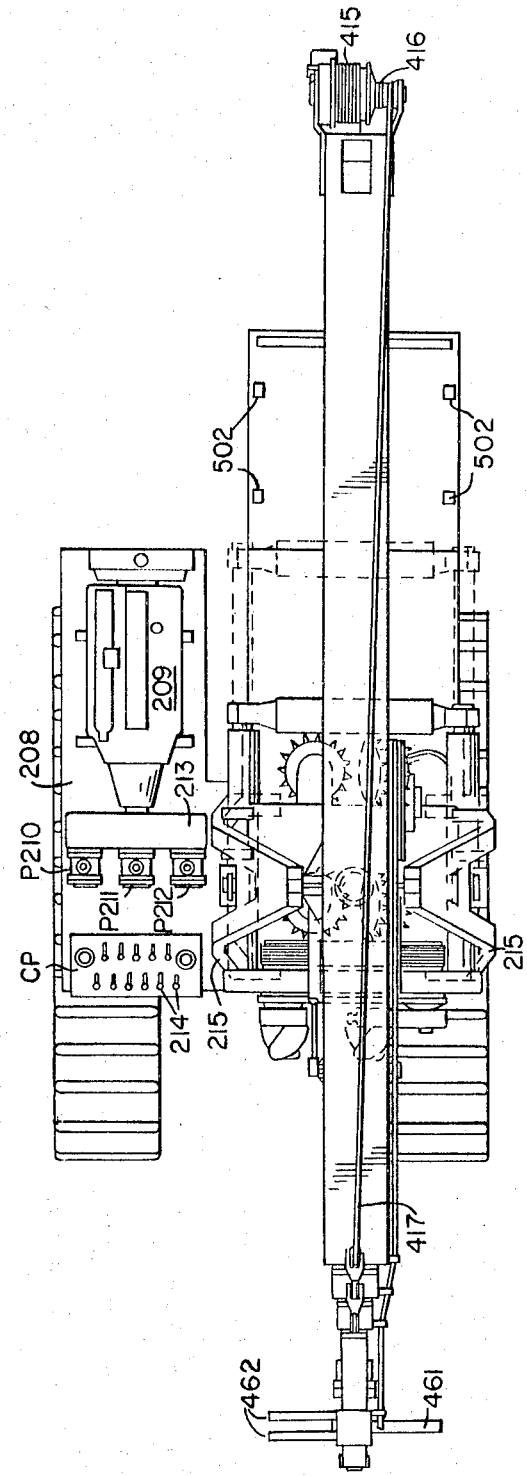
FIG. 2 is a top plan view of FIG. 1.
Figure 3:
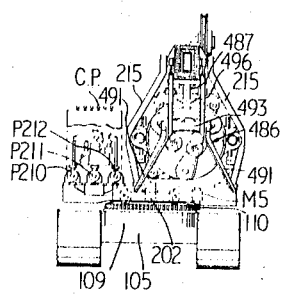
FIG. 3 is a front elevational view of the machine shown in FIG. 1 with the portion of the boom removed for the purposes of clarity.
Figure 60:
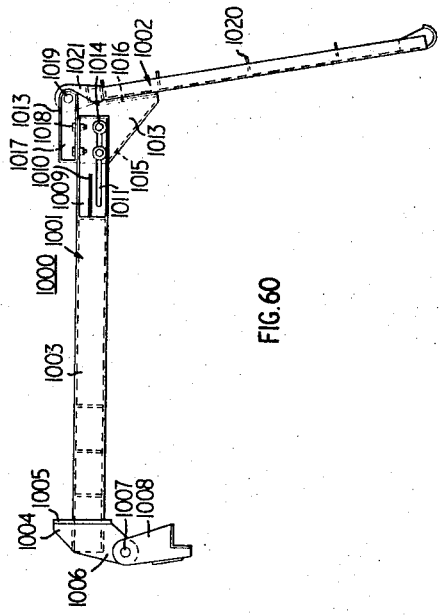
Figure 61:
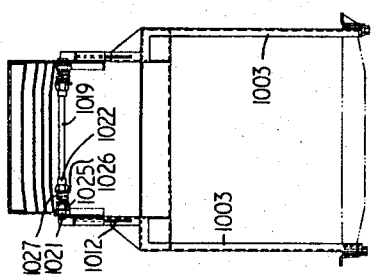
Figure 62:
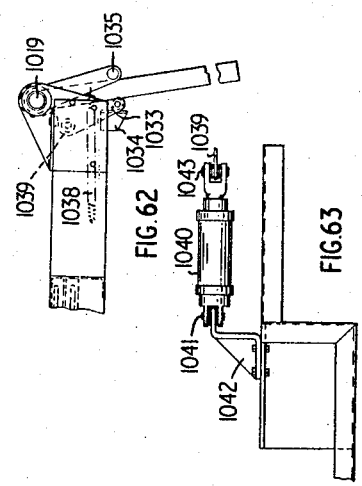
Figure 63:
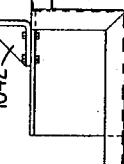
Figure 64:
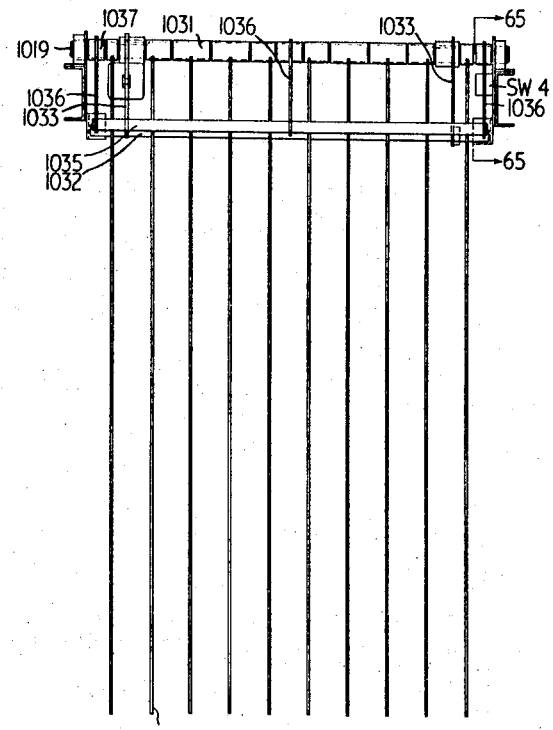
Figure 65:
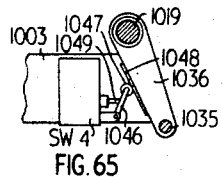
Figure 66:
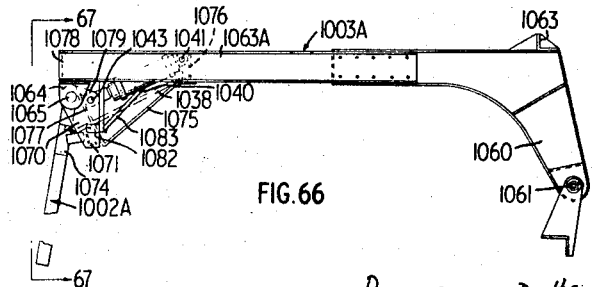
Figure 67:
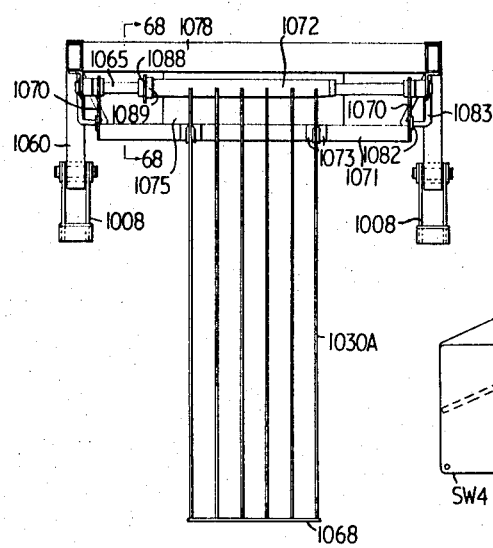
Figure 68:
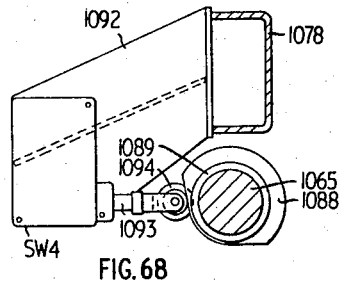
Figure 70:
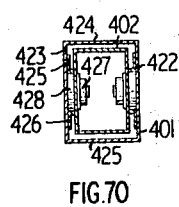
Figure 74:
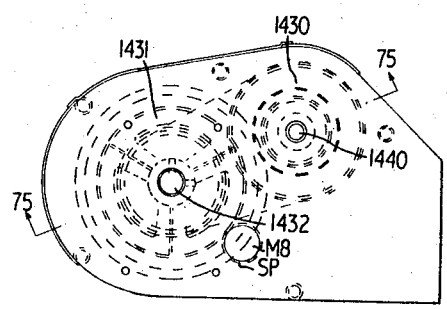
Figure 75:
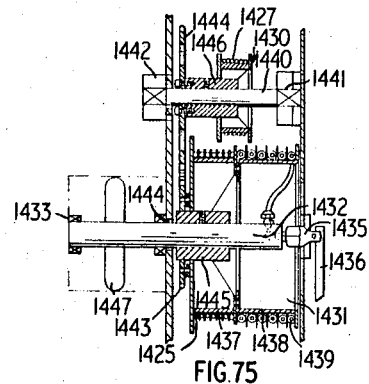
Figure 79:
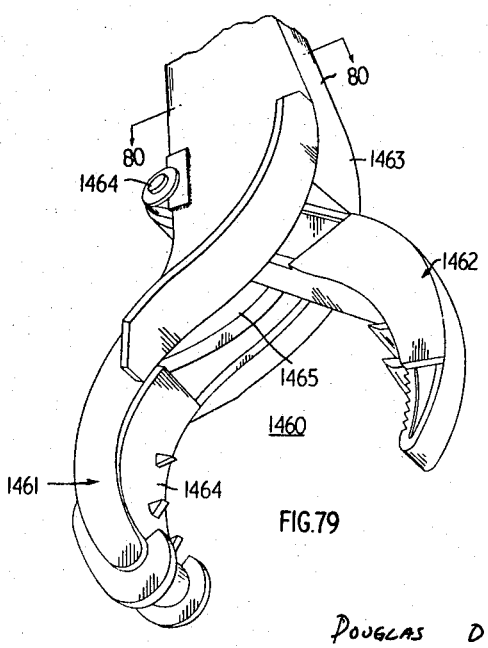
Figure 76:
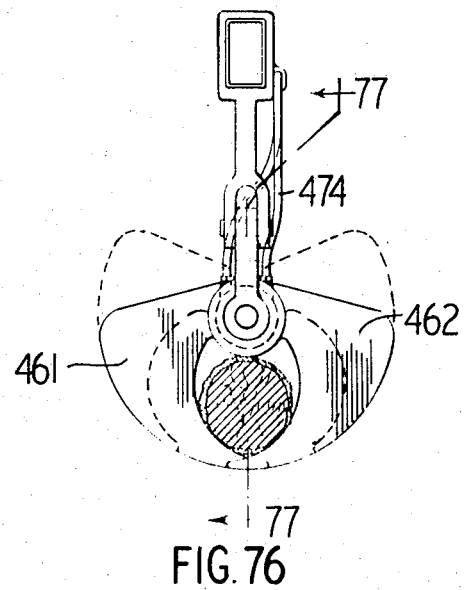
Figures 77, 78:
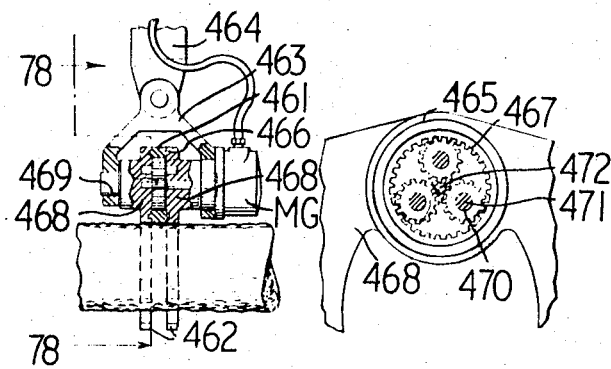

FIGS. 60 to 68 inclusive are various views illustrating the log measuring and chop control apparatus of the processing machine wherein;

FIG. 60 is a vertical side elevational view of the log measuring device consisting of a frame and a flapper pivotally mounted thereon;

FIG. 61 is a top plan view of FIG. 60;

FIG. 62 is a side elevation fragmentary view of a modified frame and flapper and including switch actuating means responsive to movement of the flapper to effect actuation of the slasher;

FIG. 63 is a partial top plan view of FIG. 62;

FIG. 64 is a rear elevational view of FIG 62;

FIG. 65 is a section along section 65—65 of FIG. 64;

FIG. 66 is a side elevational view of a further modified form of log measuring device including an alternate switch actuating means for initiating actuation of the shear or slasher;

FIG. 67 is a rear elevational view along line 67—67 of FIG. 66;

FIG. 68 is an enlarged sectional view along section 68—68 of FIG. 67;

FIGS. 69 to 80 inclusive are various views of the boom and grapple assembly for the processing machine wherein;

FIG. 69 is a vertical sectional view of the boom on the machine illustrated in FIGS. 1 to 3 inclusive, the boom being broken along its length;

FIG. 70 is a vertical cross-sectional view along section 70—70 of FIG. 69;

FIG. 71 is a vertical elevational view of a modified form of boom utilized on the machine illustrated in FIGS. 4 to 7 inclusive;

FIG. 72 is a vertical cross-sectional view along section 72—72 of FIG. 71;

FIG. 73 is a vertical sectional view along section 73—73 of FIG. 71;

FIG. 74 is a side elevational view of the sheave and drum assembly for effecting extension and retraction of the boom illustrated in FIG. 71;

FIG. 75 is a horizontal section along section 75—75 of FIG. 74;

FIG. 76 is a front elevational view of a grapple located at the free end of the boom of the type illustrated in FIG. 69;

FIG. 77 is a sectional view along section 77—77 of FIG. 76;

FIG. 78 is a front sectional view along section 78—78 of FIG. 77 illustrating further detail whereby the jaws of the grapple are movable;

FIGS. 79 to 81 inclusive illustrate a modified form of grapple wherein;

FIG. 79 is an oblique elevational view of such modified grapple;

FIG. 80 is a sectional view substantially along section 80—80 of FIG. 79 and of the grapple;

FIG. 81 is a vertical cross-sectional view of the grapple illustrated in FIG. 78 taken along an axis normal to the cross-sectional view of FIG. 80.

Figure 82:
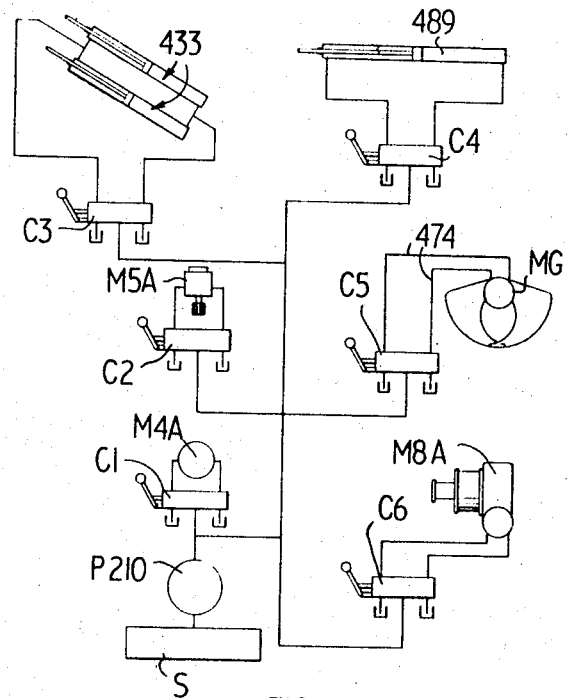
Figure 84:
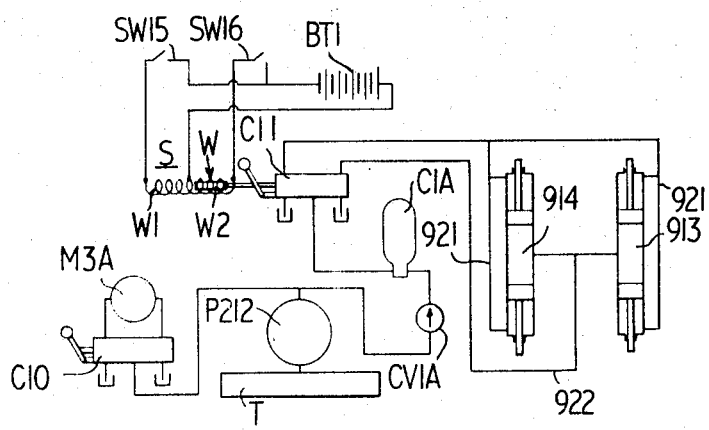
Figure 83:
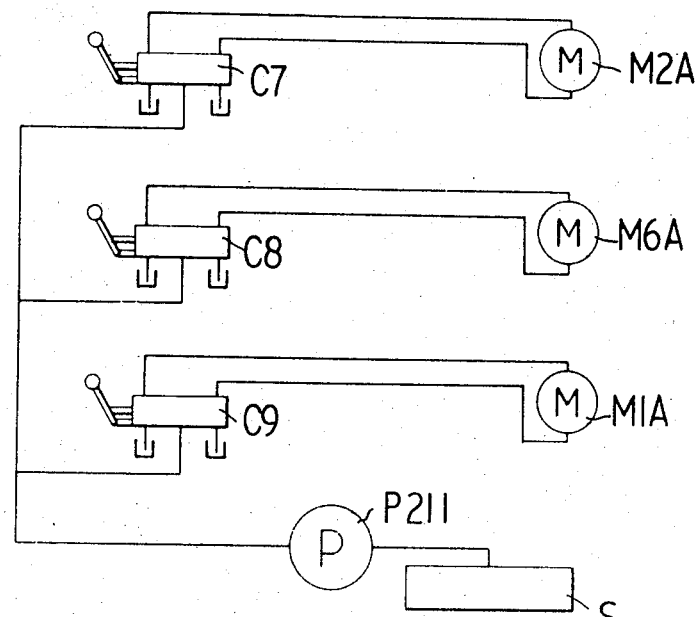
Figure 85:
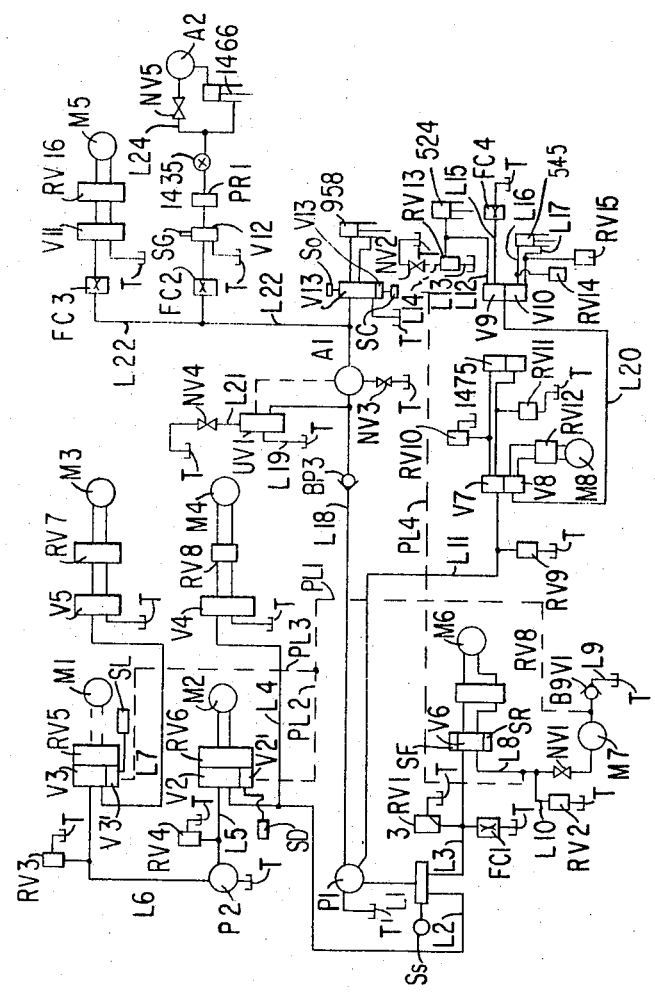
Figure 86:
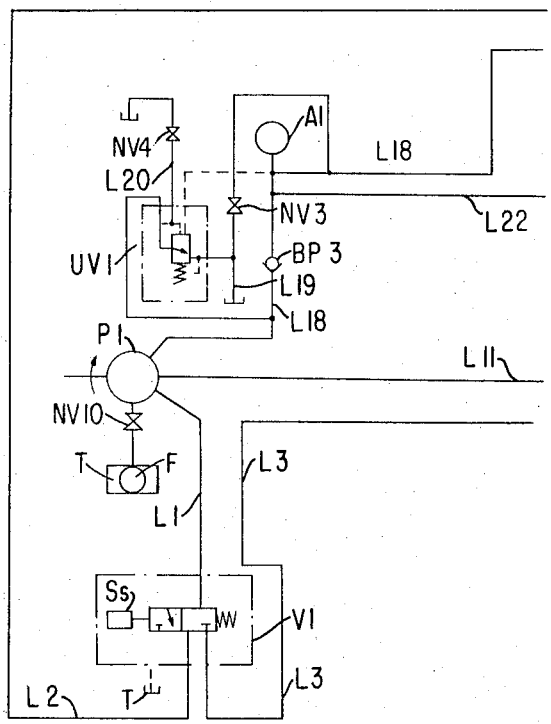
Figure 87:
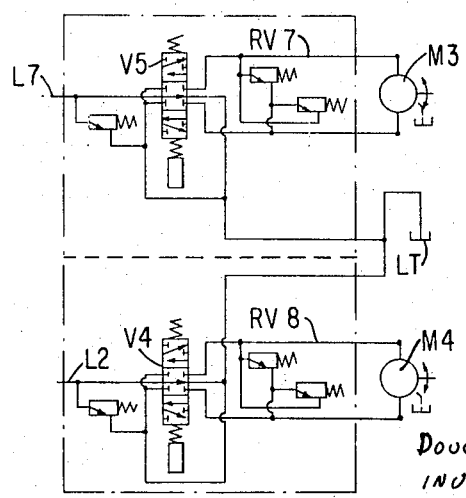
Figure 88:
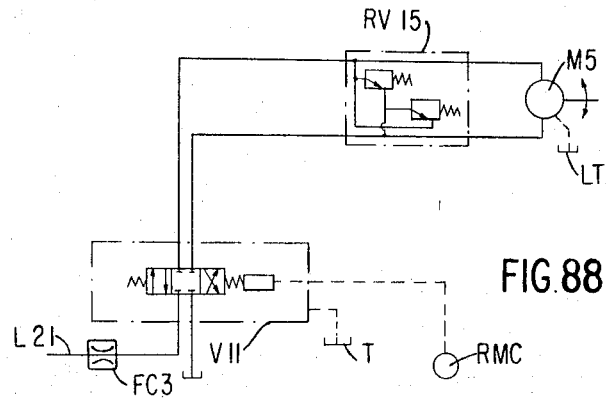
Figure 89:
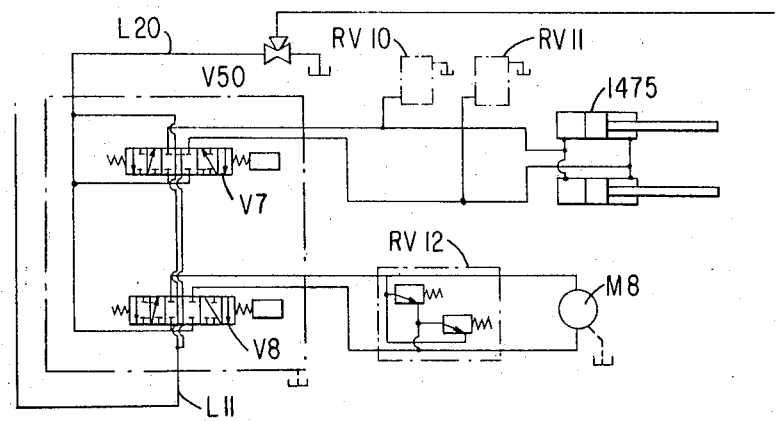
Figure 90:
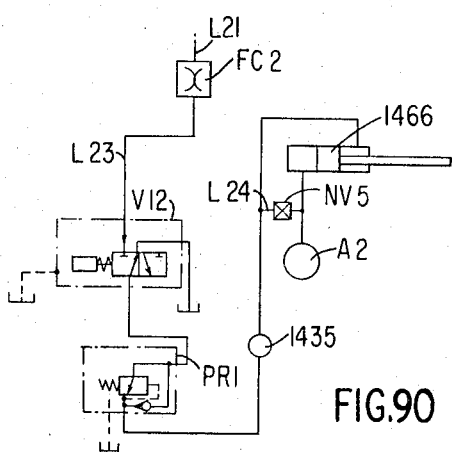
Figure 91:
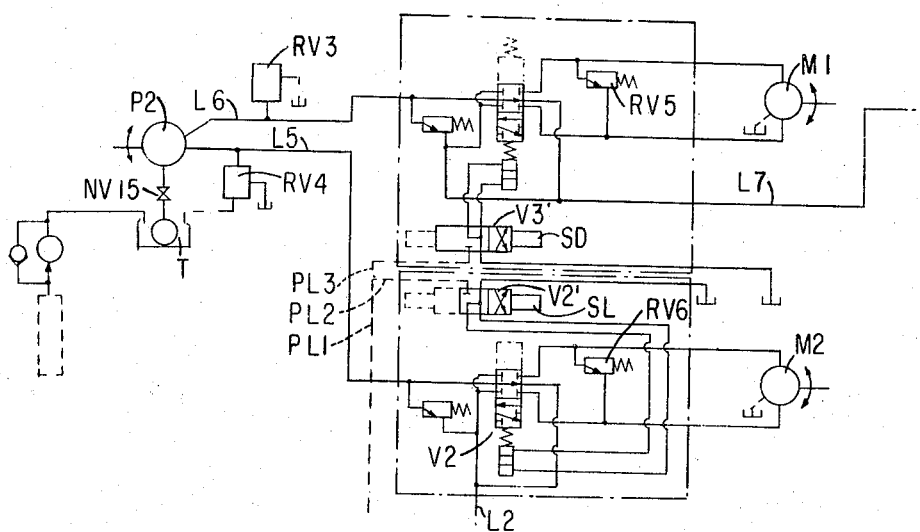
Figure 92:
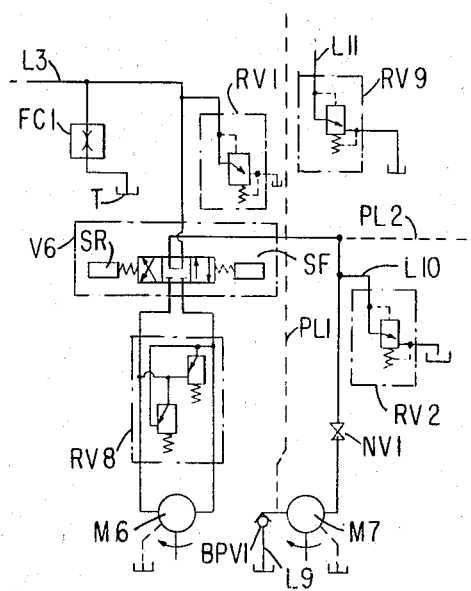
Figure 93:
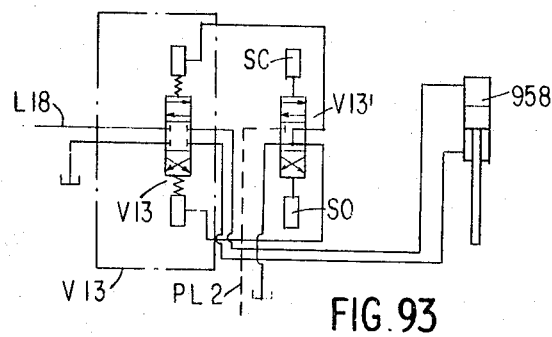
Figure 94:
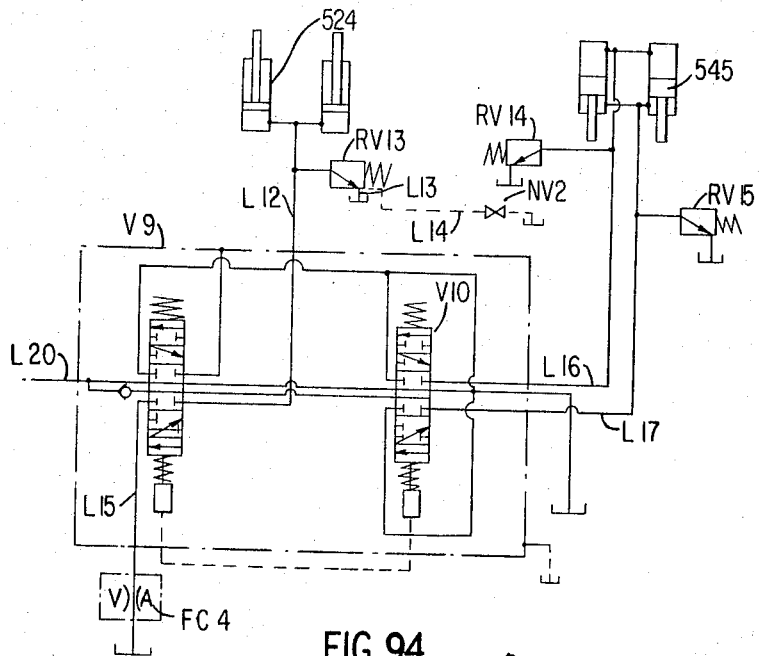
Figure 95:
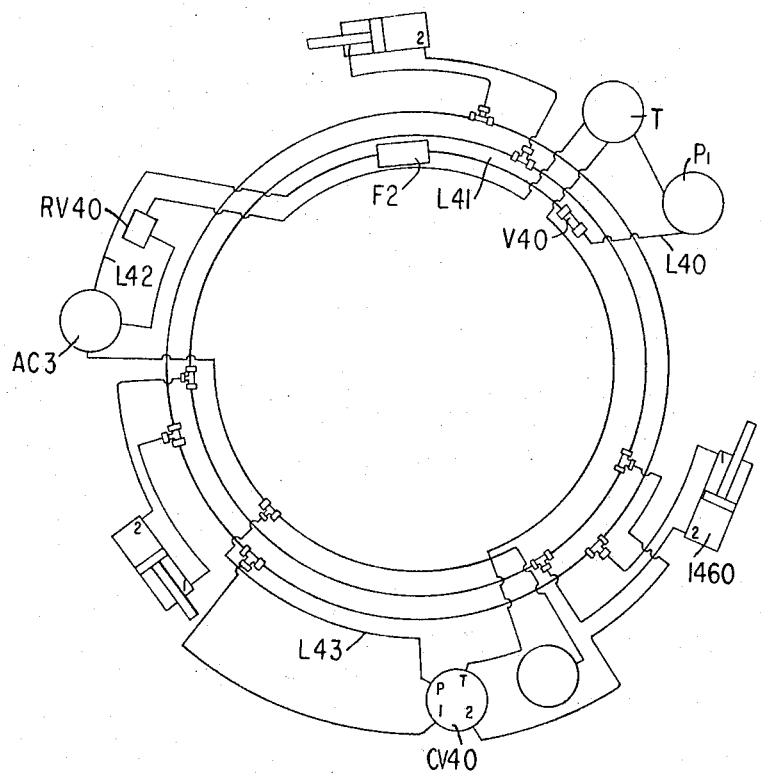
Figure 96:
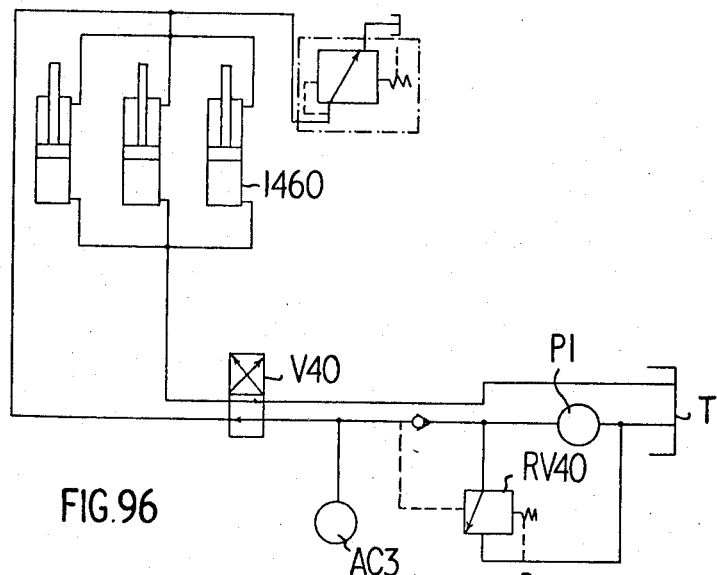
Figure 97:
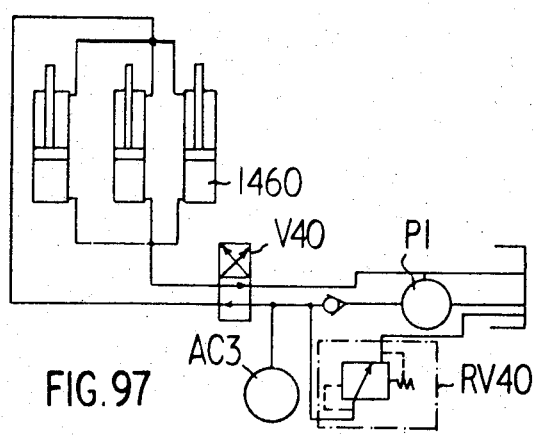
Figure 98:
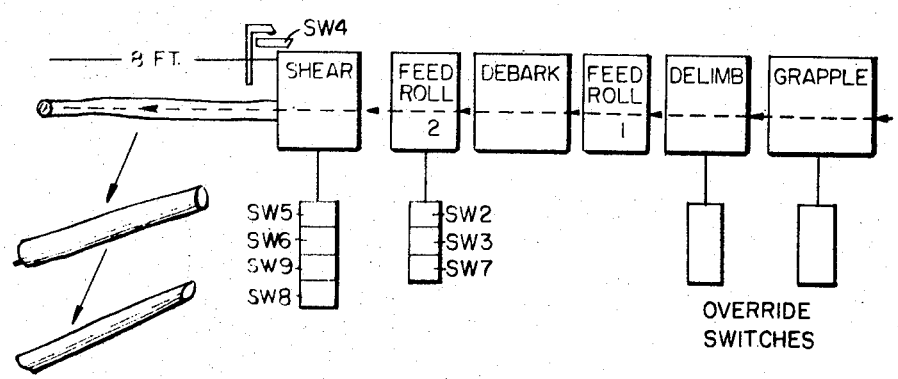
Figure 99:
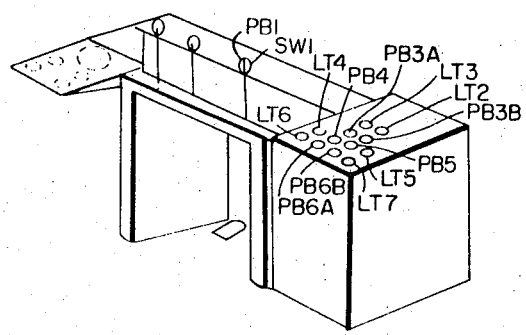
Figure 100:
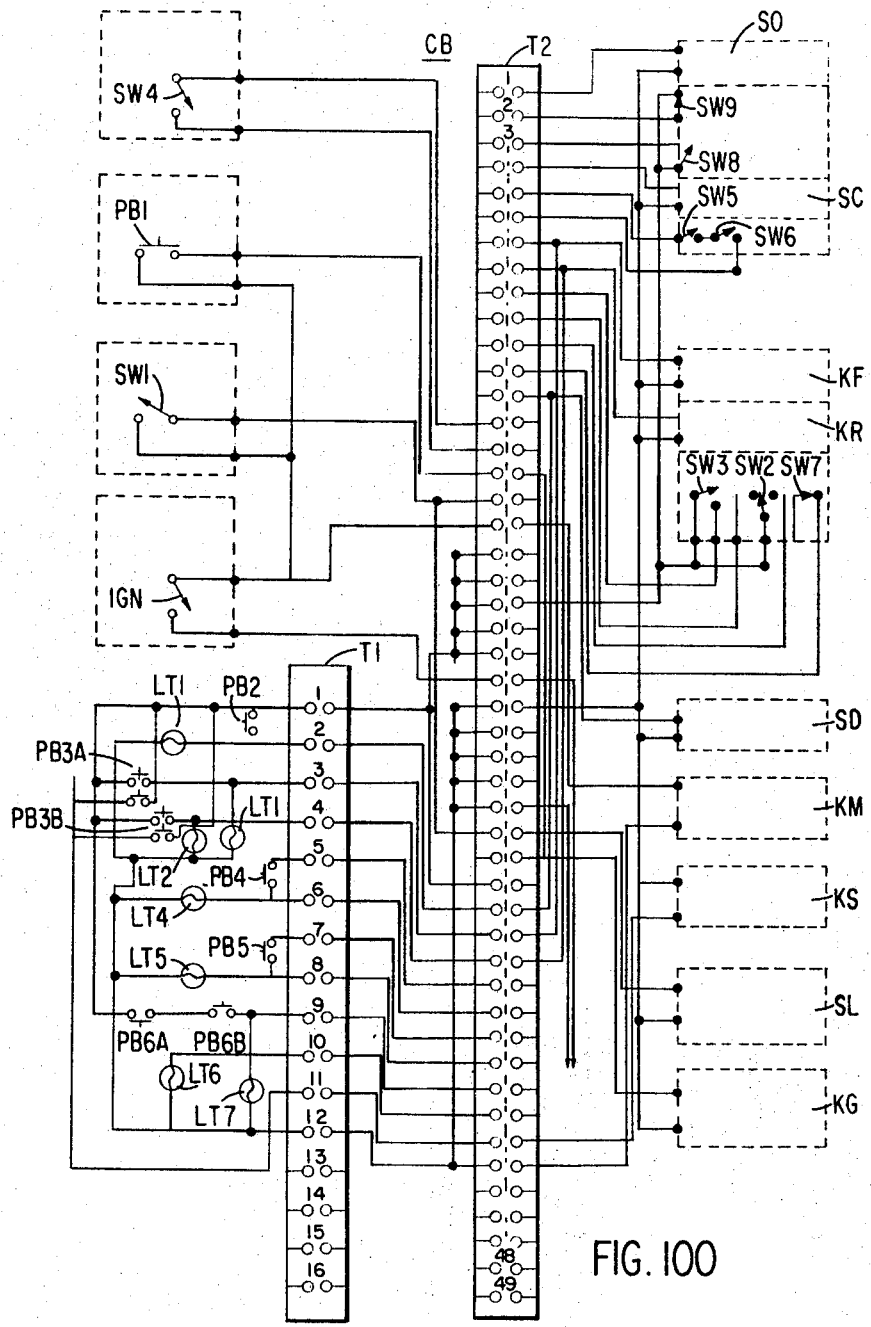
Figure 101:
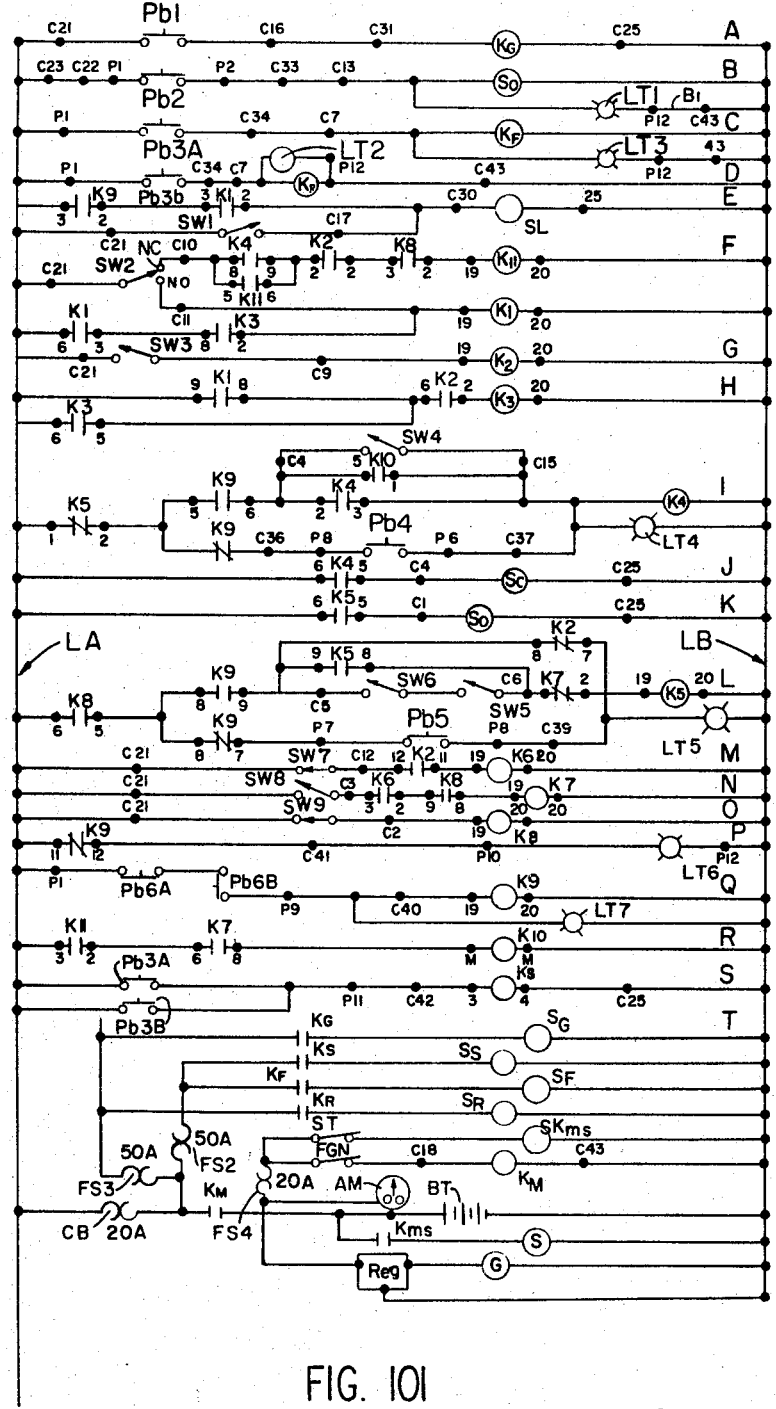
Figure 102:
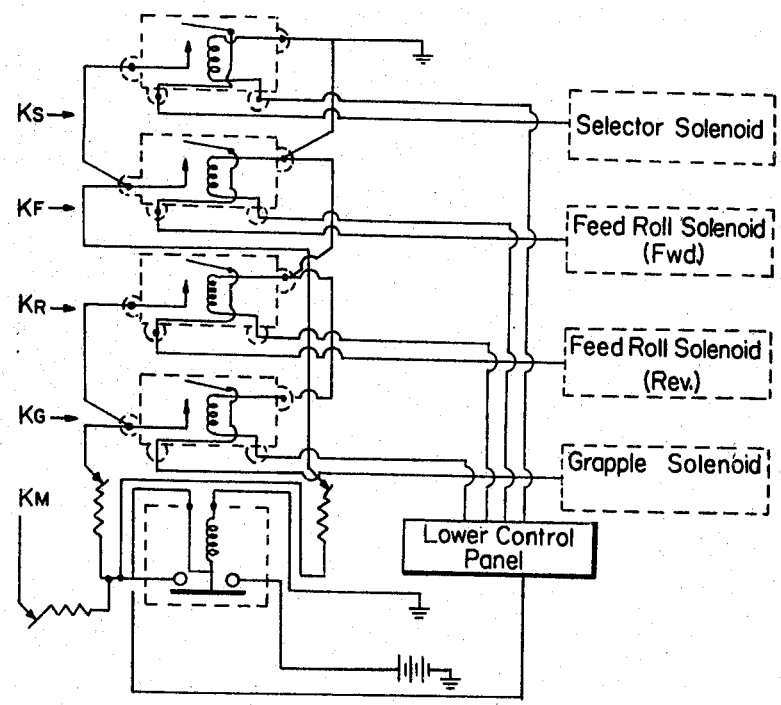

FIGS. 82 to 95 inclusive are various schematics of the hydraulic system wherein;

FIGS. 82 to 84 inclusive are schematic views of the hydraulic system for effecting operation of the various processing units and controlling mobility of the processing machine illustrated in FIGS. 1 to 3 inclusive;

FIG. 85 is a partial block and schematic illustrating the overall hydraulic system for the modified machine illustrated in FIGS. 4 to 7 inclusive;

FIGS. 86 to 94 inclusive are detailed schematics of the hydraulic system of the various sections of FIG. 85 wherein;

FIG. 86 is a schematic of the pump and pressure release valve assembly;

FIG. 87 is a schematic of the hydraulic system of the vehicle track motors and controls therefor;

FIG. 88 is a schematic of the hydraulic system for the slewing motor;

FIG. 89 is a schematic of the hydraulic system for the boom lift and winch motor;

FIG. 90 is a schematic of the hydraulic system for the grapple of the winch;

FIG. 91 is a schematic of the hydraulic system for the delimber and debarker motors;

FIG. 92 is a schematic of the hydraulic system for the feed and clearing roll;

FIG. 93 is the hydraulic for the shear cylinder, and,

FIG. 94 is the hydraulic for the cradle system;

FIG. 95 is a schematic of the hydraulic system for the delimber of FIGS. 24 and 25;

FIG. 96 is a further schematic of the hydraulic system for the delimber;

FIG. 97 is an alternative arrangement of the hydraulic system illustrated in FIG. 96;

FIGS. 98 to 102 are various schematic and block diagrams of the electrical system for the processing machine illustrated in FIGS. 4 to 7 inclusive;

FIG. 98 is a block diagram generally indicating the processing operation for the machine including a representation of the relative positioning of sensing switches and override switches;

FIG. 99 is an oblique diagrammatic illustration of the operator control area having a panel box enclosing a portion of the electrical circuitry;

FIG. 100 is a partial block and schematic illustration of the electrical system;

FIG. 101 is a schematic illustrating the electrical circuitry for the machine; and, FIG. 102 is a schematic of a group of relays illustrating their inter-relationship.

General arrangement of machine

Illustrated in the drawings are two embodiments of a self-propelled tree processing machine. One embodiment is illustrated in FIGS. 1 to 3 inclusive and a second embodiment is illustrated in FIGS. 4 to 7 inclusive. Each of the embodiments includes a tractor assembly 100 having a frame assembly 200 mounted thereon to pivot about a vertical axis. A sub-frame assembly 300 is secured to the frame 200 and mounted to pivot generally about a horizontal axis, and includes a plurality of tree processing units to be described in detail hereinafter. Carried upon the upper end of the frame 200 is a boom and grapple assembly 400 for engaging and introducing an end of the tree directly into the first of the processing units. Also mounted upon the frame 200 adjacent an end thereof is a cradle 500 providing a receiving and stacking station for the processed bolts.

The machine illustrated in FIGS. 4 to 7 inclusive also includes a log measuring apparatus indicated generally by the reference numeral 1000.

The processing units include a delimber 600, a debarker 700, one or two sets of feed rolls 800 and shears 900. The processing units are mounted on the machine in substantially horizontal tandem alignment such that they perform their processing function simultaneously on a single tree bolt at horizontally spaced positions. A tree bolt being processed passes in sequence through the individual processing units of the combination being used. A plurality of trees are processed in sequence, each tree passing through the machines in a path substantially along the axis thereof. A grapple 460 provided with a pair of movable jaws is suspended from the free end of an extendable and retractable boom 410. The processing units mounted on beams and constituting the sub-frame assembly, the cradle, and the boom and grapple assembly, are all mounted on the tractor 100 to pivot about a generally vertical axis. The boom is further pivoted about a substantially horizontal axis to allow lowering and raising of the grapple. Since the tractor unit is movable, the machine can be operated to process felled trees lying on the ground at various locations. The boom is extendable and thus adapted to grab trees outwardly away from the machine to the extent of the reach of the fully extended boom.

The processing machine components 100, 200, 300, 400, 500, 600, 700, 800, 900 and 1000 will be individually described in detail hereinafter. For convenience of description, hereinafter, the left and right end of the machine as viewed in FIGS. 1 and 4 will be referred to respectively as the front and rear end of the machine. The axis extending through the front and rear end will be referred to as the longitudinal axis and the axis normal thereto will be referred to as the transverse axis of the machine.

Tractor

The tractor 100 illustrated in FIGS. 1 to 3 inclusive consists of a pair of treads 101 each entraining an idler 102 and a drive wheel 103. The idler and drive wheels of each tread are journalled respectively adjacent opposed ends of a beam member 104, the beams 104 being interconnected by cross members or beams 105. The idlers are adjustable longitudinally along respective ones of the beams by a mechanism generally indicated at 106 whereby the tension in the treads may be adjusted. The drive wheels at opposite sides of the machine are driven by respective ones of hydraulic motors M3A and M4A through a link chain 108 and a pair of gears fastened respectively to the motor shaft and the drive wheel 104. The motors M3A and M4A are driven by a suitable power source mounted upon the frame 200 as will be described hereinafter.

Hydraulic motors are preferable, however, electrical motors can be substituted therefor. The motors are controlled individually and thereby provide means for steering the tractor in moving from one place to another.

A platform 109 is secured to and supported by the cross beams 105. The platform has a generally horizontal upper surface and secured thereto is an external ring gear 110. The ring gear, as will be seen hereinafter, is used for slewing or pivoting the frame about the vertical axis.

A self propelled processing machine is preferable and an endless track type of tractor is also preferred to provide such a self propelled vehicle. The processing machine however may be mounted upon a wheeled tractor. The tractor, or self propelled base for the processing machine also may be replaced by a trailer or a skid type of support. A fixed base even may be utilized where mobility is unnecessary. In the event of a skid type support or trailer, the apparatus or machine may be towed or otherwise propelled by a tractor unit. The endless track tractor, however, is preferred as it is most suitable for mobility in the type of terrain where the processing machine is generally used.

The tractor 100 illustrated in FIGS. 4 to 7 inclusive is somewhat different in construction from that shown in FIGS. 1 to 3. The tractor 200 shown in FIGS. 1 to 3 includes a pair of treads 101A each traversing an idler 102A and sprocket 103A. The idler and sprocket are journalled adjacent opposite ends of a beam 104A and the pair of beams are interconnected by a series of cross beams 105A.

The tracks at opposite sides of the machine are driven by respective ones of a pair of motors M3 and M4 and associated transmissions 107A mounted intermediate the tread units on the interconnecting framework and cross beams.

A platform 109A is supported upon the cross beams 105A. The platform provides a substantially flat upper horizontal surface 109B and supported thereupon and rigidly secured thereto is an external ring gear 110A. The inner part of the ring gear forms one part of a mono-race bearing whereby the frame to be described hereinafter is pivotally mounted upon the tractor unit. The mono-race (see FIG. 8) additionally includes an inner ring 112A with a plurality of balls or bearings 111A disposed between such ring and the internal surface of the ring gear. The internal ring 112A has an upper surface 114A located vertically above the adjacent surface of the ring gear. This surface supports the frame 200 to be described hereinafter and such frame is rigidly secured thereto.

The hydraulic motors are preferable however electric motors may be used as previously indicated. Alternatively, a power plant may be mounted intermediate the tracks in driving relation therewith through a transmission and clutch assembly as is common in track vehicles.

The tractor 100 provides a mobile base for the frame and various processing components and apparatus mounted thereon and provides a self propelled processing machine.

Frame

In the machine illustrated in FIGS. 1 to 3 inclusive, the frame 200 consists of a base 201 pivotally mounted upon the platform 109 of the tractor unit by a pin assembly 202. The base 201 is balanced and further supported by a plurality of wheels 203. The wheels are pivotally mounted by pins 204 to the base 201 and are disposed to follow in a substantially circular track upon the upper surface of the ring gear 110.

A hydraulic motor M5 having a pinion 206 is carried by the frame 200 and is mounted such that the pinion meshes with the ring gear 110. The motor, is provided with suitable controls whereby the frame 102 is selectively rotatable about the vertical axis which passes through the pin assembly 202. The base 201 includes a horizontal rearwardly extending portion 207 and a laterally extending portion 208. The extending portion 208 (see FIG. 2) provides a platform supporting a power source 209.

The power source may be diesel engine, a gasoline engine or the like and in the event hydraulic motors are used to drive the tractor and drive the processing units to be described hereinafter, a plurality of hydraulic pumps are driven by the power source. In FIGS. 2 and 3 three hydraulic pumps P210, P211 and P212 are shown secured to a transmission 213 driven by the motor 209. Electrical generators would be substituted for the hydraulic pumps in the event electrical motors are used.

Controls for the motors are located on a control panel C.P. on the platform forwardly of the motor. The controls may be located at any place in the machine which provides a convenient location for the operator.

The frame 200 further includes a pair of laterally spaced generally upright A frames 215, each of which is notched at the upper edge thereof as at 216 for, as will be seen hereinafter, pivotally supporting the boom and winch assembly 400. Each frame 215 has a horizontal bar 217 apertured to receive a pin 218. A hanger 219 is suspended from the bar 217 by the pin 218 and pivots about a horizontal axis transverse of the machine. Each hanger is apertured so as to provide a collar 220 for receiving a tubular beam of the sub-frame assembly 300 to be described in detail hereinafter.

The pair of A frames 215 are disposed in spaced relationship laterally of the machine and the upper end of each frame, extending roughly from the cross bar 219 upwardly slopes inwardly toward the other frame. This positioning provides a relatively wide space between the frames adjacent the lower end for receiving the sub-frame assembly therebetween, and a relatively small space at the top to provide a rigid support for the boom and grapple assembly.

In the machine illustrated in FIGS. 4 to 7 inclusive, the frame 200 consists of a base 201A supported upon the upper surface 114A of the inner ring 112A of the mono-race. The base is rigidly secured to the inner ring 112A to rotate and be guided by the mono-race. This race replaces the pivot assembly 202 described in the other embodiment. A hydraulic motor M5A is secured to the base and includes a pinion 206A meshing with the ring gear 110A. The hydraulic motor is driven by a pump P210 such pump being driven by the main power source 209. The base includes a rearwardly extending portion 207A having the cradle 500 detachably secured thereto. The base also includes a laterally extendig portion providing a platform for supporting a motor or power source 209 thereon as is the case in the other embodiment. Forwardly of the motor is a cab assembly 221A housing the controls on a control panel C.P. and providing an enclosure to protect the operator.

Detachably, but rigidly secured to the base, and projecting upwardly therefrom in laterally spaced relationship is a pair of A frames 215A. The pair of A frames each form a cradle pivotally to support a tubular beam and the pair of frames together form a cradle pivotally to support the sub-frame assembly 300 to be described hereinafter. Each of the A frames (see FIGS. 16 and 17) consist of a welded "I" beam construction forming a pair of legs 250 and 251 interconnected at the upper end by a beam 252. The "I" beam consists of a web 253 extending transversely of the machine and a pair of flanges 254 and 255. Each of the flanges 254 and 255 in the beam portion 252 is notched as at 256 for receiving a pin pivotally to mount the sub-frame assembly 300 thereon. A tubular beam to be described later with reference to the sub-frame assembly is pivotally mounted by the pin and disposed between the flanges 254 and 255. Pivotal movement of the beam is limited by a spaced pair of stop members 257 and 258. The stop 257 consists of a rubber pad 259 secured to a lug 260 mounted on a plate 261 interconnecting the flanges 254 and 255. The stop 258 consists of a rubber pad 262 secured to a bar 263 by a mounting bracket 264. The bar 263 is rigidly secured to and traverses the flanges 253 and 254. The rear stop 258 is located such that the beam is substantially horizontal when in abutment therewith and the stop 257 is vertically therebelow such that the beam dips downwardly forwardly approximately 30° when in abutment therewith. It is conceivable that the rubber stops on the abutments both at the front and rear may be provided with adjustable mountings such that the limit of pivotal movement can be varied. The stops may, for example, be supported upon hydraulic cylinders. Alternatively, the beams may be connected to respective ones of the A frames or the frame 200 by hydraulic cylinders.

Secured to each of the legs and projecting upwardly therefrom is a strut 264. The strut is a tubular member secured to the A frame by a U-shaped member 265. Each of the tubular struts projects upwardly and inwardly towards one another terminating at the upper end in a substantially horizontal portion 266. The horizontal portions are substantially in alignment and disposed in spaced relationship to receive a boom mounting pin 267 therebetween. The pin includes a central portion 268 with a pair of collars 269 at opposed ends thereof. Projecting outwardly from the collars is an extending portion 270 received in the tubular portion 266. The boom and grapple assembly 400 is pivotally mounted by a bearing 461 (see FIG. 6) upon the portion 268 of the pin. The projecting portion 270 of the pin and the portion 266 may be rigidly secured together by a bolt by welding or the like so as to rigidify the structure. Reinforcing in the longitudinal direction (see FIGS. 4 and 5) is provided by a pair of bars 272 secured by a pin 273 projecting through aligned apertures in lugs 274. The lugs 274 are secured to the strut portion 266 and the latter portion is reinforced by gusset members 275. The bars 272 extend rearwardly and are rigidly secured at their opposite ends to a framework 276 projecting upwardly from the base rearwardly projecting portion 201A. Each of the legs is further braced by a pair of rods 277 and 278 anchored to the framework 276. The framework 276 as will be seen hereinafter provides means of securing the cradle assembly on the machine and consists of a pair of uprights 279 interconnected at their uppermost end by a crossmember 280 (see FIG. 6).

*Sub-frame assembly and combination and sub-combinations of processing units*

The sub-frame assembly 300 is mounted on the frame 200 to pivot about a substantially horizontal axis transverse of the machine. The sub-frame assembly 300 (see FIGS. 10 and 11) consists of a pair of spaced, substantially parallel, tubular beams 301 interconnected and secured rigidly together by a plurality of processing units detachably secured thereto. The processing units, which will be described in detail hereinafter, include a delimber 600, feed rolls 700, a debarker 800 and a slasher 900 which may be used in varous combinations or sub-combinations depending upon the desired tree processing operation. In FIGS. 1–3, and 9 each of the beams 301 is suspended substantially intermediate its ends on a pair of hanger assemblies 219. Each hanger, as described, includes an aperture providing a collar 220 for receiving the beam. The collar permits the beams to be slid therealong such that the hanger can be positioned to balance and thus retain the processing units in a normal desired rest position with respect to the horizontal, the purpose of which will become more apparent hereinafter.

In the embodiments illustrated in FIGS. 4 to 7 and 10 to 14, each of the beams 301 is pivotally supported on the A frames 215A by a block 302 having trunnions 303 projecting therefrom. Each block is apertured to receive the tubular beam such that the beam may be slid therealong. A set screw arrangement may be utilized to lock the beam and block in a fixed relative position, or alternatively, the trunnions 303 my be replaced by a single pin extending through the block and aligned apertures in the beam. The latter arrangement would apply where a slasher was mounted in a manner to be described hereinafter. The trunnions 303 are received in the notches 256 and thereby pivotally mount the beams in respective ones of the A frames.

The beams may be free-floating; that is, free to pivot about the horizontal axis as illustrated for example in FIGS. 16 and 17, or alternatively, the beams may be controlled so as to selectively adjust the angle of inclination thereof with respect to the horizontal. In FIG. 15, a pair of hydraulic cylinders 304 are shown interconnecting the beams 301 and respective ones of a pair of legs of the A frames 215. Each of the hydraulic cylinders includes a cylinder 305 pivotally connected to the A frame 215 by a pin 306 and a movable piston rod 307 anchored to a lug 221 fastened to and extending downwardly from the hanger assembly 219.

The hydraulic cylinders may be of a double or single acting type arranged in such a manner as to provide positive control in each of two directions about the pivot axis provided by the pin 218.

The hydraulic cylinders 304 may be controlled so as to lock the sub-frame assembly in a selected position during a certain interval in relation to a selected phase of the tree processing operation. The cylinders during the remaining processing operation would be such as to allow the frame to pivot freely. Locking of the sub-frame is sometimes desirable during the interval the tree trunk is being cut by the shears. This would be so, where, for example, the shears are mounted in a manner so as not to pivot with the sub-frame assembly.

The sub-frame assembly 300 can be removed from the machine as a single unit, however, in the embodiment of the machine shown in FIGS. 1 to 3 inclusive and 15, it is necessary to remove the pins 218. To effect this, the sub-frame assembly must be supported to relieve the force on the pins. After removal of the pins, the entire sub-frame assembly may then be carried horizontally forwardly or rearwardly to remove it from between the A frames 215. Removal, may be effected but in some instances may be somewhat awkward. Also supporting the assembly while inserting the pin also may be difficult. In the embodiments illustrated with reference to FIGS. 4 to 7 inclusive, the notch 256 in the upper edge of the A frame permits the entire sub-frame assembly 300 to be removed by lifting it vertically so as to remove the trunnions or pins 303 from the notch 256. The weight of the unit retains the sub-frame assembly in position; however, locks may be provided if necessary in field operation.

The sub-frame assembly 300, as previously mentioned, includes a plurality of processing units detachably secured thereto. Each of the processing units except the shear unit is detachably secured to the beams by collars either having removable cap portions partially embracing the beam or entirely embracing the beam and slidable off the end thereof. Respective ones of a pair of collars on the processing units is located at opposite edges of the processing units. An important feature is that the processing units are individually mounted and are removable. This facilitates removal of the unit requiring repair and a further workable unit may be substituted therefor cutting down lost time in field operation. The detachable independent securement of each unit facilitates substitution of one unit for another and removal of units to provide various combinations and sub-combinations of processing units that may be desired.

Two embodiments of collars for securing the processing units are shown. The collars may be split along a vertical diameter as for example shown in FIG. 18, or alternatively they may be split along a horizontal diameter as shown in FIG. 38. The horizontal split facilitates inserting and removing the processing units, particularly those located inwardly from the ends of the beams.

In the case of a horizontally split collar, the lower portion is the removable cap and this facilitates removal such that the unit may be supported by the upper arms. Upon removal of the cap portion, the entire processing unit may then be lifted vertically and removed from the sub-frame assembly.

FIGS. 9 to 14 inclusive illustrate various combinations and sub-combinations of processing units. FIGS. 9, 10 and 11 inclusive illustrate the combination of a delimber unit 600, a debarker unit 700, two sets of feed rolls 800 and a shear unit 900. In FIG. 12, the combination of processing units includes a delimber unit 600, two sets of feed rolls 700 and a debarker unit 800. These processing units, secured to a pair of the beams 301 (only one being shown) supported by a pair of A frames 215A. Diagrammatically illustrated also is a telescopic boom and grapple assembly 400. These units are mounted upon a tractor of the type illustrated in FIGS. 1 to 7 or some other equivalent base as previously described.

In the processing units illustrated in FIG. 9 it will be noted that there are two sets of feed rolls 800 and that such sets are secured to the debarker unit 700. In the embodiment illustrated in FIG. 10, there are two independent sets of feed rolls having their own individual frame detachably secured to the beams.

In FIG. 13, the combination of processing units includes a delimber 600, one pair of feed rolls 700, a debarker 800, all of which are mounted on a pair of beams 301 pivotally supported A frames, 217A. Included in the combination is a telescopic boom and grapple assembly 400.

In FIG. 14, the combination includes a delimber unit 600 and one set of feed rolls mounted by a pair of beams pivotally supported upon A frames 217A. Also included is a telescopic boom and grapple assembly 400. In each of the combinations the telescopic boom and grapple assembly 400 provides means for selecting, lifting and feeding the lifted end of a tree directly into the first processing unit.

In the combination of processing units illustrated in FIG. 9, the delimber 600 is driven by a hydraulic motor M2A. The debarker 700 is driven by a hydraulic motor M1A and the two sets of feed rolls are driven by a single hydraulic motor M6A. In the combination of the processing units illustrated in FIGS. 10 and 11, the delimber 600 and the debarker 800 are driven respectively by hydraulic motors M2 and M1. One set of feed rolls 800 is driven by a hydraulic motor M6 and the other set of feed rolls is driven by the same motor through a propeller shaft 325.

Delimber unit

One embodiment of the delimber 600 is shown in FIGS. 1 to 3, 9, and 18 to 23 inclusive and a second embodiment is shown in FIGS. 10, 11 and 24 to 31. The delimber 600 in FIG. 9 is located between and detachably secured to the tubular beams 301 and includes a stationary housing 601 and a housing 602 rotatably mounted thereon. The stationary housing 601 is detachably secured to the beams by a pair of split collars 603 having detachable cap portions 604. The rotary housing is carried by the stationary housing and is rotatable about an axis generally parallel to the longitudinal axis of the machine. The axis, as will be seen hereinafter, is also the axis along which the tree travels while being processed. The rotatable housing 602 is driven by a plurality of V belts 605 driven by a hydraulic motor M2A through a series of pulleys. The belts run on a flat peripheral drum surface of the housing or alternatively, fit into V grooves circumscribing the housing. Alternatively, other various means may be used, for example, the notches or V grooves in the housing may be replaced by a ring gear driven by a pinion in engagement therewith and connected to the motor.

A plurality of arms 607 are secured to the rotatable housing 602 so as to rotate therewith. The arms are pivotally mounted thereon such that they can oscillate about an axis generally parallel to the longitudinal axis of the machine. The free end of each arm is directed inwardly towards the center of the delimber unit and carried thereon is a cutter head 608. Each cutter head is driven so as to remove the limbs of the tree being processed. The oscillation of the arms about the pivotal axis is controlled, the arm being biased inwardly by a torsion spring 609 (see FIG. 19). Means is provided for driving the arms against this bias to move them outwardly for receiving a tree between the plurality of cutter heads. The free end of the arm includes a work engaging stop 610 or projection adapted to bear against the tree and thereby prevent the cutter head associated therewith from digging into and damaging the trunk as the tree is being processed.

Referring now to FIGS. 18 to 23 inclusive, the rotatable housing is supported upon a pair of bearings 611 carried upon the stationary housing. The stationary housing is a generally annular member and secured to one edge thereof by a plurality of pins or studs 613 is an internal ring gear 612.

The rotary housing is generally a hollow, toroidal member and each of the arms 607 is pivotally secured to one edge thereof by a shaft 614. The shaft 614 is journalled in a pair of spaced flanges 615 and 616. The flanges preferably are detachably secured to the housing as for example by a plurality of studs 617. The shaft 614 cantilevers outwardly forwardly from the front face 618 of the rotatable housing and terminates in a splined end 619. The splined end is received in a correspondingly shaped aperture in the arm such that the arm rotates with the shaft 614 the arm being retained or locked on the shaft by a nut 620. The arm 607 effectively is a hollow casing and includes an annular boss or flange 621 projecting into an aperture 622 in the front face 618 of the rotatable housing and an annular seal 623 is interposed therebetween. The free end of the arm is biased inwardly towards the central axis of the delimber unit by the spring 609 which is mounted on the shaft concentrically therewith and anchored at one end to the shaft and at the other end to the housing. One end of the torsion spring abuts a lug 623A on the flange 615 and the other end is anchored to a segmental gear 624 fixed on the shaft 614 and journalled in the flange 616. The segmental gear is locked to the shaft by a lock nut 625. A cluster gear assembly 626 (see FIGS. 20 and 21) is pivotally mounted on the flange 616 by a pin 627. The cluster gear 624 includes gears 628 and 629 meshing respentively with the segmental gear 624 and a gear 630. The gear 630 is secured to one end of a shaft 631 journalled in the spaced flanges 616 and 615 and secured to the outer end of the shaft is a gear and one way clutch assembly 632. A gear 633 of the gear and clutch assembly meshes with and is driven by the ring gear 612. The one-way clutch 632 is out of engagement while the rotatable housing is driven in a clockwise direction; that is, the direction in which it normally rotates for delimbing trees. Rotating the housing in the opposite direction causes the one-way clutch to engage and thereby rotate the shaft 631 which, through the previously described gear train, rotates the shaft 614 to move the arms 607 outwardly to an inoperative position for receiving the leading end of a tree to be processed. The clutch indicated by reference 634 may be any well-known type of clutch. The clutch, shown in FIG. 23 consists of a hub 635 having a plurality of cam surfaces consisting of arcuate notches or cam surfaces 636 disposed about the periphery thereof. A roller 637 is located in each of the notches rollingly to engage the cam surface. The rollers are each biased to a position to engage both the cam surface 636 and the surface 638 of a bore in the gear by a compression spring 639. Rotation of the hub in one direction causes the rollers to wedge against the cam surface and the surface of the bore in the gear and thereby rotate as a unitary structure. In the opposite direction, the rollers disengage the surface such that one member rotates freely without interference by the other. The amount of movement of the arm is limited by an abutment 661 on the segmental gear 624 which engages a wall 662 of the rotatable housing. This limits the open position of the arm. The closed position is limited by abutment of the work engaging stops 610 of adjacent arms.

Each arm 607 consists of a pair of housing members 640 and 641 detachably secured together by a plurality of studs 642. The arm is hollow and provides an area for enclosing a plurality of gears for driving the cutter head.

The cutter heads 608 are mounted on respective ones of the arms 607 adjacent the outer or free end thereof. Each cutter head is mounted on a shaft 643 journalled by bearings 644 and 645 respectively in housing members 640 and 641. Keyed to the shaft 643, intermediate the bearings, is a gear 646. A lock nut 647 is threaded onto the shaft and bears against the bearing 646 to hold the shaft in an assembled position. The other end of the shaft is tapered and keyed thereto is the cutter head 608 it being locked in position by a countersunk stud 648.

The cutter head gear 646 is driven by a pair of cluster gears 650 and 651. The cluster gear 650 includes gears 652 and 653 and is journalled in the arm by a pin 654. The gear 653 meshes with the gear 646. The cluster gear 651 includes a gear 655 secured to a sleeve 656 journalled to rotate on the shaft 614 by a bearing 657. The sleeve is journalled in the arm 607 by a pair of bearings 658 and 659 located respectively in housing members 640 and 641. A gear 660 is keyed onto the sleeve 656 to rotate therewith. The gears 655 and 660 rotate in unison and are journalled so as to rotate with respect to the shaft 202 and with respect to the arm 607. The gear 655 meshes with the internal ring gear 612 and rotation of the rotatable housing thereby causes the cutter head to rotate through the gear train 612, 655, 660, 652, 653 and 646. All of the cutter heads rotate in the same direction; however, if desired, an additional cluster gear assembly similar to gear cluster 650 can be inserted intermediate the gear 646 and the cluster 651 such that adjacent or certain ones of the cutter heads rotate in opposite directions. The rotatable housing is driven at a speed of roughly 100 to 130 r.p.m.'s and the gear train is such that the heads preferably run at around 2000 r.p.m.'s.

The vehicle illustrated in FIGS. 4 to 7 inclusive includes a modified delimber and such modified delimber is shown in detail in FIGS. 24 to 30 inclusive. The delimber includes a stationary housing 665 and a rotary housing 666 referred to hereinafter respectively as the stator and rotor. The stator is secured to the beams by a pair of lugs 667 which project outwardly from the stator casing and are notched to receive a portion of respective ones of the beams and a cap or collar 668 is detachably secured thereto. The stator (see FIG. 27) is generally L-shaped in cross-section having a generally flat planar end wall 669 and an outer generally circular wall 670 normal thereto. The planar wall includes a central aperture inscribed by a ring 671. As will be seen hereinafter, such ring retains the stator and rotor in an assembled position. The wall 670 of the stator includes an enlarged portion 672 closed by a pair of side walls 673 having aligned apertures for supporting a drive unit or coupling 675. The drive unit includes a housing 676 detachably secured to one wall 673 and a shaft 677 projecting therefrom and journalled in the other wall 673 by a bearing 674. The shaft is journalled in the housing 676 by a bearing 678 and keyed to the shaft 677 intermediate the journals is a gear 679. The drive unit includes a clutch or flexible coupling assembly 680 whereby a hydraulic motor M2 is detachably secured in a driving relationship with respect to the gear. An internal ring gear 682 having teeth 682A is detachably secured to the stator wall 669 on the inside thereof by a plurality of studs 681.

The rotor 666 (see FIGS. 28 and 29) consists of a generally annular plate 683 having a combined guide and fastening ring 684 adjacent the outer perimeter thereof and an annular collar or sleeve 685 journalled on the internal periphery by a thrust bearing 686. The thrust bearing 686 is adjustable by a threaded annular gland nut 687 and consists of a plurality of balls in 686A clampingly engaged between the gland nut and a flange 688 on the annular plate and a groove 689 in the outer periphery of the sleeve 685. The gland nut and flange provide a split race for adjustment. The other portion of the race is formed by the groove 689 in the outer periphery of the annular flange. The sleeve includes a series of apertures 690 in one edge thereof whereby the ring 671 of stator may be secured thereto by a plurality of studs 691 (see FIG. 30). The opposite end of the sleeve 685 includes a groove in the outer periphery thereof for receiving a sealing ring 692. The combined guide and fastening ring 684 at the outer periphery of the annular rotor plate consists of a body portion having a flange 693 projecting therefrom and apertured for detachable securement to the stator adjacent the outer periphery thereof by a plurality of studs 694. The ring and guide plate include an inner generally flat surface adapted to bear against a sealing ring 695 retained in a groove 696 in the outer periphery of the main portion of the rotor. The rotor plate 683 has an external ring gear 697 detachably secured thereto by a plurality of studs 697A. The ring gear 697 meshes with the gear 679 of the drive assembly whereby the rotor is driven by the motor M2.

The rotor plate 683 has three apertures 698 therethrough spaced from one another at 120° about the axis x—x of the delimber. A housing 699 (see FIG. 31) is journalled in each of the apertures by a collar 1600. The housing 699 is journalled within the collar 1600 by a pair of bearings 1601 and 1602. The housing extends outwardly from the bearing 1602 and terminates in an enlarged gear casing 1603. A shaft 1604 is journalled in the housing by a pair of bearings 1605 and 1606 and keyed to one end of the shaft is a gear 1607. The gear 1607 meshes with the internal ring gear 682 mounted on the stator. A bevel gear 1608 is keyed to the opposite end of the shaft and is enclosed in the enlarged gear casing portion 1603 of the housing. A cap or cover plate 1609 is secured to the outer end of the gear casing portion by means of a plurality of studs whereby access is provided to the interior. The gear portion of the housing includes an aperture 1610 at one edge thereof for detachably securing thereto an arm 1611. Journalled within the arm 1611 by bearings 1613 and 1614 is a shaft 1612 having bevel gears 1615 and 1616 keyed respectively to opposed ends thereof. The bevel gear 1615 meshes with the bevel gear 1608 whereby the shaft 1604 drives the shaft 1612. The arm 1611 includes a pair of spaced apertures with the axis thereof normal to the axis of the shaft 1612. A shaft 1620 is journalled in these apertures and one end projects therefrom for detachably securing thereto a cutter head 1621. As in the previous case, the shaft is tapered for receiving a correspondingly shaped aperture in the hub portion 1622 of the cutter head. The cutter head is retained on the shaft by a lock nut 1623. The bearings are retained in position by respective caps 1624 and 1625. A beveled gear 1626 is rigidly secured to the shaft 1620 and meshes with the bevel gear 1616. It is thus readily apparent that the cutter head is driven through the gear trains 682, 1607, 1608, 1615, 1616 and 1626.

The housing 699 and the attached arm 1611 may be filled with a suitable lubricant. A plurality of seals 1680, 1681, 1682 are provided to retain the lubricant within the casing.

It will be seen that the arms rotate with the rotor and in addition while they are rotating, the heads themselves are driven to rotate. The position of the arms with respect to a log passing therethrough may be varied controllably by hydraulic cylinders 1640 anchored at one end to the rotor by a bracket 1641 and at the other end to the housing 699 by a clamp 1642. Each of the cylinders consists of a cylinder 1643 and a piston having a rod 1644 projecting therefrom. The rod is secured to a lug 1645 projecting outwardly from the clamp 1642 detachably secured to the housing 699 adjacent the gear 1607. Each of the arms is individually controlled by hydraulic cylinders and the arms are further interconnected by synchronizing links 1646 pivotally secured at opposed ends to lugs projecting outwardly from the enlarged portion of the casing.

Since the arms are hydraulically controlled, they may be pivoted outwardly without the necessity of reversing the rotation of the delimber rotor as is the case in the previous embodiment.

In operation, the rotatable housing is driven by the hydraulic motor M2 through the coupling 676 and the spur gear 679, spur gear meshing with the external ring gear 697. Rotation of the rotatable housing is approximately 130 r.p.m.'s and during such rotation, the gear 1607 meshes with the internal ring gear 682 fixed to the stator thereby causing the cutter heads to rotate. The heads rotate at approximately 3000 to 4000 r.p.m.'s. The speeds given herein are merely by way of example since they have been found to produce satisfactory results in an actual machine. In delimbing a tree, the trunk passes through a central aperture in the delimber defined by the collar 671 and the sleeve 685. The tree moves longitudinally through the delimber and this causes the rotating heads to travel around the tree in a spiral path. The rotating heads having sharp cutting edges remove the limbs from the tree.

*Cutter heads*

The cutter head 608 illustrated in FIG. 19 and the cutter head 1621 illustrated in FIG. 31 are two different embodiments.

The cutter head 608 consists of a hub 1650 having four blades 1651 projecting outwardly therefrom. Each of the blades has a first major portion 1652 extending from the trailing or rearward end of the head forwardly to a point marked A in FIG. 32. The portion 1652 of the blade is of substantially constant diameter throughout its length having a leading cutting edge 1653 angularly disposed with respect to the axis of rotation. The portion 1652 terminates at the front in a nose or rounded end of the cutter provided by a curved portion 1654.

While the cutter blades on each head may vary in number and configuration, important advantages are attained, particularly minimization of shock, smoothness and efficiency in operation, when the blades are shaped and arranged in a manner as shown in FIGS. 32 to 34. The blades 1651 are carried on and distributed in equally spaced relation about the elongated hub 1650 which is tapered from a smaller forward end 1665 to a relatively larger diameter at its rearward end 1666. Each of the blades has a root portion 1660 which extends axially along the hub 1650 and merges therewith, with the root portion tapering adjacent to its forward end to a relatively small cross-sectional thickness. Each blade 1652 extends outwardly from its hub and helically therealong to provide the cutting edge 1653 which from its rear end forward to the point A sweeps out a generally cylindrical volume when the cutter head is rotated. From point A forward the cutting edge 1654 is curved so that it sweeps out a generally hemispherical volume when the cutter head rotates. To provide a smoothly shaped blade, the curvature is such that the radius of the hemisphere described by the rotation of the forward portion of the blade is substantially equal to the radius of the cylinder of revolution formed by the remainder of the blade, the hemisphere being tangent to the cylinder. The curvature of the forward portion of the cutting edge, that is, the curvature of the small circle which follows along the hemisphere of revolution is determined by the direction of the helix or the helix angle at point A where the two portions of the edge merge smoothly. The spherically curved forward edge portion ensures that the blades when the head is rotating, will not strike a projection on the tree, which due to the relative motion between the tree and the cutter heads in the axial direction, would otherwise be struck by the blades after they have passed beyond their cutting position relative to the tree as they rotate about the axis of their hub.

The spiral or helical disposition of the portion of each cutting edge 1653 from its rearward end to point A is such that point A leads the rearward end of the blade by somewhat less then 90° of revolution of hub. Reaction forces developed as the blade is carried through its cutting position where a projection on the tree is being cut, because of the spiral inclination of the cutting edge, are in a direction to minimize shock.

It may also be noted that the side surface 1661 of each of the blades, that is, the leading side surface, relative to the direction of rotation of the head, is concave while the opposite or trailing surface 1662 is convex.

In the modified delimber assembly the cutter heads 1621 each consist of a hub 1622 having a plurality of blades generally parallel to one another and to the axis of rotation of the cutter head. The blades are of substantially constant outer diameter, throughout their length and slope in the direction of rotation. Each blade extends inwardly at the forward end 1671 of the cutter head toward the hub 1622 to provide a forward cutter edge 1670.

In the cutter head illustrated in FIG. 35, the blades are relatively shallow with respect to the overall diameter of the hub compared to that of the embodiment illustrated in FIGS. 32 to 34. In the cutter head illustrated in FIG. 35, the blades slope in a direction of travel to present a relatively sharp leading or cutting edge 1672. As previously mentioned, the cutter head shown in FIGS. 32 to 34 has been found to operate satisfactorily driven at a speed of approximately 2000 r.p.m. while the cutter head illustrated in FIG. 35 has been found to give satisfactory results when operating at a speed of roughly 4000 r.p.m.

*Debarker unit*

The debarker is detachably secured to the beams 301 in trailing relation with respect to the delimber 600.

Referring to FIG. 9, the debarker unit 700 shown therein includes two sets of feed rolls 800. The debarker is positioned behind the delimber on the tubular beams 301, and is connected to the respective beams by one of a pair of collars 701. The debarker unit is fixed with respect to the beams but its position longitudinally along the beams may be adjusted if desired.

A debarker of the type illustrated in United States Patent 2,857,945 which issued Oct. 28, 1958 to P. G. Brundell et al. has been found to be suitable. The debarker shown therein includes two sets of feed rolls mounted directly on the debarker. It has been found preferable to separate the feed rolls and the debarker so that they are each independently mounted on the beams 301. The separate feed roll mechanism not associated with the debarker will be described hereinafter. In utilizing the combined debarker and feed roll mechanism as disclosed in the above patent, it has been found desirable to provide separate power sources for the debarker and the feed rolls. Thus, a motor, such as hydraulic motor M6A, is provided to drive the feed roll mechanisms 800, and a motor, such as hydraulic motor M1A, to drive the debarker. These motors (see FIG. 9) are connected to the feed roll mechanism and the debarker respectively, by pulley and V-belt assemblies 702 and 703.

The debarker 700 includes a stationary housing 705 fixed to the beams 301 by collars 701. The collars are provided by a pair of lugs detachably secured to the stationary casing and projecting outwardly therefrom. The debarker also includes a rotatable housing 706, carrying a plurality of arcuate blades 707. The rotatable housing is driven by the motor M1A in driving connection with the housing through the pulley and V-belt assembly 703.

Each set of feed rolls 800 attached to the debarker comprise three spiked rolls 801. One set is positioned at the forward or infeed side of the debarker and the other set is positioned at the outfeed side of the debarker. Each spiked roll 801 is journalled for rotation about an axis transverse to the length of the beams 301 at one end of an L-shaped arm 802, the latter of which is pivotally supported at its opposite end on stationary housing 705. Arms 802 are spaced around the housing in a Y configuration and through a driving arrangement, such as shown in U.S. Patent No. 2,857,945, spiked rolls 801 are driven and arms 802 are pivoted drivingly to engage the peripheral spiked surface of the rolls with a tree trunk positioned between the rolls. The feed roll mechanisms are driven by the hydraulic motor M6A through the pulley and V-belt assembly 702 and, as a tree trunk approaches the first set of feed rolls, the spike rolls engage and feed the tree trunk into the debarker. The second set of feed rolls engage the debarked trunk on its emergence from the debarker and continues to feed the debarked trunk to further processing units. For reasons which will be more apparent hereinafter, a counter switch SW15 is fixed to an end of one of the rolls 800, preferably at the outfeed side of the delimber, switch SW15 being set to actuate automatically after each pre-set number of rotations of roll.

In normal operation, the motor M6A through the pulley and V-belts 702 rotate the spiked rolls on one set toward, and the spiked rolls of the other set away from debarker 700. In some instances, after a tree has been fed partially through the debarker, it may be desired to remove the tree from the debarker without passing the remainder of the tree therethrough. This may be accomplished readily by reversing the drive motor M6A.

The debarker illustrated in FIG. 9 and in FIG. 37A is one form of debarker as disclosed in the aforementioned patent. The feed rolls and debarker are mounted on a common stationary housing. In a preferred embodiment, the debarker is separate from the feed roll frame and such demarker is illustrated in FIGS. 10, 11 and 38. Shown in FIG. 38, the debarker 700 consists of a stationary frame 720 having a pair of ears 721 projecting outwardly therefrom. Each ear or lug 721 has a collar 722 provided with a detachable cap 723 whereby the debarker may be readily detachably secured to the sub-frame assembly beams 301. The debarker stationary housing 720 includes an enlarged motor and gear housing 724. A hydraulic motor M1 is secured to the housing and access to the drive gears may be attained through the removal of a pair of cover plates 725. The debarker shown in FIG. 38 also includes a rotary housing and arcuate teeth mounted thereon, the same as in the debarker illustrated in FIG. 37A. A peripheral portion of the rotatble housing is protected by a shield or partial cover plate 726.

Feed rolls

In processing trees, the boom and grapple to be described hereinafter lifts the tree and feeds it directly to the first unit in the subframe assembly. The tree as it passes through is then picked up and continued to be fed through the processing units by the feed rollers 800. One or two sets of feed rollers may be used as previously described. Utilizing the feed rollers, the boom and grapple is free to select the second tree and bring it to the processing units to be processed as soon as the first tree is completed or has passed through the first of the processing units.

FIGS. 36 and 37 respectively are a side and front elevational view of one set of feed rollers 800.

In the aforementioned United States Patent, the debarker, stationary frame and feed roll frame are common. In order to provide a relatively versatile processing assembly, it is preferable that the feed roll sets be each mounted on their own frame independent of the other processing units. Not only does this facilitate servicing and installation of the feed rollers, but also it permits adjustment of the relative position of the feed rollers with respect to the remainder of the processing units. Shown in FIGS. 36 and 37, the feed roll assembly 800 consists of a frame 801 having arms 802 projecting outwardly from opposed edges. These arms each include a collar having a bearing surface 803 for resting upon the upper end of respective ones of the tubular beams and a cap 804 detachably secured thereto clampingly to engage the beam 301. Bolt and nut assemblies 805 are used to tighten the cap onto the extending leg and the feed roll assembly is thereby securely fastened to the beam 301.

Figure 4:
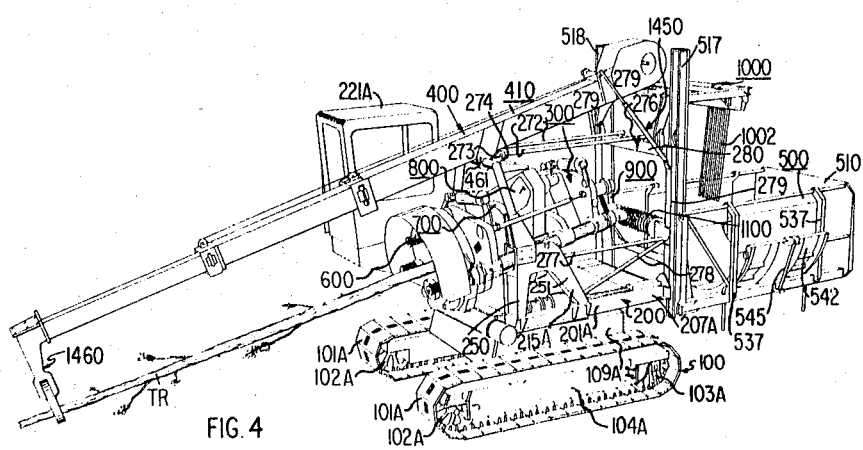
FIG. 4 is an oblique view of a modified mobile processing machine constructed in accordance with the present invention.
Figure 5:
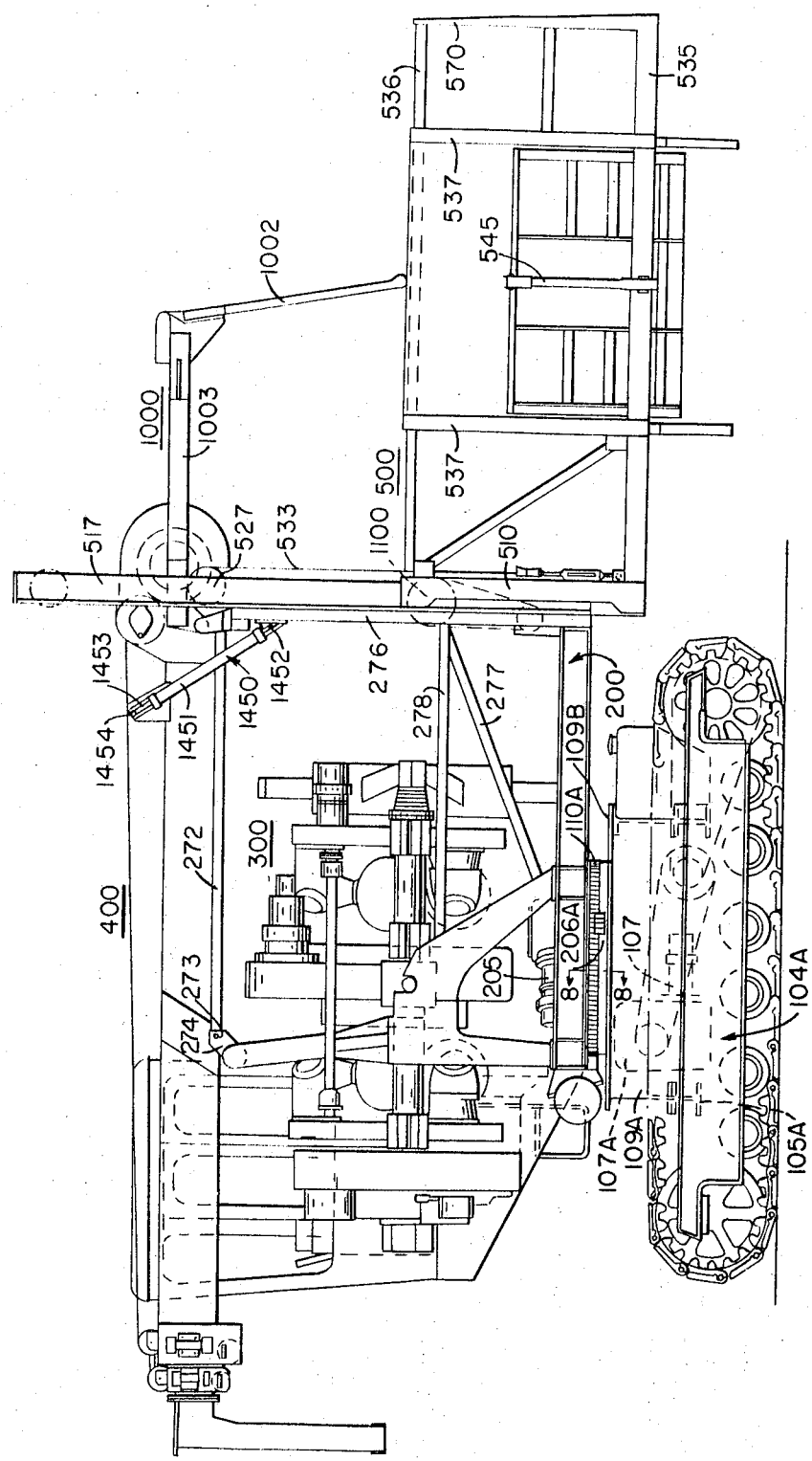
FIG. 5 is a side elevational view of the machine illustrated in FIG. 4.
Figure 6:
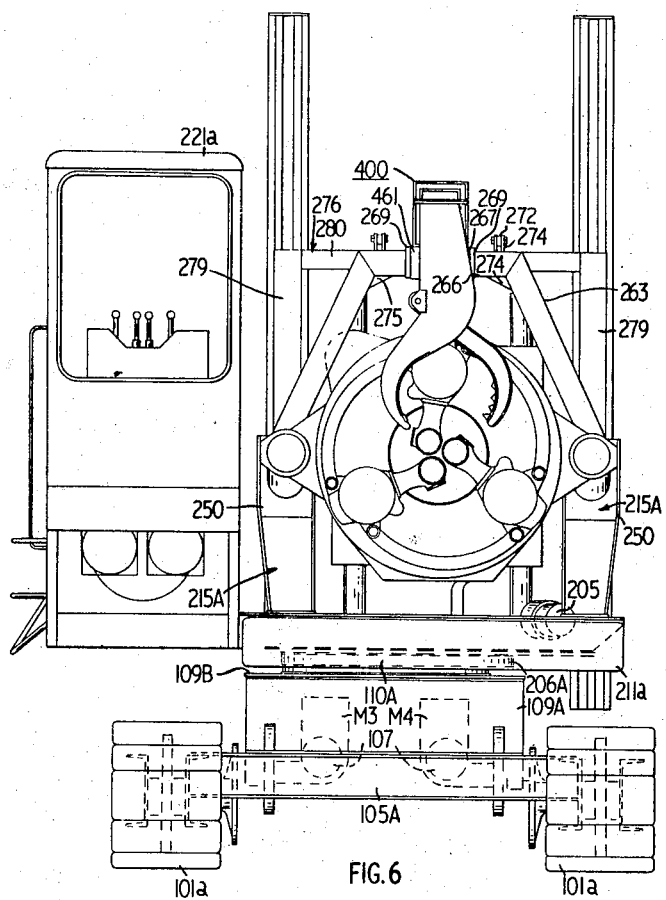
FIG. 6 is a front elevational view, with a portion of the boom removed for the purposes of clarity, of the machine illustrated in FIGS. 5 and 6.
Figure 7:
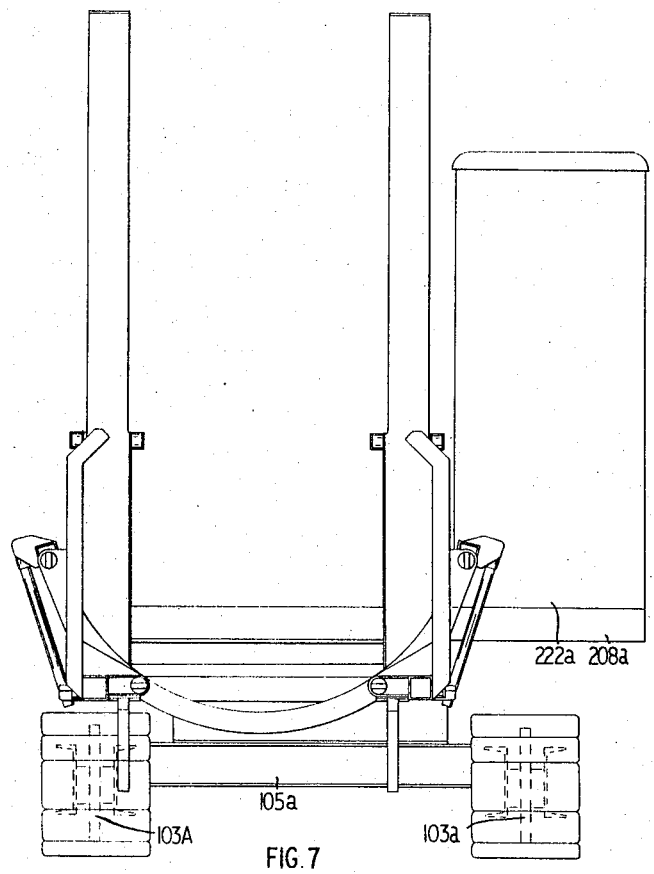
FIG. 7 is a partial rear elevational view of the machine illustrated in FIGS. 4 to 6.

The mounting arms on the various processing units are a rather important feature since such mounting provides detachable securement of the processing units to the beams. The collar for mounting the feed roll is split along a horizontal diameter as is the case with the mounting for the debarker shown in FIG. 38. Three arms 806 are secured to the frame and are pivotable about an axis parallel to the beams 301. The arms are directed towards one another and each arm has a roller 807 pivotally mounted on the free end thereof. Each of the rollers has an arcuate surface 808 having a plurality of spikes 809 projecting therefrom for grippingly engaging the tree surface. As seen in FIG. 37, the arcuate shape of the roller surface permits relatively small trees to be clampingly engaged therebetween and the mounting of each arm is such that as the arm pivots outwardly, the spiked roller thereon does not abut any of the remaining spiked rollers. The arms are biased inwardly to retain the rollers in contact with the tree and the rollers are driven by a motor M6 mounted upon the frame. As seen in FIGS. 1 and 4, when a pair of drive roll assemblies 800 are utilized, a propeller shaft 325 interconnects the two assemblies and thus, only one motor is required to drive the two sets of rollers. This also insures that the two sets of rollers are driven at the same speed. The arms 806 are interconnected by a pair of bars 812 and 813 so that movement of one arm effects movement of the others inwardly and outwardly toward and away from a tree being fed.

The feed rollers are biased inwardly towards the center axis of the feed roll unit, i.e. towards one another by a rubber spring 814. The resilient force of the spring is distributed to each of the arms through the synchronizing or interconnecting links 812 and 813. In addition to a rubber spring, the spring assembly also may include a hydraulic dappling means, a rubber cushion, means for regulating the spring force and means for stopping the motion of the feed rolls towards the center of the frame. The stop of the feed rolls towards the axis may be determined by the desired minimum long diameter. The spring assembly is readily detachable so that the arms can be readily swung outwardly for servicing or gaining access to the interior of the frame 801. The frame 801 may be a frame purely for the support of the feed rolls; however, it also may enclose a debaker as illustrated in FIG. 38. The combination of a debarker and feed rolls is known as as for example in the Brundell and Johnson U.S. Patent No. 2,857,945, issued Oct. 28, 1958. In this patent, there is disclosed a debarker having two sets of feed rolls mounted thereon.

Three electrical switches SW2, SW3 and SW7 are mounted on the frame 801 of the feed roll assembly and are actuated by movement of the synchronizing link 813. Each of the switches is secured to the frame 801 as by a plurality of bolts or studs and the switch actuating arm extending therefrom has a cam follower 815 rotatably mounted adjacent the outer end thereof. The cam follower 815 of respective switches SW2, SW3 and SW7 engages respective striker plates 816, 817 and 818 mounted on the synchronizing link 813. Each striker plate 816–818 may consist of a generally L-shaped bracket having an elongated slot in one leg thereof whereby such leg may be secured to the synchronizing link by a stud, the elongated slot providing adjustment such that the relative position of the striker portion may be adjusted with respect to the cam follower. The striker plates 816, 817 and 818 are distributed longitudinally along the synchronizing link intermediate the latter's opposed end pivotally secured to the L-shaped arms 806. The switches SW2, SW3 and SW7 sense respectively three diameters so that they are actuated by trees of 3-inch diameter, 1½-inch diameter and 6-inch diameter. Actuation of the switches can be accomplished by selecting proper location for the switches along the length of the synchronizing link. This is so due to the fact the synchronizing link is carried by lugs projecting outwardly from the arms carrying the feed rollers.

Shear or knife unit

A shear or slasher unit is mounted on the beams 301 in axial alignment with the other processing units. The shear unit is at the trailing end of the other processing units with respect to the direction of travel of a tree being processed as it passes therethrough and it is mounted to slide axially along the beams. Two different embodiments of a knife of shear unit are illustrated in the drawings.

Referring now to FIGS. 39 to 42 inclusive, the slasher or shear unit 900 is positioned at the rear of the machine and is mounted for limited horizontal movement toward and away from the debarker 700 and the last set of feed rolls 800. The horizontal sliding movement permits severing the delimbed and debarked trunk by the shear unit while the trunk continues to move through the machine. The shear unit may be driven at a speed in timed relation with respect to the tree being processed so that they travel at the same speed during the severing operation. Alternatively, the shear unit may be carried along by the trunk of the moving tree due to engagement of the shear blades with the tree.

The cut-off knife unit shown in FIGS. 39 and 40 consists of a housing 901 secured by a pair of collars 902, one on each of opposite edges of the housing to respective ones of a pair of tubular beam members 903. The beam members 903 extend forwardly parallel to and in telescopic relationship with respect to the beam 301. Each tubular member 903 is carried on a pair of spaced bearings 904 which are generally annular sleeves thereby fixing the tubular member 903 in spaced relation inwardly with respect to the beam. For purposes of illustration and clarity, only one beam 301 is illustrated in section in FIG. 41 with the beam support collar and the processing unit supports removed. The beam as shown in broken section in FIG. 41 is the full extent of the beam; the end of beam shown at the left being the forward end of the beam adjacent delimber.

A rod 905 is fixed at one of its ends to the forward end of tubular beam 301 by a collar 906 and extends rearwardly through the tubular beam 903. At its other end the rod 905 is provided with a nut and collar 907, slidably fitting within the tubular beam 903. Each beam 903 is open at its free end disposed within the beam 301 and such open end has a seat provided by a sleeve 908 fixed by welding or in any other suitable manner. A compression spring 909 is located in each beam 903 and is seated at one of its ends on the collar 907 and, at its opposite end, on the sleeve 908. The compression spring accordingly anchored at opposed ends respectively to the beams 301 and 903, retains the telescopic beams in a retracted rest position as shown in FIG. 41.

As shown in FIGS. 39 and 42, a pair of knives 910 are carried by respective ones of yokes 911 and 912 mounted for reciprocation toward and away from each other in the knife housing 901. Housing 901 is open at its center to receive a tree trunk when knives 910 are open or away from each other. Each of the hydraulic cylinders 913 consists of a cylinder 915 having a pair of piston rods 916 projecting from opposed ends thereof. The piston rods 916 of cylinders 913 and 914 are secured respectively to lugs 917 and 918 projecting outwardly from the upper end of the yoke 911. The piston rods 916 at the opposite end of the cylinders 913 and 914 are secured to a similar pair of lugs 919 and 920 projecting outwardly from the yoke 912.

Opposite ends of each of the cylinders 913 and 914 are connected to a fluid pressure supply by conduits 921 and intermediate the ends is connected by a conduit 922. The cylinder and piston arrangement is double acting, that is, the yokes and knives are actuated in both directions by fluid pressure. When fluid pressure is admitted through the conduits 921 the knives are actuated toward each other and when fluid pressure is admitted through conduit 922 the knives are driven away from one another.

Each of the yokes 911 and 912 is guided by a pair of grooves 923 in each of the opposite faces slidingly engageable with respective ones of flanges 924 projecting inwardly from the shear frame 901.

A spring biased, normally open switch SW16 of a conventional type is attached to the housing 901, the actuating arm 925 of the switch being position with its forward or free end in the path of travel of lug 917 on the yoke 911. Switch SW16 is connected in circuit with switch SW15 and, as will be more apparent hereinafter, is closed upon actuation of arm 925 by the lug 917. When the knives close, the lug 917 contacts the arm 925 at or near the end of the yoke's inward travel.

In its normal position, with the knives open, cutoff knife 900 is held in a retracted position with respect to beams 301 by the springs 909. When the cylinders 913 and 914 are actuated to move knives inwardly into contact with a tree trunk fed therethrough the housing 901 and thus the entire shear unit 900 is moved rearwardly by the advancing tree trunk, compressing springs 909. The springs 909 return the knife unit 900 to its initial or forward position at the rearward ends of beams 301 when the knives are moved outwardly out of engagement with the tree trunk.

A modified type of shear unit is illustrated in detail in FIGS. 43 to 48 inclusive.

The shear unit 900 illustrated in FIGS. 43 and 44 consists of a pair of frame members 941 and 942 detachably secured together by a plurality of studs 943. The frame 941 consists of a rear backing member 944 of hollow construction and it includes a central aperture 945. A pair of side wall members 946 are secured respectively to a pair of opposed marginal edges of the rear backing plate and project forwardly therefrom. An arm 947 is secured to each one of the walls 946 and is a generally box shaped member extending outwardly and forwardly therefrom terminating in a split collar 948. A pair of studs 949 are threaded so as to tighten the collar onto a tubular member 950. The front and rear face plates and the side walls together form a pair of channels each having wear plates 951, 952 and 953 secured to the walls thereof. An upper and lower knife mounting yoke respectively 954 and 955 are slidably mounted and guided for vertical movement in these channels. A pair of ears or lugs 956 and 957 are secured at each of opposite edges of each of the yokes and these ears slidably engage the wear plates. A hydraulic cylinder 958 is pivotally mounted at each end of the guide channel and the movable piston rod 959 is pivotally connected by a flattened end portion located intermediate the ears 956 and 957 by a pin 960. Each hydraulic cylinder is mounted within the channel by a pair of trunnions 961 projecting outwardly and disposed in journals 962 secured respectively to the front and rear plates 942 and 944 of the frame. The journal 962 fits into an aperture in respective ones of the plates. Each side wall 946 has a removed end section providing an aperture for access to the pivot pin for ease of insertion and removal of the bushings. The hydraulic cylinders are removable by dismounting the cover plate 942. The front and rear plates of the frame are further interconnected and reinforced by an apertured plate 963 secured thereto by a plurality of studs. The cylinder of the hydraulic assembly passes through the aperture and projects outwardly from the frame.

A shear blade 964 is secured to each one of the yokes by a plurality of bolt and nut assemblies 965. As shown in FIG. 45, the yoke is provided with a recess 966 providing a ledge 967 abutting the outer peripheral edge of the blade 964. The bolt and nut assembly 965 clampingly presses an arcuate plate 968 against the periphery of the knife. The upper yoke has a bore 969 (see FIG. 51) extending therethrough adjacent each corner and terminates at the lower edge thereof. A plunger 970 extends through the bore and is biased downwardly by a compression spring 971. A pair of microswitches SW5 and SW6 are detachably secured to the yoke by a plurality of studs 972 and the actuator thereof is adapted to be engaged by the plunger 970 in respective ones of the bores 969. The plunger projects below the yoke so as to be engaged upon closing of the shears by the lower yoke. As will be seen hereinafter the microswitches effect reversal of the yokes to open the yokes after the shear has closed cutting the tree.

The shear 900 illustrated in FIGS. 43 and 44 is also mounted so as to move along with the log during a severing or cutting operation. The shear is a guillotine type and may be referred to as a flying shear because of the particular mounting. Referring to FIGS. 46, 47 and 48, each of the collars 948 is secured to the tubular member 950 disposed in sliding telescopic arrangement within the beam 301. The beam 301 at the rear end has an outwardly directed flange 974 rigidly secured thereto. A cap member 975 is detachably secured to the flange by a plurality of studs 976 and the tubular member 950 passes through an aperture 977 in the cap. A seal member 978 is secured to the cap and slidingly engages the outer surface of the tubular member. A rubber bellows type collar 979 is anchored at one end to the cap 975 and at the other end to a collar 980 fixed to the tubular member 950.

Three roller assemblies 981 each consisting of two rollers 982 mounted on spaced, generally parallel shafts 983 are secured to the tubular member 301 adjacent the cap end. The rollers are mounted upon a ring-like sleeve 984 which fits into an enlarged area adjacent the rear end of the beam and retained in position by the cap member. The rollers project inwardly of the sleeve and rollingly engage the outer peripheral surface of the tubular member 950. The member 950 carries at its leading end three roller assemblies 985, each consisting of a pair of rollers 986 secured by shafts 987 to lugs 988 on an annular sleeve 989. The annular sleeve is secured to the leading end of the tubular member 950 and retained in position by a C ring 990. The roller assemblies at the leading end of member 950 rollingly engage the inner peripheral surface of the tubular member 301. The roller assemblies at the leading end of the member 950 and the roller assemblies at the capped end of member 301 provide spaced guide rollers for the telescopic movement of each member 950 inwardly and outwardly with respect to the tubular beam 301.

The tubular member 950 is biased to a retracted position by a compression coil spring 991 which is anchored at one end to the tubular member 950 by a collar 992 and at the other end to a flange 325 on the tubular beam 301. The latter anchor is provided by a bolt 993 having a collar 994 retained thereon by a nut 995.

The shear is carried on the end of the tubular member 950 projecting outwardly of beam 301, the telescopic mounting permitting the shear to move as a unit horizontally to the right as viewed in FIG. 46. It is normally at a rest position and biased to that position as shown in FIGS. 10 and 11 by the previously described coil spring.

The switches SW5 and 6 illustrtaed in FIG. 43 mounted on the yoke 954 may be replaced by a single switch mounted in a manner as illustrated for example, in FIGS. 49 and 50. Referring to these latter drawings, a switch SW5' is secured to the back housing member 944 of the shear by brackets 996. The switch is recessed partially in the plate 944 by projecting through an aperture in the rear wall and is protected by a cover plate. A switch actuating lever arm 997 projects forwardly toward the front wall 942 and carries a cam roller 998 on the free end thereof. A striker plate 999 is adjustably secured to the yoke 954 by a pair of slotted bracket members 1901 and studs 1902. Sliding movement of the brackets 1901 and thus the striker plate 999 provides means of adjusting the relative position of the cutter knives at a shear closed position.

A further electrical switch SW9 is mounted upon the frame and includes a lever actuating arm 1903 adapted to abut the yoke 954 when the latter is in a shear fully open position. A further switch SW8 having an actuating lever arm 1904 is mounted on the shear frame such that the lever arm is adapted to abut the yoke 955 when the shears are in a partially open position. The switches SW8 and 9 respectively are actuated by the yokes 955 and 966; however, this need not be so as both switches could be actuated by the same yoke. Each of the switches SW8 and 9 are mounted on the shear frame by brackets 1905. The brackets may be provided with slotted apertures whereby the switches are adjustable. The adjustable mount permits or allows for lag in effecting operations actuated by the switches.

Clearing roll

A clearing roll 1100 is mounted upon the uprights 279 of the frame vertical wall 276. The clearing roll is located somewhat below the axis of the feed path followed by a tree being processed as it passes through the processing units. The clearing roll consists of a hub 1101 mounted upon a shaft 1102 journalled by bearings 1103 and 1104 mounted by brackets 1105 and 1106 to respective ones of the pair of vertical uprights 279. A series of serrated discs 1107 project outwardly from the hub and are disposed in horizontal spaced relationship. The serrations of adjacent discs are offset as will be seen in FIG. 53 to provide maximum gripping force with the surface of the processed tree. The speed-up roll is driven substantially at the same speed as the feed rolls by a hydraulic motor M7 and assists in delivering the processed cut log from the processing units into the cradle.

The motor M7 drives the clearing roll 1100 through a chain 1108 and sprockets 1109 and 1110 secured respectively to the motor and the roll shaft 1102.

Receiving and stacking

A cradle 500 is secured to the frame 200 at the trailing end thereof for receiving and stacking the processed tree bolts. Two embodiments of the cradle are illustrated in the drawings.

In FIG. 1 the cradle 500 consists of the base 501 having a plurality of posts 502 projecting upwardly therefrom adjacent a pair of opposed marginal edges. The base 501 is detachably secured to the frame 200 by bolts or the like and in trailing relation immediately rearwardly of the last processing unit which in FIG. 1 is the shear unit 900. The processed logs cut by the shear unit are dropped into the cradle and retained by the latter in a neat stacked arrangement. A tail gate or wall 503 projects upwardly from the cradle base at the rear end to form an abutment for the logs being dumped into the cradle. If desired, the entire cradle can be detached from the frame and the cradle together with the stacked logs loaded on to a truck so that they may be hauled away. Alternatively, a fork lift truck may be used to lift the stacked logs off the cradle by having the forks thereof inserted under the logs. As a still further alternative, a pair of flexible cables 504 may be supported directly upon the cradle platform 501. When the cradle is full, these cables may be looped around the logs and later locked together so that each cable encircles the pile of logs. These flexible cables may then be used to lift the entire stack by a crane from the cradle into a tractor or truck used to haul away the processed logs. In the event the cradle 500 is detached and hauled away, a further cradle is then secured to the machine for receiving a second load of processed tree bolts.

In the embodiment illustrated in FIGS. 4 to 7, inclusive, the cradle 500 is mounted on the frame 200 so as to be vertically movable. The cradle 500 includes a frame having respective front and rear walls 510 and 511 and a pair of side walls 512 and 513. A gate 514 is provided in the bottom by a pair of slidably mounted doors. The wall 502 includes a pair of rollers 521 and 522 mounted at each of the vertical four corners, each pair of rollers being disposed in a pair of opposed tracks 515 and 516 provided by a pair of vertical uprights 517 and 518. Each of the uprights 517 and 518 consists of a pair of channel members disposed back to back and in spaced relationship. The flanges of the channels are directed outwardly thereby providing a pair of opposed tracks 515 and 516 in each upright. The channel members are interconnected at a series of vertical positions by interconnecting bar members 520. The uprights are detachably secured to respective ones of the pair of members 279 by bolt and nut assemblies 521. The rollers 521 and 522 are journalled to a bracket 523 which is secured to the end wall 511. The cradle 500 effectively is cantilevered out rearwardly from the main frame 200 and is supported by the frame 276. The vertical uprights 517 and 518 provide guides whereby the cradle is vertically slidable.

A hydraulic cylinder 524 consisting of a cylinder 525 and a movable piston rod 526 is mounted in each of the uprights 517 and 518 intermediate the channel members. The cylinder 525 is anchored rigidly to the channels and the piston rod has a pulley 527 journalled on a U-shaped clamp 528 secured to the free end thereof. Each channel has a pair of flat bars 529 and 530 secured to the web and running longitudinally along the channel to provide a guideway 531. The pulley or sheave 527 is pivotally mounted on the clamp 528 by a pin 532. The pin projects beyond the clamp at each side and the piston rod is thereby guided during vertical movement. A pair of flexible cables 533 are anchored at one end to the cradle 500 by a turn buckle 534 and they are anchored at the other end to respective ones of the uprights 517 and 518. The cable intermediate the anchored end passes over the pulley 527 on respective ones of the hydraulic cylinders 524. It is thus apparent that actuation of the cylinders effects raising and lowering of the cradle. In FIG. 55, the lowermost position of the cradle is shown in solid line and the uppermost position is illustrated in phantom.

Each of the side walls 512 and 513 of the cradle is defined by a horizontal beam 535 at the lower edge and a horizontal bar member 536, at the upper edge. The beam 535 and bar 536 in each of the walls are joined by a pair of vertical upright members 537. A pair of lugs 538 having a roller 539 journalled thereon project outwardly from each of the uprights 537. A second pair of rollers 540 are journalled to respective ones of a pair of brackets 541 projecting inwardly from each of the beams 335. The gate 514 in the lower part of the cradle consists of a pair of slidably mounted door members 542 and 543. Each door is arcuately shaped and includes a channel 544 in each of the opposed arcuate marginal edges. The pairs of rollers 540 and 539 rollingly engage the channels and thereby provide a sliding guide for the arcuate doors. Sliding movement of the doors is effected by a pair of hydraulic cylinders 545. Each cylinder 545 has one end thereof anchored to the beam 535 and the other end anchored to the door.

The cradle may initially be partially raised and the logs deposited therein as they are processed. The weight of the logs adding to the cradle causing the same to lower controllably by virtue of a flow-control valve in the hydraulic system for the hydraulic cylinders. A full cradle of processed logs may then be raised and the doors actuated to dump the entire load into a truck vertically therebelow for hauling the logs away.

*Log measuring apparatus and shear control*

In the embodiment of the machine illustrated in FIG. 4 to 7 inclusive, there is a log measuring device generally indicated as 1000 consisting of a frame 1001 projecting rearwardly from the cross member 280 of the end frame 276. Depending downwardly from the frame 1001 is a striker 1002 adapted to be engaged by the log as it is fed from the machine by the feed rollers. Pivotal movement of the striker plate actuates a switch SW4 to effect or initiate operation of the shears to cut the processed tree bolt into a selected length. There are several different embodiments of the log measuring device and referring now specifically to FIGS. 4, 5, 60 and 61, the log measuring device 1000 consists of a pair of arms 1003 secured at their leading end to the cross member 280 and uprights 517 and 518. Each arm 1003 includes a bracket 1004 having a flange 1005 which abuts the respective ones of the uprights 517 and 518. The bracket includes a downwardly projecting portion 1006 apertured to receive a pin 1007 whereby it is anchored to a lug 1008. The lug 1008 is rigidly secured to the cross member 280 of end frame 276. This is the frame which provides a mounting for the previously described cradle assembly. In order to remove the log measuring device, the pins 1007 are removed and the entire assembly, lifted vertically from the machine.

Each member 1003 terminates at its rearward end in a laterally inwardly offset portion 1009 which is channel shaped in cross-section reinforced by a gusset 1010. The remainder of the member 1003 is essentially a box beam and the two parts are interconnected by welding or the like. Each channel shaped section 1009 includes an elongated slot 1011 in the web and a further elongated slot 1012 in the uppermost flange. A plate 1013 is secured to the portion 1009 of the member 1003 by a pair of bolts 1014.

The plate 1013 includes a pair of inwardly directed flanges 1015 and 1016 on the marginal lower edges. The plate 1013 projects upwardly above the channel member 1009 and is reinforced by an angle bracket 1017. One leg of the angle bracket overlies the uppermost flange of the channel 1009 and is secured thereto by a pair of bolt and nut assemblies 1018. The bolt and nut assemblies 1014 and 1018 are slidable respectively in the slots 1010 and 1012 whereby the entire plate 1013 is horizontally slidable forwardly and rearwardly to adjust the horizontal position of the striker plate 1002. The striker plate 1002 is pivotally mounted to the bracket 1013 by a rod 1019 and consists of a generally rectangular sheet metal plate having reinforcing vertical corrugations and transverse reinforcement members 1020. A pair of lugs 1021 are detachably secured to the plate and are apertured to receive a sleeve 1022. The pair of sleeves 1022 are disposed concentrically on the shaft 1019 and project through aligned apertures in respective ones of the angle bracket 1017 and the plate 1013. The sleeve is fixed to the members 1009 and a pin, not shown, through the sleeve and rod retain the same in an assembled position. Mounted on each sleeve 1022, intermediate a pair of collars 1025 and 1026 is a coil spring 1027. Tension of the coil spring is adjustable by a nut 1027 threaded on to the sleeve. A spring loaded ball is disposed in the collar 1025 or bracket 1021 and the ball is biased by the spring in a direction toward the other member partially to be received in a notch therein, thereby providing a releasable lock for retaining the flapper plate 1002 in a normal operative position.

The striker plate 1002, or flapper plate as it may be referred to, abuts against the flange 1016 of the bracket 1013 and normally retains the flapper plate in a position rearwardly inclined approximately 10 degrees from the vertical. This places the striker plate substantially normal to the longitudinal axis of the processed tree as it emerges from the processing units and projects therefrom. A switch S14 is mounted so as to be actuated in response to pivotal movement of the flapper plate. The switch initiates action of the shear unit to cut the processed tree.

One form of shear triggering device or actuation of the switch SW14 is shown in FIGS. 62, 63 and 64, and also shown in these figures is a somewhat modified form of flapper.

The modified flapper or striker plate shown in FIG. 64 consists of a series of bars 1030 each depending from a sleeve 1031. The rod 1019 passes through the sleeves and thereby individually pivotally mounts the rods intermediate the rearward end of the frames 1003. A rod 1032 is suspended from the shaft by a pair of hangers 1033 and rests against a pair of stops 1034 adjacent opposed ends thereof. The rod 1032 bears against the bars 1030 providing a stop therefore and located on the opposite side is a second rod 1035 suspended by three hangers 1036 from the shaft 1019. The hangers 1036 are mounted by sleeves 1037 to pivot on the shaft 1019 and the rod 1035 is resiliently urged against the bars 1030 by a tension spring 1038 anchored at one end of the member 1003 and at the other end to the hanger 1036. Movement of the hangers accordingly, is responsive to pivotal movement of the bars 1030 about the shaft 1019. The bracket 1033 as seen in FIG. 64 also includes a sleeve 1037 mounted so as to pivot on the shaft 1019. One bracket 1033, the one which is located on the left in FIG. 64, includes a rearwardly directed apertured portion 1039 intermediate the shafts 1019 and 1032. A hydraulic cylinder 1040 is pivotally secured by a pin 1041 to a bracket 1042 and pivotally secured at the other end by a pin 1043 to the bracket rearwardly extending portion 1039. The bracket 1042 is anchored to the member 1003.

An impulse micro switch SW14 (see FIG. 65) is secured to opposite member 1003 and includes a pivotally mounted lever 1046 having a roller 1047 mounted on the free end thereof rollingly to engage a plate 1048 on the bracket 1036. The lever intermediate the roller and pivoted end abuts the micro switch activating member 1049 whereby movement of the bracket from its initial position causes the switch to activate an electrical circuit.

The log measuring assembly illustrated in FIGS. 66 and 67 illustrates a modified frame and modified flapper and a modified switch actuating means. Referring to FIG. 66 a pair of frame members 1003A each consist of an L-shaped bracket 1060 channel shaped in cross-section and pivotally secured at one end by a pin 1061 the bracket 1008 previously described. Secured to the upper edge of the L-shaped bracket 1060 is a lug 1063 which projects outwardly to bear against respective ones of the uprights 517 and 518. Detachably secured to the L-shaped bracket 1060, is a channel shaped member 1063. The member 1063 or the member 1060, or both may include slotted apertures or a plurality of apertures whereby the overall length of each of the members 1003A may be extended and retracted.

A modified flapper or log measuring plate 1002A is pivotally secured and depends from the rear end of the member 1063 by a bracket 1064 and a rod 1065.

A pair of brackets 1070 are suspended from the shaft 1065 and are interconnected at their lower end by a horizontal angle member 1071. The flapper 1002A consists of a series of bars 1030A suspended from the shaft 1065 by a collar 1072. The bars are interconnected at their lower end by a cross bar 1068 and each bar clampingly engaged by a pair of clips 1073 rigidly secured to and projecting rearwardly from the angle member 1071. Each clip includes a flared outer end portion and a pair of clips clampingly engage wear plates 1074 on opposed edges of each bar. The resilient clips tend to reduce the rebound of the flapper plate upon its return to the normal rest position.

A log deflector plate 1075 is secured at its forward end to a channel member 1076 interconnecting the members 1003A. The deflector plate 1075 slopes downwardly and rearwardly towards the angle member 1071 and is braced at the rearward end by a bar or brace member 1077 fastened at the opposed end to a channel member 1078 interconnecting the members 1003A.

Each of the brackets 1070 includes a rearwardly extending enlarged apertured portion 1079 intermediate the shaft 1065 and angle member 1071. The hydraulic cylinder 1040 shown in FIG. 63 is pivotally anchored at opposed ends respectively by pins 1041 and 1043 to the member 1003A and one of the brackets 1070.

The hydraulic cylinder 1040 when actuated causes the bracket 1070 to pivot about the shaft 1065 and thereby raise the flapper to substantially a horizontal position. This moves the flapper to a position such that it does not interfere with raising the cradle assembly when the latter is filled with processed logs.

A lug 1082 is shown in FIG. 66 secured to the bracket 1070 and projecting rearwardly therefrom. The lug includes a notch in the lower edge thereof grippingly engaging a lock member 1083. In the event a hydraulic cylinder 1040 is not connected to the bracket 1070, the member 1083 and lug rae utilized to lock the bracket in a normal operative position.

A cam member 1088 is secured to the shaft 1065 by a sleeve 1089 and is keyed so as to rotate with the shaft. The switch SW14 is secured to a plate 1092 rigidly secured and depending from the rearward cross member 1078. The switch includes a lever 1093 having a roller 1094 on the outer end thereof, the roller 1094 being a cam follower running upon the surface of cam member 1088.

*Boom unit*

In the machine illustrated in FIGS. 1 to 3 inclusive, one form of boom and grapple is illustrated while a second form of boom and grapple is illustrated on the machine in FIGS. 4 to 7 inclusive. The boom and grapple in the embodiment of FIG. 1 includes a heeling device for directing the tree to the processing unit as it is being fed or carried by the grapple to the processing unit.

Referring now specifically to the embodiment illustrated in FIGS. 1 to 3, the boom 410 (see FIGS. 69 and 70) consists four telescopic box members 401, 402, 403 and 404. The outermost box member 401 includes a pair of trunnions 405 projecting outwardly from opposed sides intermediate the length thereof. These trunnions are received in the notch 216 of the A frame 215, the boom and grapple assembly 400 thereby being pivotally mounted upon the upper edge of the A frame with the pivot axis being horizontal and disposed vertically above the longitudinal axis of the processing units. Each of the box members 401, 402 and 403 have respective pulleys 406, 407 and 408 pivotally mounted adjacent their forward end. Extending lugs 411, 412 and 413 are secured respectively to the trailing end of members 402, 403 and 404. A winch and boom assembly 414 is secured to the outermost box section 401 adjacent the rearward end thereof. The winch includes a pair of drums 415 and 416 of specific related diameters, the purpose of which will be apparent hereinafter. A cable or rope 417 is wound upon the drum 416 and is anchored at the other end to lug 411 and traverses the pulley 406 intermediate the ends thereof. Winding of the cable onto the drum thereby telescopically extends the member 402 outwardly from the member 401. Respective cables 418 and 419 are anchored at one end respectively to members 401 and 402 and at their opposite ends respectively to lugs 412 and 413. Intermediate the anchored ends, the respective cables 418 and 419 pass around or traverse respective pulleys 407 and 408. Through the cable and pulley arrangements described, winding the cable 417 onto the drum 416 simultaneously extends the boom sections outwardly. A cable 420 is wound onto the drum 415 and is anchored at the other end to the rearward end of the inner member 404 by a clevis 421. Winding of the cable 420 onto the drum 415 pulls the innermost boom section rearwardly to a retracted position. Such movement through the cables 417, 418 and 419 simultaneously retracts the outer sections into the outermost section 401.

The extension and retraction of the various sections is guided in movement by a plurality of tracks and wheels. Each of the box members 401, 402, 403 and 404 consists of a pair of opposed side walls 422 and 423, an upper wall 424 and a lower wall 425. A pair of bars 425 and 426 are secured respectively to the inner surface of each of the side walls of members 401, 402 and 403. A roller assembly 427 is secured to each of the side walls of the members 402, 403 and 404, having a roller 428 disposed on the outer surface of the side walls and which is guided between the bars 425 and 426. Such bars effectively provide a track for respective ones of the rollers. Additional rolling support for the section is provided by a plurality of rollers 28A pivotally secured to respective ones of members 401, 402 and 403 adjacent their leading or outer end. The rollers 428A are disposed to be in rolling engagement with the lower wall 425 of the adjacent innermost telescopic member.

The winch 414 is driven by a hydraulic motor M8 through a transmission or gear reduction unit 429. A pair of stops 430 and 431 are secured adjacent respectively the leading and opposing ends of the upper wall 424 of members 402, 403 and 404. These stops abut a member 432 at the leading ends of the adjacent member to limit the inward and outward movement of the boom members.

As previously mentioned, the boom and grapple assembly 400 is pivotally mounted by the trunnion 405 in the A frame 215. Control of the pivotal movement is effected by a pair of hydraulic cylinders 433 connected respectively at opposed ends to the boom 410 and the A frame 215. Each hydraulic cylinder assembly 433 consists of a cylinder 434 pivotally connected by a pin 435 to the A frame 215 and a piston rod 436 pivotally connected by a pin 437 to the boom member 401. The pin 437 is located at a position forwardly of the trunnion 405.

The grapple 460 is suspended from the leading end of boom member 404. The grapple 460 (see FIGS. 76, 77 and 78) consists of a pair of jaws 461 and 462 pivotally suspended by a yoke 463 from a member 464 rigidly attached to the boom. The jaw 462 consists of a pair of arcuate plate members in spaced relationship with the single plate member of a jaw 461 interposed therebetween. The single member of jaw 461 terminates at the upper end in an enlarged hub 465 having an annular ridge 466 in each of a pair of opposed faces. The internal surface of the hub is provided with a plurality of teeth forming an internal ring gear 467. The hub of the jaw member 461 is interposed between the hubs 468 of the pair of plate members forming the jaw 462. The face of the hub 468 includes an annular groove receiving the ridge in the adjacent hub of the other member. The hubs 468 are pivotally secured to the yoke 463 by a pin 469. The axis of the pin is parallel to the longitudinal axis of the boom. A plurality of planetary gears 470 are pivotally mounted on shafts 471 anchored in the hubs 468 of the spaced members. The planetary gears 470 mesh with the internal ring gear 467. A drive pinion 472 is journalled on a shaft 473 driven by a hydraulic motor 474. The shaft 473 is journalled in each of the hubs 468 of the two members forming the jaw 462. The hydraulic motor M6 is connected to the hydraulic pump 210 (see FIG. 82) by a hydraulic line 474 through a control valve C5 to be described hereinafter. The line 474 is carried on a spring controlled reel 475 rotatably supported on the boom 410. The spring controlled reel allows the hydraulic line to unreel and reel in as the boom is extended and retracted.

The boom and grapple assembly 400 shown in FIG. 1 includes a heeling device 485 located intermediate the grapple and boom pivotal support. The heeling device is adjustable and provides means for raising and lowering the forward end of a log being lifted by the grapple. This facilitates feeding the lifted log to the processing machines, when the log is completely off the ground. The heeling device 485 consists of a wishbone or inverted Y-shaped member 486 having a stem 487 pivotally connected by a pin 488 to a hydraulic cylinder 489. The hydraulic cylinder is anchored by a lug 490 to the boom member 401. The member 487 terminates in a pair of outwardly flared legs 491. The legs are interconnected by a pin 492 and a roller 493 is mounted on the pin. A pair of arms 494 are pivotally connected at one end by a pin 495 to the boom member 401 and at the other end to the Y-shaped member 487 by the pin 492. As seen in FIG. 3 the pair of members 494 are crossed braced by members 496. The pivot pin 488 connecting the hydraulic cylinder and the Y-shaped member is horizontally movable through actuation of the hydraulic cylinder effectively to vary the vertical height of the roller 493. The roller is adapted to engage a tree suspended horizontally from the grapple and provides means for changing the horizontal attitude of the tree.

In the machine illustrated in FIGS. 4 to 7 inclusive, there is a modified boom and grapple assembly. Details of such are illustrated in FIGS. 71 to 75 inclusive.

Shown in FIG. 71 the boom consists of a fixed section 1401 and two movable sections 1403 and 1404. Each of the movable sections is guided by a pair of rollers 1405 secured one to each of the side walls 1406 and 1407 of the members 1401 and 1403. The rollers are mounted by a pin 1408 secured to the side wall and disposed vertically. The roller projects through the side wall of the member to which it is attached and engages the side wall of the adjacent telescopic member. Each of the members 1401 and 1403 has horizontally disposed rollers secured to the leading edge thereof to engage the adjacent movable member. A pair of rollers 1410 and 1411 are secured respectively to the upper and lower trailing ends of the movable members 1403 and 1404. These rollers engage respectively the upper and lower inner surface of the adjacent boom member. The movable sections are by the foregoing rollers fully guided and supported during extension and retraction of the boom. Additional guide in movement is provided by a circumferential groove 1412 in the uppermost roller 1410. A guide bar 1413 is rigidly secured to the upper wall of the adjacent member so as to be disposed in the groove 1412 and thereby guide the members. The lower roller 1411 may be a similar construction or alternatively as shown in FIG. 73 consist of a pair of rollers 1411a and 1411b secured in spaced relationship along a shaft 1414. A bar member 1415 is secured to the lower wall of the outer member on the inner face thereof and is disposed between the rollers. The bars 1413 and 1415 extend longitudinally of the boom. The bars 1413 and 1415 not only provide a guide but additionally perform the function of connecting two U-shaped channel members to form the box shaped boom section. In the lower roller assembly the pin 1414 is journalled in a bushing 1416 secured by a bracket 1417 to a cross member 1418. The cross member 1418 interconnects the side walls of the box section member. In the lower assembly a roller 1409 is pivotally mounted by a pin 1419 secured by plates 1420 to the side walls of the box member. The pin 1419 has a chordal removed portion bearing against a bar 1421 and thereby is prevented from rotation.

The boom sections 1401 and 1403 have a pulley 1422 pivotally mounted by a pin 1423 to the leading end thereof. A winch assembly 1424 is secured to the boom member 1401 at the rear end thereof. A cable 1425 has one end thereof wound on a drum of the winch assembly and the other end is attached to the boom section 1403 at the trailing end thereof. The cable 1425 passes over the pulley 1422 intermediate the ends thereof. A second cable 1426 is anchored by a clevis 1427 to the pulley 1422 on the member 1401. The other end is anchored to the trailing end of the boom member 1404. The cable 1426 is threaded over the pulley 1422 on the member 1403 and thereby extends the boom member 1404 simultaneously with extension of the boom member 1403 from the fixed boom section 1401. A third cable 1427 is anchored at one end to the trailing end of the boom member 1404 and the other end is wound on a second drum on the winch assembly 1424.

Referring now specifically to FIGS. 74 and 75 the winch assembly 1424 consists of a pair of drums 1430 and 1431 of different but related diameters. The drum 1431 is mounted by a shaft 1432 between a pair of side walls of a casing and the shaft is mounted in a pair of journals 1433 and 1444. The shaft is effectively cantilevered from these bearings and the free end is attached by a rotary hydraulic coupling 1435 to a hydraulic feed line or supply line 1436. The drum 1431 includes a pair of lands 1437 and 1438, the cable 1425 being wound upon the land 1437 and a hydraulic line 1439 being wound upon the land 1438. The hydraulic line 1439 is connected at one end to the shaft 1432 and the hydraulic coupling 1435. The drum 1430 is mounted on a shaft 1440 journalled to the side walls of the casing by bearings 1441 and 1442. A pair of meshing gears 1443 and 1444 are mounted respectively on shafts 1432 and 1440 respectively by hubs 1445 and 1446. The shaft 1432 is driven by a hydraulic motor M8 through a gear or drive member 1447 of a transmission assembly not shown. The cable 1427 is wound upon the drum 1430 for retracting the movable sections by winding the cable onto the drum. The fixed section of the boom is pivotally mounted on the pin 267 at the upper end of the members projecting upwardly from the A frames by a member 461. The member may be a split collar having one portion thereof secured to the member 1401 and the other part forming a cap detachably secured thereto by studs or any other suitable construction. A pair of hydraulic cylinders 1450 are secured respectively to the frame members 279 and the boom fixed section 1401. Each cylinder assembly consists of a cylinder 1451 pivotally anchored by a pin 1452 to the frame members 279 and a movable piston rod 1453 pivotally anchored by a pin 1454 to the boom member 1401.

Grapple 1460 suspended from the free end of the member 1404 consists of a fixed jaw 1461 and a movable jaw 1462. The fixed jaw 1461 includes a hollow casing 1463 terminating in a lower hooked end portion 1464. The movable jaw 1462 is mounted on the hollow casing by a pivot pin 1464. The pin 1464 passes through a pair of ears secured to the housing and the jaw 1462 passes through an aperture 1465 in the housing.

A hydraulic cylinder 1466 is disposed within the housing and anchored at one end by a pin 1467 to the housing and at the other end by a pin 1468 to a lug 1469 secured to the movable jaw. The hydraulic cylinder is a double acting type connected at one end to the hydraulic supply hose 1439, the other end of the cylinder is connected by a hose 1468 to an accumulator A2. The accumulator A2 is disposed within the last or innermost section of the boom adjacent the free end. The accumulator provides positive pressure for the upper end of the hydraulic cylinder 1466 normally biasing the jaws to a closed position. The accumulator A2 is a common, well known type having a free movable piston 1470 separating the cylinder into a pair of chambers 1471 and 1472. A fluid is disposed in the chamber 1472 and communicates with the hydraulic cylinder. The other chamber 1471 is filled with a compressible fluid such as air. Biasing the jaws to a closed position is a safety feature whereby the log will not be dropped or released by the jaws in the event of a failure in the overall hydraulic system for the vehicle.

Hydraulic controls

The processing machines of both embodiments previously described are hydraulically operated. The motor 200 mounted on the base of the frame provides power for driving hydraulic pumps. Three pumps are shown in FIG. 2 and they are identified by the reference numerals P210, P211 and P212. FIGS. 82 to 84, inclusive, are schematics of the hydraulic system for the machine illustrated in FIGS. 1 to 3 inclusive.

Referring to FIG. 82 the pump P210 is connected to a sump S and provides power for the motor M3B through a control valve C1. The pump P210 powers the pair of hydraulic cylinders 433 for lifting and lowering the boom and is controlled through a valve C3. The pump P210 also powers the hydraulic cylinder 489 for raising and lowering the guide roll on the boom and is controlled through a valve C4. The pump P210 further drives the hydraulic motor M5A for slewing the vehicle and is controlled by a valve C2. The pump P210 drives motor MG for opening and closing the grapple on the end of the boom and is controlled by a valve C4. Pump P210 also drives the boom and winch motor M8A which is controlled by a valve C6. The valves C1 to C6 inclusive are manually controlled by the operator at the operator control panel C.P.

FIG. 83 is a schematic of the hydraulic system for the machine illustrated in FIGS. 1 to 3 wherein the pump P211 is connected to a sump S and through control valves C7, C8 and C9 respectively to motors M6A, M1A and M2A. Hydraulic motor M6A drives the feed rollers. Hydraulic motor M1A drives the debarker, and motor M2A drives the delimber.

As shown in the schematic of FIG. 4, the hydraulic pump P212 is connected to a sump S and drives motor M3A. The motor M3A is controlled by a valve C10. The pump P212 powers the pair of hydraulic cylinders 913 and 914, on the cut-off knife. These cylinders are controlled by a control valve C11, which may be manually or electrically operated. The valve is connected to the pump through an accumulator C1A and a check valve CV1A.

The control valve C11 may be operated electrically through a solenoid S having a winding W center tapped so as to provide windings W1 and W2. The winding W1 is connected by suitable leads across the battery BT1 through the counter switch SW15 and the winding W2 is connected to the electrical source through a switch SW16. When the counter switch SW15 is closed, the winding W1 of the solenoid is energized and moves the operator valve to the left as shown in FIG. 84 and in such position actuates the knives inwardly toward one another so as to sever or cut the tree. At the end of the cutting stroke, the knife yoke closes the switch SW16 actuating the solenoid winding W2 to move the operator valve C11 to the right as shown in FIG. 84 into a position to move the knives outwardly and out of engagement with the tree. The counter switch SW15 is set to close after each preset number of revolutions of a roll of the feed rolls and actuates the cut-off knife to cut the tree into bolts of substantially uniform length. By disconnecting the switches SW15 and SW16 or by providing a bypass the cut-off knife may be operated manually.

The machine illustrated in FIG. 2 is controlled hydraulically with each operation being individually controlled by the operator at the control panel. In the modified embodiment of the machine illustrated in FIGS. 4 to 7 inclusive, the various operations may be automatically controlled or individually manually controlled.

FIG. 85 is a schematic of the hydraulic system for the machine illustrated in this latter embodiment. The hydraulic system consists generally of two hydraulic pumps identified respectively as P1 and P2 providing fluid pressure for the operation of hydraulic motors M1 to M8 inclusive, through various control or selector valves. These pumps also supply pressure for hydraulic cylinders operating various parts of the machine.

Referring to the schematic in FIG. 85, the pump P1 is a ten piston pump having two pistons providing fluid pressure through a line L1 to a selector valve V1. The selector valve controls the flow from line L1 to one or the other of lines L2 and L3. The line L3 provides fluid for the delimber motor M2 and the flow is controlled by a valve V2. The pump P2 which is also a ten piston hydraulic pump has four pistons supplying fluid to the tractor track motor M4 through the control of valves V2 and V4. These valves are connected by a line L4 which is also connected with the line L2.

As will be seen hereinafter, the output from the pump P2 through line L5 may be added to the output from P1 to provide a driving force for motor M4. The valve V2 controls the flow of fluid to the delimber motor M2 and located in such circuit is a relief valve RV6. A relief valve RV8 is also interposed between the valve V4 and the tractor motor M4. Fluid from six cylinders of the pump P2 is controllably fed respectively to debarker motor M1 and tractor motor M3 through lines L6 and L7 and control for the respective motors is through respective valves V3 and V5. Interposed between valve V3 and motor M1 is a relief valve RV5. A relief valve RV7 is interposed between the valve V5 and the motor M3.

The fluid line L3 from valve V1 connects the output of pump P1 with the feed roll motor M6. Control of fluid to this motor is by a valve V6 and interposed between the valve V6 and the motor M6 is a relief or motor overload valve RV8. The valve V6 also controls the flow of fluid to the speed roll motor M7 through a line L8. Serially connected in line L8 is a needle valve NV1. Fluid from the motor M7 returns to tank T by a line L9 through a back pressure valve BPV1 serially connected therein. A relief valve RV2 is connected to the line L8 by a line L10 intermediate the needle valve NV1 and the valve V6. The relief valve RV2 returns the fluid to the tank T. A pilot line PL1 is connected to the line L9 between the motor M7 and the back pressure valve BPV1 and is connected respectively to master valves V2' and V3' by branch lines PL2 and PL3. The master valves V2' and V3' control respectively slave valves V2 and V3. The pilot line PL1 accordingly interrelates the operation of the feed roll and speed roll motors M6 and M7 respectively with the debarker motor and delimber motor respectively M1 and M2.

The pump P1 is connected to valves V7 and V8 by a line L11. The valve V7 controls the flow of fluid to each of the boom lift hydraulic cylinders 1475, only one of which is shown in FIG. 85. Valve V8 controls the flow of fluid to the boom winch motor M8. A pressure relief valve RV9 is located in the line L11 intermediate the pump P1 and motor M7. Pressure relief valves RV10 and RV11 are located in respective ones of a pair of lines from the valve V7 to the hydraulic cylinders 1475. A pressure relief or motor overload valve RV12 is connected in series with the control valve V8 and the boom winch motor M8. Each of the valves RV9 to RV11 inclusive have lines returning fluid to the tank T. Line L20 supplies fluid to valve V9 and V10 from the valve V8. Valve V9 controls the flow of fluid to the pair of cradle lift cylinders 524 by a line L12. A pressure relief valve RV13 is located in the line L12 and returns to the sump or tank T through a line L13. There is also a return to the tank T from the pressure relief valve RV13 through a line L14. A needle valve NV2 is located in the line L14 and opening of this valve permits a fast lowering of the cradle. Fluid from the cradle lift cylinders also returns to the sump by way of valve V9 through a line L15. A flow control valve FC4 located in line L15 controls the rate of flow returning from the cylinders to the tank T. This control of flow selectively controls the rate of lowering of the cradle from its uppermost to its lower position. The valve V10 controls the flow of fluid to the cradle unload cylinders 545 which open and close the doors 542 and 543 of the cradle 500. A pair of pressure relief valves RV14 and RV15 are located respectively in lines L16 and L17 connecting the valve V10 with opposite ends of the double-acting cylinder. The pump P1 supplies fluid to the shear cylinders 958 and the fluid thereto is controlled by a valve V13. Fluid from the cylinders returns to the tank T from the valve V13. The fluid from the pump P1 to the valve V13 is through a line L18 and located therein between the pump and the valve is a standard accumulator system with an unloading valve. An accumulator A1 in the line L18 has a return to the tank T through a needle valve NV3. This valve allows dumping or emptying the accumulator into the tank T. The line L18 also includes a return to the tank T through an unloading valve UV1. One return to the tank is through a line L19 and a second return is through a line L21 having needle valve NV4 therein. The line L18 intermediate the accumulator A1 and valve V13 has a branch line L22 supplying fluid to the slewing motor M5 through a valve V11 and the grapple hydraulic cylinder 1466 through a valve V12. The valve V12 is connected to the branch line L22 through a flow control valve FC2. The grapple hydraulic cylinder has an accumulator A2 connected to one end thereof and the accumulator returns to the line intermediate the valve V12 and the hydraulic cylinder by a line L24. Located in line L24 is a normally closed needle valve NV5. A pressure reducing valve PR1 is connected in series with the valve V2 and the grapple hydraulic cylinder 1466. The rotary hydraulic coupling 1435 is located intermediate the pressure reducing valve PR1 and the hydraulic cylinder 1466.

A second pilot line PL4 is connected to the line L8 intermediate the valve V6 and the needle valve NV1. The pilot line PL2 is also connected to a master valve V13' controlling the slave valve V13. The valve V1 is in a 2-position, 3-way selector valve controlled or operated by a solenoid $S_S$. The valves V2 and V3 controlling respectively motors M1 and M2 are slave valves controlled respectively by solenoid actuated master valves V2' and V3'. The valves V2' and V3' are actuated respectively by solenoids $S_L$ and $S_D$. The grapple control valve V12 is the same type as valve V1 and is actuated by a solenoid $S_G$. The shear cylinder control valve V13 is a directional control air operated valve slave to a master valve V13 controlled by a pair of solenoids $S_C$ and $S_O$ respectively the shear close and shear opening solenoids. The feed roll motor control valve V6 is a 3-position, 4-way valve actuated by a pair of solenoids $S_R$ and $S_F$. The valves V4 and V5 are each 3-position, 4-way manually controlled valves, which for a matter of convenience of construction, are mounted together as a single unit. The valve V11 is a 3-position, 4-way directional control valve manually operated. The valves V7 and V8 are 3-position, 4-way manual control valves. The valves V9 and V10 are mounted as a single unit and are manually operated valves.

The partial block and schematic diagram in FIG. 85 of the overall hydraulic control system for the processing machine of FIGS. 4–7 inclusive is broken up into several sections relating to the various phases of operation. The hydraulic circuits for these phases are shown in considerable detail in FIGS. 86-94 inclusive, the reference numerals on the supply lines to the valves and returns being identified with similar references throughout the group of FIGS. 86-94 thereby illustrating the overall detailed hydraulic system for the machine.

FIG. 86 shows the hydraulic pump P1 and a standard accumulator system having an accumulator A1 and various unloading and dumping valves. FIG. 87 is a schematic of the tractor track hydraulic motors and controls therefor. FIG. 88 is a detailed schematic of the hydraulic system and controls for the slewing motor M5. FIG. 89 is a detailed schematic of the hydraulic system for the boom winch motor M8 and boom lift cylinders 1475. FIG. 90 is a detailed schematic of the hydraulic system and control for the boom grapple cylinder 1466. FIG. 91 is a detailed schematic of the hydraulic system for the debarker and delimber motors respectively M1 and M2 and the second pump P2. FIG. 92 is a detail of the hydraulic system of the feed roll motor M6 and speed roll motor M7. FIG. 93 is a detail schematic of the hydraulic system for the boom shear cylinders 958 and FIG. 94 is a detailed schematic of the hydraulic system for the cradle unload cylinders 545 and the cradle lift cylindpers 524.

Referring now in detail to FIG. 86, the pump P1 is a fixed displacement split 6-bore hydraulic pump driven at approximately 2200 r.p.m.'s by the main power plant providing an input of roughly 140 H.P. The pump P1 is connected to a sump or tank T through a filter or strainer F and a needle valve NV10. Two pistons of the pump P1 are connected to the selector valve V1 to deliver thereto approximately 7.2 U.S. gallons per minute. The selector valve V1 is a 3-position, 4-way manual control valve assembly connected to the tank T. One outlet of the valve is connected to the delimber motor control valve V2 by a line L2 and to the right track control valve V4 by the same line. Another outlet from the valve V1 is connected to the feed roll and speed roll control valve V6 by a line L3. Three pistons of the pump P1 are connected to the boom winch and lift control valves V7 and V8 (see FIG. 9) by a line L11. A pressure relief valve RV9 (FIG. 92) is connected to the line L11. Five pistons of the pump supply fluid pressure to the shear control cylinders 958 through the shear cylinder control valve V13 (see FIG. 93) by a line L18. The back pressure valve BP3 is serially connected in the line L18. The accumulator A1 is also connected to the line L18. There is a return from the line L18 sump T through an unloading valve UV1. A further return to sump from the unloading valve is by way of line L20 through the needle valve NV4.

The selector valve V1 is controlled by an electrical solenoid $S_S$ and the circuitry for effecting such actuation will be described hereinafter.

Referring to FIG. 87, the tractor is driven by the left track motor M3 and the right track motor M4 controlled respectively by valves V5 and V4. Interposed between the motor M4 and the valve V4 is a relief valve RV8. The pressure in these valves is roughly 6000 p.s.i. The valves V4 and V5 are supplied with fluid by the line L2 and L7.

Figure 8:
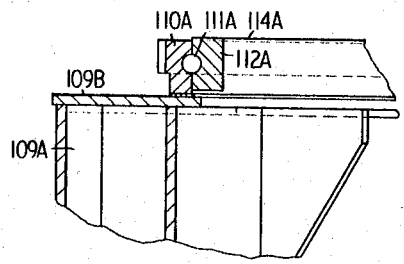
FIG. 8 is an enlarged, partial sectional view taken substantially along section 8—8 of FIG. 5, illustrating one detail of the mounting of the machine frame on the tractor.

Referring to FIG. 8 the slewing motor M5 is controlled by a 3-position, 4-way directional control valve V11 manually operated by a remote control RMC. Fluid to the valve is supplied through a flow control valve FC3 by the line L21 from the pump P1. Connected intermediate the motor M5 and valve V11 is a motor overload relief valve RV15.

Referring to FIG. 89 the boom winch motor control valve V8 and the boom lift cylinder control valve V7 are supplied with fluid pressure by the pump P1 through the line L11. The pressure relief valve RV12 is located between the valve V8 and the motor M8. Pressure relief valves RV10 and RV11 are also in respective ones of supply lines to the lift cylinders 1475. A supply line L20 from the valves V7 and V8 provides fluid for the cradle lift control valve V9 and cradle unload valve V10. The line L20 has a normally closed valve V50 for returning fluid to the sump.

Referring to FIG. 90, fluid is supplied to the grapple cylinder control valve V12 by a line L21 through the flow control valve FC2. The valve V12 controls the grapple cylinder 1466 and in series with the valve V12 is a pressure reducing valve PR1. The rotary coupling 1435 is also in series.

Referring to FIG. 91, the pump P2 is connected to a sump or tank T through a needle valve NV15. Fluid pressure is supplied by the pump P2 respectively through lines L5 and L6 to motor control valves V3 and V2. These slave valves are controlled respectively by solenoid actuated master valves V3' and V2'. The valve V3' is operated by the delimber solenoid $S_D$ and the valve V2' is operated by the delimber solenoid $S_L$.

Referring to FIG. 92, the line L3 from the selector valve V1 returns to the tank T through a variable flow control valve FC1. The line L3 also supplies fluid to the motor M7 and motor M6 and is controlled by the solenoid actuated valve V6. This valve is operated by a pair of solenoids $S_R$ and $S_F$.

Referring to FIG. 93, fluid pressure is supplied by line L18 to the hydraulic cylinder 958 of the shear and is controlled by a valve V13. The valve V13 is hydraulically operated and is slave to a master valve V13' which in turn is actuated by a pair of solenoids $S_C$ and $S_O$. The master valve V13' is supplied by the pilot line PL2 from and the feed roll and speed roll control valve V6.

Referring to FIG. 94 fluid is supplied to the valves V9 and V10 by the line L20 from the boom lift and winch motor control valves V7 and V8. The valves V9 and V10 are manually operated.

FIGS. 95 to 97 inclusive illustrate the hydraulic circuits for the delimber in the second embodiment.

To control the position of the cutters 1621, it is necessary to rotate the cutter arms. This is accomplished by actuation of cylinders 1460. Since the three arms are interlinked by linkages 1646, the cutters 1621 move simultaneously, the same amount. However, the present invention also contemplates individual control of cutters 1621 by disconnecting the linkages 1646.

Turning now to FIG. 95, there is shown a pump P1 connected to a storage tank T. Hydraulic fluid is pumped via line L40 through a valve V40, line L41, filter F2, line L42, to a pair of hydraulic accumulators AC3 and AC4. A fluid return path to the tank T is provided by a relief valve RV40. The accumulators AC3 are connected to a control valve V40 by a line L43.

Fluid pressure provided by the pump is selectively fed to the cylinders 1460 by the control valve V40. The 4-way valve V40 delivers fluid pressure selectively either to the rod or the head end of the double acting cylinders. The purpose of the accumulators is to augment the flow of the pump for fast cycling. They are replenished by the pump between cycles, excess oil being relieved through valve RV40 when the accumulators are full.

Actuation of 4-way valve V40 is accomplished by means of a fly ball mechanism which is responsive to the rotation of the main housing. The fly ball is biased towards the axis of the delimber when the delimber is stationary, by a spring. Centrifugal force throws the ball and thus the valve in the opposite position upon rotation of the delimber.

FIGS. 96 and 97 respectively illustrate alternative arrangements for the hydraulic system for the delimber arm control cylinders 1460.

*Electrical control*

The hydraulic system previously described is controlled in some cases, manually and in other cases by electric solenoids FIGS. 98 to 101 inclusive illustrate the electrical wiring and circuit for machine.

FIG. 98 diagrammatically illustrates the various positioning of the switches with respect to the processing units. Seven sensing switches are utilized, four of which are mounted upon the shear. Three of the sensing switches are mounted upon the feed rolls and preferably on the set adjacent the shear unit. In the processing operation, a tree is engaged by the grapple actuated by the control of the operator and it is fed directly to the delimber unit. The tree then passes respectively continuously through the first set of feed rolls, a debarker unit, a second set of feed rolls and a shear where the delimbed and debarked tree is severed into selected lengths.

The operator control panel includes levers for manually actuating the valves described previously with respect to the hydraulic system. At the operator's station, there is an electrical panel box P enclosing and housing electrical apparatus. A further main control junction box CB is located for convenience of wiring at another position not shown on the machine. The upper surface of the panel box P has a plurality of switches whereby the operator may selectively control through electrical circuits various processing units. On this panel are located switches PB3A and PB3B respectively the feed roll forward and feed roll reverse switches. A further pair of switches PB4 and PB5 respectively manually controlling the closing and opening of the shear. Switches PB6A and PB6B are also located on the panel box and are respectively switches for selecting manual or automatic operation.

The foregoing switches have respective ones of lights LT1 to LT7 associated therewith visually indicating the condition or electrical state of the circuit for its associated switch. The switches on this panel are connected to a terminal block T1. The terminal T1 is connected to a terminal block T2 located in the main junction control box. Terminal block T1 has pairs of contacts 1 to 16 inclusive and terminal block T2 has pairs of terminals 1 to 48 as indicated respectively on each of the blocks. Connected to terminal block T2 is the flapper switch SW4, a grapple switch PB1 on the grapple actuating lever, a foot control delimber override switch SW1, and the engine ignition switch. Also connected to the terminal block T2 are the switches SW5 and SW6 which are the shear closed sensing switches; SW8 and SW9 which are proportional opening shear sensing switches. Shear open solenoid $S_O$ and a shear close solenoid $S_C$ are also connected to the terminal block T2. Switches SW2, SW3 and SW7 which are tree trunk diameter sensing switches mounted on the second set of feed rolls are also connected to the terminal block T2 of the main control junction box. In addition, connected to the terminal block T2 is a feed roll forward repeater relay KF, a feed roll reverse solenoid KR, a debarker solenoid $S_D$, master power relay KM, selector repeater relay KS, a delimber solenoid SL and grapple relay KG.

FIG. 101 schematically illustrates the electrical circuit for the entire machine. All contacts for the relays in this schematic are illustrated in the position with the respective or associated relay in a de-energized state. Switches SW5 and SW6 are shown as two separate switches and these two may be replaced by a single switch SW5' as previously described in the specification.

FIG. 101 will now be described with reference to a plurality of parallel circuits A to T inclusive. Each of these circuits includes marks indicating a connection and identified by reference numerals, for example, C/1, C/31, C/13, P/2, P/3, etc. The prefixes C and P refer respectively to the connections in the control box CB and panel box P, to terminal blocks T2 and T1, the numeral giving the terminal connection on these blocks.

The circuits A to T inclusive are electrically connected in parallel by lines LA and LB having a 24 volt battery connected thereacross as will be seen hereinafter in circuit T. The circuit A includes a switch PB1 in series with the grapple relay KG. The circuit B consists of debarker solenoid $S_D$ in series with switch PB2. A debarker white on-light LT1 is in parallel with the solenoid $S_D$. The circuit C consists of relay KF which is feed roll forward relay in series with the switch PB3A. A green light LT3 indicating the forward on for the relay is in parallel with the relay KF. Circuit D consists of feed roll reverse relay KR in series with the switch PB3B. A red light LT2 is in parallel with the relay indicating the reverse relay on. Circuit E consists of the delimber solenoid $S_L$ in series with relay contacts K1 and relay contacts K9. Paralleling the relay contacts K1 and 9 is the foot delimber override switch SW1. Circuit F consists of a relay K11, the less than 3-inch log diameter sensing relay which initiates chopping after flapper switch SW4 has been operated. The relay K11 is in series with relay contacts K8, relay contacts K2, relay contacts K4, and this series circuit is connected to the fixed contact NC of switch SW2. The circuit F further includes delimber relay K1 in series with relay contacts K3 and relay contacts K1, the circuit being connected to lines LA and LB and thereby being parallel to circuits A to T. A fixed contact NO of switch SW2 is connected in circuit intermediate relay K1 and contacts K3. The movable contact of switch SW2 is connected to line LA. Circuit G consists of a relay K2, sensing 1½ inch diameter logs which operates from the delimber sensing switch SW3 in series therewith. Circuit H consists of a delimber hold relay K3 in series with relay contacts K2 and relay contacts K1. Paralleling the contacts K1 are relay contacts K3. Circuit I consists of shear closed relay K4 in series with relay contacts K4, relay contacts K9 and relay contacts K5. In parallel with relay contacts K9 and K4 are contacts K9 and the manual shear close switch PB4. Also in parallel with the relay contacts K4 are relay contacts K10 and the flapper switch SW4. In parallel with relay K4 is the light LT4 indicating the shear closed. Circuit J consists of the shear close solenoid $S_C$ in series with relay contacts K4. Circuit K consists of the shear open solenoid $S_O$ in series with relay contacts K5. The circuit L consists of the shear open relay K5 in series with relay contacts K7, switch SW6, switch SW5, relay contacts K9 and relay contacts K8. Relay contacts K5 are in parallel with serially connected switches SW5 and SW6. Relay contacts K2 are in parallel with the serially connected switches SW5, SW6 and relay contacts K7. The switch PB5 and relay contacts K9 are in parallel with the relay contacts K9, switch SW5, SW6 and relay contacts K7. A light LT5 parallels the solenoid K5. The circuit M consists of a 6-inch tree diameter size sensing relay K6 in series with relay contacts K2 and the switch SW7. Circuit N consists of the shear open 6-inch tree diameter sensing relay K7 in series with relay contacts K8, relay contacts K6 and switch SW8. Circuit O consists of shear opening relay K8, in series with switch SW9. Circuit P consists of a blue light LT6 indicating the manual operation in series with relay contacts K9. Circuit Q consists of serially connected switches PB6A and PB6B respectively the manual and automatic operation selection switches and the relay K9. Paralleling relay K9 is the light LT7 indicating automatic operation. Circuit R consists of chopping relay K10 in series with relay contacts K7 and K11. Circuit S consists of selector relay KS in series with switch PB3A the latter of which is parallel with switch PB3B. Circuit T consists of line T1 connecting a battery BT in series with relay contacts KM and a 20 circuit breaker CB to lines LA and LB. A selector solenoid $S_S$ and serially connected relay contacts KS; feed roll forward solenoid $S_F$ and serially connected relay contacts KF are connected in parallel with the battery BT and contacts KM through a 50 amp fuse or circuit breaker FS2. The grapple solenoid $S_G$ connected in series with relay contacts KG and feed roll reverse solenoid $S_R$ in series with relay contacts KR parallel the battery BT and relay contacts KM and are connected thereto through a 50 amp fuse or circuit breaker FS3. Motor starter solenoid SKMS is connected in series with a switch ST which parallels the ignition switch and master relay KM, and together are connected across the battery through a 20 amp circuit breaker FS4 and ammeter AM. A voltage regulator R in series with the generator G is connected across the battery through the ammeter AM. A motor starter S and relay contacts KMS are also connected across the battery.

The relay contacts in the various circuits are normally open unless otherwise indicated as in the foregoing description. All relays K1 to 9 inclusive and 11 are Clare type A700061 and relay K10 is an Agastat type DD–G–11 relay having a 0–2 second delay (adjustable). Switch PB2 is an illuminated push on-off switch for example a Honeywell 52PB67–T2 and switches PB3A, 3B, 4, 5, 6A and B are illuminated solenoid interlocked switches, for example Honeywell switches 52PB8–T2. The debarker on switch P62 releases (off) on the second push. Unless the engine is on, none of the push-lights will work. The push-light switches are mounted in the panel box P.

The control box C.B. serves as a mounting place for ten Clare 24 v. DC plug-in relays, one Agastat 0–2 second timer, and one master power relay. The master power relay KM disconnects all power from the system if the Logging Combine engine ignition is off. The Agastat K10 governs the "fast chop" cycle in that a short time delay results in short lengths of log being chopped while longer time settings produce longer logs, since the rolls can move the tree trunks further between chops. Four terminal strips provide 48 connection points for wires to this chassis. Other than K10, there are no adjustments and a defective relay can be quickly replaced due to the plug-in feature. The relays are totally enclosed to keep out dirt.

The following components are mounted in the control box:

K1–9, 11—Clare A700061 (Relay 24 v. DC coil)
K10—Agastat DD–G–11 (0–2 second delay)
KM—Potter & Brum MB3D (50 amp contacts)
Term. strips—Jones 12–141 (through panel type)
Relay sockets—20 pin amphenol 77–Mit–20

Flapper switch SW4 which may be a Honeywell impulse switch 1PDi is remotely located on the machine.

The motor portion of the schematic in FIG. 101 represents the usual standard automotive electrical starter-battery and ignition system. Ignition relay contact KM *prevents* operation of the rest of system *unless motor ignition is on.*

The solenoids of the hydraulic system operate via repeater relays because of large momentary solenoid currents. Example: Relay KG operates solenoid SG etc.

*Operation*

In operation, the mobile or self-propelled processing machine is driven into an area of filled trees and preferably positioned adjacent the butt ends thereof. In the machine illustrated in FIGS. 1 to 3, the operator regulates motors M3A and M4A through control valves C10 and C11 respectively, to move the tractor into the desired position. The slewing motor M5A is then operated to rotate the frame 200 on tractor base 100 to position the grapple end of boom 400 adjacent the butt end of the felled tree selected by the operator for processing. The boom 410 is extended and pivoted on its horizontal axis about trunnion 405 so that the grapple jaws engage the tree trunk at a position spaced from the butt end of the trunk. Preferably, the tree trunk is engaged by the grapple jaws at a point between the butt end of the tree and the tree's center of gravity so that, as the butt end of the tree is elevated by the boom the top or far end of the tree remains resting on the ground.

With the grapple jaws in position around the tree trunk, valve C5 is shifted to close the grapple jaws and grasp the tree trunk between the grapple jaws 461 and 462. The butt end of the tree is then raised by positioning valve C3 to admit fluid to cylinders 433 raising the grapple end of boom 410 and motor M8A is actuated to retract the boom, pulling the butt end of the tree toward the delimber 600 of the processing machine. As the butt end of the tree is moved toward delimber 600, the operator adjusts the height of guide roll 493 by regulating cylinder 489 through valve C4 bringing guide roll 493 into contact with the tree. By controlling the height of the grapple end of boom 410 and the guide roll the tree is aligned with the central axis of the tandem aligned processing units.

As the butt end of the tree approaches the delimber 600, control valve C7 on the delimber motor M2A is positioned by the operator to rotate delimber housing 602 counterclockwise, pivoting arms 607 and to move the cutter heads 608 outwardly away from the tree. The butt end of the tree trunk is fed directly into the delimber by retracting the boom 410 and after the butt end of the tree is positioned between cutter heads 608, the operator repositions valve C7 to reverse the motor M2A and rotate the housing 602 in the other direction bringing the cutter heads 608 into contact with the advancing tree.

By setting the valve controls C9 and C8 the respective motors M1A and M6A, the debarker 700 and feed rolls 800 are placed in operation. These controls may be set and the operation of the debarker 700 and feed rolls 800, commenced by the operator at his convenience at any time before the tree is fed into the first set of feed rolls.

With the cutter heads 608 in contact with the tree, the retraction of boom 410 by the motor M8A continues feeding the tree through the cutter heads which are revolving around the tree clockwise and, as they revolve, are rotating on their own individual axis counterclockwise as viewed in FIG. 18. As the tree trunk is fed by the retracting boom 410 through delimber 600, projections such as limbs extending outwardly from the trunk into the path of the revolving and rotating cutter heads are cut off, the delimbed butt end of the tree is fed further by boom 410 so as to be brought into contact with the spiked rolls 807 of the first set of feed rolls 800.

Spiked rolls 807 are driven in an infeed direction to feed the butt end of the delimbed tree into the debarker 700 at substantially the same speed as the feed of the retracting boom 410. With feed rolls 807 in driving contact with the tree, if desired, guide roll 493 may be elevated toward the boom 410 and out of engagement with the tree by the operator by adjusting the valve control C2 to retract the hydraulic cylinder 489.

As the feed of the delimbed tree by retracting boom 410 and feed rolls 800 continues, the butt end of the tree engages revolving blades 707 of debarker 700 forcing the blades 707 outward on their spring tensioned pivotal mounting on revolving housing 706 as described in the aforecited patent to Brundell to remove the bark from the tree. As the feeding of the tree continues, the delimbed and debarked end of the tree is engaged by the second set of feed rolls 800 which are rotating at a speed commensurate with the first set. Once the tree is in contact with both sets of the feed rolls 800, continuation of further feeding of the trees through the processing unit is solely by the feed rolls. With the tree embraced by the spiked rolls 807 of feed rolls, the grapple jaws are opened by the operator, releasing the tree, and the control valve C6 for motor M8A shifted, stopping retraction of boom 410.

After grapple 460 has been disengaged, the free end of the tree rests on and is dragged along the ground by the forward feeding action of the feed rolls 800. To facilitate alignment of the tree longitudinal axis and the axis of the in line processing units, the subframe assembly is tilted downwardly. The alignment is further facilitated by the pivotal mounting of beams 301 whereby the subframe assembly having the delimber 600, debarker 700 and cut-off knife 900 pivots about a horizontal axis. Thus, the common feed axis of the delimber, debarker and cutoff knife, which may be referred to as the feed path, is free to follow and remain in alignment with the tree. The orientation of the tree with respect to the apparatus may vary somewhat as the tree is initially fed forward first by the grapple and then by the first set of feed rolls 800. The pivotal mounting of the beams 301 also tends to minimize bending moments which otherwise would result if the tree were not aligned with the feed axis of the delimber, debarker and cut-off knife.

From the last set of feed rolls, the delimbed and debarked tree passes between the pair of knives 910. After a length of tree trunk has been fed past feed rolls 800, pre-set counter switch SW15 is automatically actuated and the knife blades are moved inwardly into contact with the advancing tree trunk. When the knife blades contact the tree trunk, knife housing 901 is moved rearwardly by the advancing tree trunk, compressing springs 909. As the housing 901 moves rearwardly the knives 910 complete the cut whereupon the knife yoke closes switch SW16 re-setting the valve C11 to open the knives. As soon as the knives have cleared the butt end of the tree, the springs 909 returns the housing 901 to its initial position to await subsequent operation by switch SW15 or manual operation by the operator should such manual operation be desired.

To avoid undue pivotal movement of the subframe assembly 300, it may be locked if desired with respect to the A frames 215 by the hydraulic cylinders 304. This may be desired when the knife blades 910 are in engagement with the advancing delimbed and debarked tree and knife housing 901 is spaced rearwardly away from delimber 600. In such a case the locking may be accomplished automatically by a valve V50 positioned in the by-pass line of cylinder 304. A valve control C20 of valve V50 is positioned with its forward end in contact with knife housing 901 when the latter is adjacent the debarker 600. On actuation of the knife cylinders 913 and 914, the knife housing 901 is moved away from the debarker by the advancing delimbed and debarked tree disengaging the valve actuator C20. The spring loaded actuator closes the valve V50. With valve V50 closed, the piston and piston rod are locked in position, cylinder 304 locking beam 301. When the housing 901 is returned by the compressed springs 909 to its original position valve V50 is reopened, unlocking the piston and piston rod freeing the beams 301 for pivotal movement.

A manual valve on by-pass V51, open during the normal operation of the machine, is also provided for manually locking the piston and piston rod if locking is desired, for example, during moving of the machine from one location to another.

As is apparent from the foregoing, once the felled tree is grasped by the grapple on the boom, the limbs and bark are removed from the tree and the delimbed and debarked tree is cut into predetermined lengths while the tree being processed moves continuously through the machine. The operations, i.e. the delimbing, debarking and cutting, are performed in sequence but occur simultaneously as the tree moves continuously to provide a continuous operation. The entire processing operation is completed in a simple operation. Once the butt end of the tree is aligned with the delimber and fed into the feed rolls, the machine handles the tree for delimbing, debarking and cutting, the operator merely determining that the controls for the various units are properly positioned. After the felled trees within the reach of the extended boom have been processed, the machine is readily moved by the operator to the next processing site, ready to process trees at the new site.

The processing machine illustrated in FIGS. 4-7 inclusive processes a tree substantially in the same manner as the other embodiment of the processing machine. There are, however, a few refinements and also additional pieces of equipment. Control, however, of the machine is substantially modified, the main feature being that the majority of the processing operations can be controlled either manually or automatically Referring to FIG. 4 generally for the operation, a tree TR having limbs and branches thereon is fed into the axially aligned processing units by the boom and grapple assembly 400. The butt end of the tree passes in sequence through the delimber 600, a first set of feed rolls 800, a debarker 700, a second set of feed rolls 800 and the delimbed and debarked tree is then severed into a selected length by the shear unit 900. The log separated from the remaining portion of the tree trunk falls by gravity into the cradle assembly 500. The trailing end of the falling log drops onto the speed roll 1100 which accelerates the processed log to assist in placing the latter in the cradle 500. Before the log is severed by the shear unit 900, the leading end strikes the flapper plate 1002 actuating the flapper switch SW4 thereby readying an electrical circuit for effecting actuation of the shears.

A plurality of trees are fed in sequence through the processing unit by the boom and grapple assembly 400. The boom is extended by winding the cable 1425 on the winch drum 1431 driven by the motor M8 having a gear or sprocket SP drivingly engaging the gear 1443. A further section of the telescopic boom is simultaneously extended outwardly by the cable 1426. The operator raises and lowers the boom by manipulating the control valve V7 and the machine is pivoted about the vertical axis by the operator controlling the valve V8. In this manner, the machine which has been driven by the operator into an area of felled trees, is oriented to a position for selecting trees to be engaged by the boom. The selected tree is then fed to the processing units on the machine.

The grapple which is of somewhat different construction from that in the first embodiment is controlled by the valve V12. The hydraulic cylinder 1466 is baised by a compressible fluid in the accumulator A2 such as normally to retain the grapple jaws in a closed position. Fluid may be selectively admitted to the accumulator to make up for lost fluid through the needle valve NV5. In order to grasp a tree, the valve V12 is operated so as to move the jaws open against the pressure of the compressible fluid and the tree is then engaged by the grapple jaws. The front end of the tree is lifted and fed directly into the first of the processing units by retracting the boom. Feeding of the tree by the boom continues such that the tree is engaged by the first set of feed rolls. The grapple is then released by operating the valve V12 and the selected tree is fed through the processing units by the driven feed rolls 800. While the tree is being processed, the operator controls the valves for the boom winch motor and grapple cylinders to grasp and feed a second tree to the processing units.

The operation of the grapple 1466 is made clear with reference to FIGS. 81 and 90. Opening the valve V12 permits the hydraulic pump P1 to pump hydraulic fluid to the lower chamber of the hydraulic cylinder 1466 forcing piston and rod inwardly into the cylinder portion of the hydraulic cylinder. The jaw 1462 moves upwardly (as viewed in FIG. 80) thus opening the grapple. Hydraulic fluid is forced from the upper chamber of the hydraulic cylinder 1466 through the line 1468 to one chamber of the hydraulic accumulator A2. This excess fluid forces the free-floating piston 1470 into the other chamber 1471 of the accumulator A which contains nitrogen (or some other compressible gas, e.g., air). As long as the valve V12 is open to connect pump P1 to the system, the compressed gas remains as potential energy.

When it is desired to close the grapple, the valve V12 connecting the pump P1 to the system is closed. This permits the potential energy in the accumulator to be released. This, in turn, forces the free-floating piston into the chamber 1472 which moves hydraulic fluid into the hydraulic cylinder 1466. This moves the piston and its associated rod downwardly, thereby moving the movable jaw 1462 thus closing the grapple.

An advantage of this sequence for opening and closing the grapple is that more positive gripping of trees is assured through the reserve power residual in the accumulator.

In the boom illustrated in FIGS. 4 to 7 and 71 to 73 winding cable 1425 onto wind-up drum 1430 extends the movbale boom section 1403 outwardly. Winding the cable 1427 onto wind-up drum 1431 retracts boom section 1404. The cable 1426, anchored at opposed ends to boom sections 1401 and 1404, co-relates movement of the movable boom sections.

As previously mentioned the processed logs are deposited in the cradle 500 located at the rear of the machine. In order to obtain a relatively neat arrangement or pile of logs in the cradle the cradle may be raised vertically and lowered slowly by appropriate adjustment of the flow control valve FC4. The rate of lowering of the cradle may be related to the rate at which the logs are being deposited in the cradle such that each log has very little vertical drop before being deposited.

When the cradle 500 is filled with processed logs, the hydraulic cylinder 1040 on the flapper is actuated such as to pivot the flapper 1002 outwardly to a substantially horizontal position. The cradle 500 is then raised vertically by the cradle lift cylinders 524 controlled by the operation of valve V9. When the cradle is in a vertical position, a truck or the like may be backed thereunder and the cradle doors 542 and 543 opened by actuating the hydraulic cylinders 545. Actuation of the cylinders is controlled by the valve V10. Subsequent to unloading the logs, the cradle is lowered and the flapper plate pivoted to its normal vertical position and the cradle may thereafter be lifted to receive the next load of logs. In the processing machine of the modified embodiment the hydraulic system is controlled electrically so as to provide manual or semi-automatic operation of the logging machine.

The electrical control system automates the operation of the Logging Combine so that the combine operator need only attend to picking up cut trees with the grapple and feeding these trees into the intake rolls of the machine. Control can be transferred back to *manual* or be *overriden* by pushlights and buttons on the grapple control handle.

The combine removes substantially all of the limbs from all but small trees; debarks the trunks, and senses the diameter of the resulting tree trunk. The trunk/log advances forwardly through open shear blades which, by the proportional opening sensing switches, open just enough to accommodate the trunk.

When the log hits the flapper plate (1002) 8 feet beyond the shear or some other selected length depending upon the positioning of the flapper plate, the shear closes cutting an 8 foot length. The operation repeats until the trunk diameter is down to approximately a 3 inch diameter as the tree top approaches. The delimber stops and the shear fast chops the remaining length into short billets of length set by the adjustable time K10 period. When the trunk diameter is less than approximately 1.5 inches, the combine stops and resets itself to receive the next tree.

The electrical system controls mechanical movements by relays which activate hydraulic solenoid valves, as shown in FIGS. 85 to 96 inclusive.

The control panel CP to the right of the operator has seven "pushlight" switches with illuminated caps (see FIG. 98). The first push of the top white one, switch PB2, turns on the debarker and the internal lamp indicates that it is on. (A second push releases the button and turns the debarker off.) Pushing green and red pushlights 3A and 3B starts the feed rolls moving either forward or reverse. The *forward* pushlight is self-holding while *reverse* pushlight must be held down to maintain contact. The operator switches on the debarker and feed roll motors; depresses white PB2 and green PB3A causing the debarker to run and rolls to move forward; and pushes white "Auto" button PB6B.

The operator then places the boom over a tree. To open the grapple the push button switch PB1 located at the top of the grapple lever is depressed. It remains open as long as the push button is depressed. Releasing the button closes the grapple jaws.

The operator then feeds a tree, butt first, directly into the combine with the grapple where the tree is picked up by the feed rolls 800 and pulled into the machine.

The sensing switches attached to the second feed roll performs the following functions:

(a) Senses entry of all trees greater than 3 inches in diameter and activates the delimber.

(b) Determines if trunk diameter is greater than or less than 12 inches. If less than 12 inches the shear will open only to 12 inch diameter position after first cut has been made.

(c) Senses when trunk diameter is less than 3 inches and starts fast chop cycle.

(d) Senses when trunk diameter is less than 1½ inches and then opens shear to maximum 18 inch diameter position and stops delimber.

A second push button switch SW1 on the grapple lever is provided so that the operator can override (d) and actuate the delimber at will.

Thus during normal automatic operations the operator need only *continually feed trees into the combine with the grapple.*

As soon as a tree enters the rolls the delimber and debarker operate. The shorn trunk moves through wide open shears until the flapper plate is struck. Striking the flapper plate actuates the shear close solenoid Sc. The shears operate and continue closing until the shears closed switches SW5 and SW6 contact. The 8 foot log cut falls into the cradle and shears begin to open. If tree is less than 12 inches in diameter, the shears stop opening at 12 inches. If tree is greater than 12 inch diameter, the shears open wide to 18 inch diameter. The shears remain open until flapper plate 1002 is again struck and the cycle repeats.

When the tree trunk is sensed as being less than 3 inches in diameter, the shear begins a fast chop cyle that cuts the remaining portion of the tree into short lengths. As the trunk diameter reduces to less than 1.5 inches, the combine stops and resets wide open for the next tree with delimber stopped.

All functions which are normally automated may be transferred to manual operations if the operator pushes blue "Manual" pushlight switch P*b*6A. In this mode one pushes the pushlights and the internal pushlight lamps will come on indicating that this function is operating. In Auto operation the appropriate lamps will flash without human intervention. The rolls can be reversed manually to position or remove a tree from the combine.

A chart of switch and relay functions is given below, reference being made particularly to FIGS. 98 to 101.

P*b*1—Open grapple button on grapple handle
SW1—Delimber override button on grapple handle
SW2—Senses tree greater/less than 3″ diameter
SW3—Closes when tree greater than 1.5″ diameter
SW4—Momentary flapper plate closes when butted
SW5—Closes when shears completely closed
SW6—Closes when shears completely closed
SW7—Opens when tree greater than 12″ diameter
SW8—Closes when shears open more than 12″ diameter
SW9—Open when shears open more than 18″ diameter
K1—Auto starts delimber if SW1 is not used
K2—Sense 1.5″ or more tree diameter
K3—Delimber hold relay
K4—Closes shear
K5—Opens shear
K6—6″ tree sensing
K7—12″ diameter shear open K8—18″ diameter shear open
K9—Auto/Manual transfer relay
K10—0–2 time delay for fast chop cycle
K11—Fast chop cycle
KM—Master power relay interlock with ignition switch/ starter
K$_G$, K$_S$, K$_F$, K$_R$—Four repeater relays mounted near solenoids
K$_G$—Grapple Relay
K$_S$—Selector Relay
K$_F$—Feed roll forward Relay
K$_R$—Feed roll reverse Relay

*Manual operation*

Operator depresses "Manual" PB6A, circuit Q de-energizing K9 Relay and lighting blue lamp inside the push button. K9 contacts in circuits I and L transfer control of the shear to panel pushbuttons PB4 (circuit I) and PB5 (circuit L). Control of Debarker, Grapple and feed rolls is always manual via switches PB1, PB2, PB3A and PB3B (circuits A–D). Selector relay K$_S$ (circuit S) is energized whenever rolls are moving (forward or backwards) via PB3A or PB3B.

*Automatic operation*

Operator depresses "Auto" switch PB6B (circuit Q) on panel P energizing K9 relay which de-energizes blue "Manual" lamp LT6 (circuit P); energizes white lamp LT7 inside the "Auto" push button; and K9 contacts in circuits L and I transfer shear control to Automation circuitry. De-energized K2 contacts (circuit L) energizes solenoid K5 and opens shear knives 964 until solenoid K8 (circuit O) electrical stop halts shear at 18″ diameter max. via K8 contact (circuit L).

The operator opens/closes grapple jaws 1461 and 1462 via switch P*b*1 (circuit A) button on grapple control lever. The Debarker turns on via switch PB2 (circuit B) and a white lamp LT1 indicates that it is running. The Feed Rolls 800 are manually controlled by green push-light switch PB3A for Forward (circuit C) and red switch RB3B for Reverse (circuit D).

A tree is fed into the waiting combine by the use of the grapple 1460 where the Forward rolls 800 catch it and pull it in. Automatic operation then occurs as follows:

Sensing switches on the rolls sense the size of the tree. If greater than 3″ diameter; K2 energizes and SW2 (circuit F) energizes the de-limbing device 600 by K1 contacts (circuit E) and the "de-limb" Solenoid S$_L$ operates, de-limbing the tree trunk. Should the trunk taper off to less than 3″ diameter, but still greater than 1.5″ diam. then K3 contact (circuit F) of self-latch relay K3 (circuit H) will hold K1 circuit F) de-limb relay on despite switch SW2 (circuit F) release until the tree becomes *smaller than 1.5″ diameter* such that switch SW3 opens dropping out K2 Relay (circuit G) and its contact (circuit H); dropping out K3 delimb "Hold" Relay (circuit H) and opening shear blades 964 via K2 contact (circuit L).

The delimbed tree trunk moves through a debarking device controlled by switch PB2 and the debarked tree trunk is propelled by speed roll 1100 endwise through a normally open shear until it rams the Flapper Plate switch SW4 (circuit I) eight feet beyond the shear. SW4 closes momentarily energizing self-latching shear close Relay K4 (circuit I) and the "shear closed" lamp inside Manual switch PB4 (circuit I). The Shear blades 964 close, cutting off an 8 foot log which is propelled by speed-up roll 1100 to cradle 500. The act of closing the shear blades trips two shear mounted switches SW5 and SW6 which activate self latch "shear open" Relay K5 through closed K8, K9, K7 contacts (circuit L). K8 is a safety relay which is normally energized and which de-energizes via SW9 (circuit O) to block shear open function if shear attempts to open wider than a 9″ radius (18″ diameter tree).

Energized K5 contact disables and resets K4 shear close relay (circuit I) and causes the shear blades to open. If the tree trunk is less than 12″ diameter the shears *do not need* to open to maximum. Current will flow through closed tree sensing switch SW7 contact; through closed (larger than 1.5″) K2 contact and energize solenoid K6 (circuit M). Closed K6 and K8 contacts prepare a circuit for shear position switch SW8 which closes when the shear blades pass the 12″ diameter mark on their way open. The thus energized K7 Relay (circuit N) arrests further open motion via its open contact (circuit L) in series with K5 shear open relay. The debarked tree trunk slides forward through the open shear driven by the forward rolls. A de-energized K5 contact (circuit I) has restored the K4 "close" circuit to readiness to repeat the entire shear cycle when tree trunk end rams Flapper switch SW4 (circuit I) again. Thus the tree trunk is delimbed, debarked (if desired) and cut into 8 foot lengths. The reason that size sensing SW7 on the rolls controls the shear opening is to conserve hydraulic oil pumping when it is unnecessary to open shears to widest amount (18 inches diameter).

As the tree is cut into 8 ft. logs, the trunk grows smaller as the top is approached until a new decision must be made. When the trunk diameter has become less than 3″; SW2 (circuit F) flips from K1 (12″ 8 ft. log) to K11 "Fast Chop Cycle" (circuit F).

*Fast chop cycle*

A large trunk dwindles to less than 3″ diameter. Tree sensing SW2 goes to N.C. K2 contact is closed due to "larger than" 1.5″ diameter. K8 contact is closed because K8 is energized via shear sense switch SW9 (which is normally closed unless shear blades are wide open beyond 9″ Radius. The shear should be less than 9″ because of small less than 3″ log).

When this last log passes, K4 relay shears close (momentary SW4 Flapper) and allow current to flow via K4, K2, K8 contacts (circuit F) to K11 which latches on after K4 releases via latch contact. K11 contact and K7 contact energized K10 timer (circuit R) during K10 time period (0–2 sec.). The tree slides forward through open shears. At end of K10 period its contact closes and initiates K4 (circuit I) shears chop cutting a short log of length determined by K10 period. At completion of shear closed chop motion switches SW5 and SW6 on shear close indicating completion of chop and K5 (circuit L) is energized and latched re-opening shear again.

Fast chop cycle repeats as long as less than 3″ more than 1.5″ tree is sensed.

When the sensed SW3 tree trunk is non-existent or less than 1.5″ diameter; K2 (circuit G) will be de-energized and its contacts (circuits F, H and L) will block off solenoid K3 (circuit H) which in turn will drop out K1 delimber relay (circuit F) stopping the delimbing blades, the fast chop cycle, opens the shear, and generally resetting all relays for the next tree. Any small sticks still in machine will be carried through the open shear by the rolls 800 and discarded. The operator can, if desired, override the dropout of K1 by a button switch SW1 mounted on one of the control levers and thus operate the delimbing blades at will. All relays are shown in the ALL-POWER-OFF position and that this is not the normal operating condition; some are being almost continually energized when the equipment is in use. The lights inside the push buttons or "push-lights" will light when that button is pushed in manual; indicating that that function is being performed. In automatic operation, the shear push button lights will flash without human intervention and this is normal. As an option, the 1½″ sensing switch SW3 may be disconnected and K2 wired to energize along with S$_L$ delimber solenoid on any tree trunk larger than 3″ and with delimber "override" SW1. In the fast chop cycle, the severed short lengths of logs are dropped onto the ground in a position intermediate the rear end of the machine and the slidably mounted cradle doors 542 and 543. These logs do not generally interfere with the machine providing the operator manoeuvres the vehicle away from the processing area by advancing the vehicle forwardly.

I claim:
1. A machine for processing felled trees, said machine comprising:
 (a) a frame;
 (b) a telescopic boom mounted directly upon said machine;
 (c) article engaging means mounted on said boom means;
 (d) a predetermined feed path adjacent to said frame;
 (e) at least one processing unit mounted on said frame and in said feed path and operative to delimb or debark said tree;
 (f) means for extending said boom outwardly from said frame;
 (g) means for operating said article engaging means to engage a selected pre-felled tree from a plurality of pre-felled trees;
 (h) means for operating said boom to elevate at least one end of said selected tree; and,
 (i) means for retracting said boom to introduce said one end of said selected tree directly into said processing unit, and to introduce said tree along said predetermined feed path.

2. A machine as defined in claim 1 wherein said boom means has two or more movable sections.

3. A machine as defined in claim 1 wherein said boom is rotatable about a vertical axis.

4. A machine as defined in claim 1 wherein said boom is pivotable about a horizontal axis.

5. A mechine as defined in claim 4 wherein said boom comprises: a first member pivotally mounted on said frame, a plurality of members telescoped within said first member, guide means on said first member and said plurality of members telescoped therein for supporting and guiding said plurality of members for movement into and out of said first member, and means interconnecting said first member and said plurality of members for extending said plurality of members outward from said first member to lengthen said boom and for moving said members inward to shorten said boom.

6. A machine as defined in claim 2 wherein said movable sections move with respect to one another and each section moves at the same rate with respect to the fixed section of the boom.

7. A machine as defined in claim 6 including means to operate said telescopic boom, said means comprising a sheave system, a cable system interconnecting said movable sections move with respect to one another and each entraining said sheave system, means for rotating said sheave system in one direction for extending said movable sections outwardly from said fixed section and with respect to one another, and means for rotating said sheave system in an opposite direction for retracting said movable sections into one another and with respect to said fixed section.

8. A machine as defined in claim 6 wherein each of the movable sections of the boom includes a pulley pivotally mounted on the end thereof projecting from the next adjacent outermost section, a plurality of cables each anchored at one end to adjacent sections and traversing respective ones of the pulleys, a sheave mounted on the fixed section of said boom and having a pair of axially spaced drums of different related diameters, one cable having an end thereof anchored to the drum of the smaller diameter and the other end to the first telescopic section and another cable having one end thereof anchored to the drum of the larger diameter and the other end anchored to the innermost telescopic section whereby rotation of said sheave in one direction simultaneously telescopes the sections outwardly and rotation in the opposite direction simultaneously telescopes the sections inwardly.

9. A machine as defined in claim 8 wherein the sheaves are mounted on a common shaft in axial spaced relationship.

10. A machine as defined in claim 8 wherein the sheave consists of a pair of drums mounted on respective ones of a pair of spaced, substantially parallel shafts interconnected in driving relationship, a further sheave being secured to a selected one of the sheaves and rotatable therewith for receiving and winding a further flexible cable thereon.

11. A machine as defined in claim 1 wherein said article engaging means consists of a grapple suspended from said boom and including a pair of jaws relatively movable with respect to one another for engaging said tree.

12. A machine for processing felled trees, said machine comprising:
 (a) a frame;
 (b) boom means associated with said machine;
 (c) article engaging means comprising a grapple suspended from said boom means, said grapple including a pair of jaws relatively movable with respect to one another for engaging said tree, and movable toward and away from said machine respectively by retracting and extending said boom means;
 (d) a predetermined feed path adjacent to said frame;
 (e) at least one processing unit mounted on said frame and in said feed path and operative to delimb or debark said tree;
 (f) means for extending said boom outwardly from said frame;
 (g) means for operating said article engaging means to engage a selected pre-felled tree from a plurality of pre-felled trees;
 (h) means for operating said boom to grip said tree with said grapple intermediate the ends thereof and to introduce one end of said selected tree directly into said tree processing unit and to introduce said tree along said predetermined path.

13. A machine for processing felled trees, said machine comprising:
 (a) a frame;
 (b) extendable and retractable boom means associated with said machine;
 (c) article engaging means comprising a grapple suspended from said boom means and including a pair of jaws relatively movable with respect to one another for engaging a tree to be processed, said grapple being movable toward and away from said machine respectively by retracting and extending said boom means;
 (d) a predetermined feed path adjacent to said frame;
 (e) at least one processing unit mounted on said frame and in said feed path and operative to delimb or debark said tree;
 (f) means for extending said boom outwardly from said frame;
 (g) means for operating said article engaging means to engage a selected pre-felled tree from a plurality of pre-felled trees;
 (h) means for operating said boom to elevate one end of said selected tree; and,
 (i) means for retracting said boom to introduce said one end of said selected tree directly into said tree processing unit and to introduce said tree along said predetermined feed path.

14. A machine as defined in claim 13 wherein said grapple consists of a pair of jaws each movable and means for opening and closing said jaws selectively for engaging said pre-felled tree from a plurality of pre-felled trees.

15. A machine as defined in claim 14 wherein said jaws are suspended by a yoke pivotally mounted on said boom.

16. A machine as defined in claim 14 including a drive means for said jaws comprising a driven pinion gear, a plurality of planetary gears rotatably secured on one of said jaws and meshing with said pinion and a sun gear fixed to the other jaw and meshing with said planetary gears.

17. A machine as defined in claim 16 wherein said pinion is driven by a hydraulic motor, the feed line for said hydraulic motor being a flexible hose wound upon a third sheave journalled on said boom.

18. A machine as defined in claim 13 wherein one of said jaw members is fixed with respect to said boom and the other jaw relatively movable with respect thereto.

19. A machine as defined in claim 13 wherein said grapple consists of a jaw suspended from and rigidly secured to said boom and a second jaw member pivotally mounted on said first jaw member and relatively movable with respect thereto.

20. A machine as defined in claim 13 wherein said grapple consists of a first tong portion rigidly secured to and projecting downwardly from said boom and having an inwardly directed hooked terminal end portion, the second jaw member pivotally mounted on said first jaw member intermediate the ends thereof and having a terminal end portion turned inwardly towards the terminal end of the fixed member and means biasing said movable member toward said fixed member whereby said jaw is normally closed and means for moving said movable jaw against the resilient bias for opening the jaw.

21. A machine as defined in claim 20 wherein the means to operate said movable jaw consists of a hydraulic cylinder resiliently urged or biased normally to retain the jaw in a closed position by a hydraulic accumulator, said hydraulic cylinder being connected to a hydraulic system, the line for connecting the cylinder to the system being mounted on the boom and movable therewith, said line being wound upon a third sheave journalled on said boom.

22. A machine as defined in claim 4 wherein said boom is mounted on said frame to pivot about a horizontal axis located vertically above said processing units.

23. A machine as defined in claim 22 including a hydraulic cylinder interconnecting said frame and boom at a position remote from the pivot axis and thereby providing means to raise and lower the free end of said boom.

24. A machine as defined in claim 23 wherein the horizontal pivot axis is intermediate the ends of said boom, the hydraulic cylinder being connected at one end to said frame and to the boom at the other end at a position intermediate the pivotal connection with the frame and the grapple end of the boom.

25. A machine as defined in claim 23 wherein the pivotal connection between the boom and the frame is located intermediate the ends of the boom said hydraulic cylinder being connected to the end of the boom remote from the grapple and to a further rigid part of said machine.

26. A machine for processing felled trees, said machine comprising:
(a) a frame;
(b) a telescopic boom mounted directly on said frame to pivot about a horizontal axis;
(c) article engaging means mounted on said boom means, said article engaging means consisting of a grapple suspended from said boom and including a pair of relatively movable jaws for engaging said tree;
(d) a predetermined feed path adjacent to said frame;
(e) at least one processing unit mounted on said frame and in said feed path and operative to delimb or to debark said tree, said processing unit being mounted vertically below said horizontal axis;
(f) means for extending said boom outwardly from said frame;
(g) means for operating said article engaging means to engage a selected pre-felled tree from a plurality of pre-felled trees;
(h) means for operating said boom to elevate one end of said selected tree; and,
(i) means for retracting said boom to introduce said one end of said selected tree directly into said tree processing unit and to introduce said tree along said predetermined feed path.

27. The machine of claim 26 wherein said processing unit comprises a delimber.

28. The machine of claim 27 wherein said delimber is of the type including a plurality of cutter heads engageable with said tree to delimb said tree and mounted on respective ones of members disposed circumferentially about said tree, said member being rotatable about an axis substantially coincident with the longitudinal axis of said tree.

29. The machine of claim 26 wherein said processing unit comprises a debarker.

30. The machine of claim 29 wherein said debarker is of the type including a plurality of tool members engageable with said tree to remove said bark by scraping action or by cambium fracture, said tool members being mounted on a member circumferentially about said tree, said member being rotatable about an axis substantially coincident with the longitudinal axis of said tree.

31. The machine of claim 28 wherein each of the cutter heads of said delimber is pivotally mounted on an arm and positively driven, each of said arms being mounted on said rotatable member to oscillate about an axis generally parallel to the rotation of said member and biased inwardly whereby the cutter heads remain in contact with the tree being processed irrespective of the diameter thereof.

32. A machine as defined in claim 30 wherein the tool members of said debarker consist of a plurality of arcuate arms having tips engageable with said tree, each of said arms being pivotally mounted and biased inwardly so as to remain in contact with said tree during the processing operation.

33. The machine of claim 26 wherein said processing unit comprises the combination of a delimber and feed rollers.

34. The machine of claim 33 wherein said feed rolls are of the type including a plurality of driven rollers each having a circumferential surface grippingly engaging said tree, at least one of said rollers being biased inwardly toward said tree, said rollers being disposed about the periphery of said tree, whereby said rollers clampingly engage said tree therebetween.

35. The machine of claim 34 wherein said feed rollers include three arms, each pivotally mounted to a frame at the apex of a triangle, said arms being directed inwardly toward a respective one of said arms and biased to the center of such triangle, a roller having an arcuate spiked surface rotatably mounted on the free end of a respective one of said arms, and driven to rotate about an axis substantially perpendicular to said feed path, said spiked surfaces being disposed about the periphery of said tree.

36. The rollers of claim 35 having arcuate front faces provided with gripping surfaces to assist in grippingly engaging logs fed therethrough.

37. The machine of claim 33 wherein said delimber is of the type including a plurality of cutter heads engageable with said tree to delimb said tree and mounted on a member circumferentially about said tree, said member being rotatable about an axis substantially coincident with the longitudinal axis of said tree and wherein the feed rollers are of the type including a plurality of driven rollers each having a circumferential surface grippingly engaging said tree, at least one of said rollers being biased inwardly toward said tree, said rollers being disposed about the periphery of said tree, whereby said rollers clampingly engage said tree therebetween.

38. The machine of claim 37 wherein each of the cutter heads of said delimber is pivotally mounted on an arm and positively driven, each of said arms being mounted on said rotatable member to oscillate about an axis generally parallel to the rotation of said member and biased inwardly whereby the cutter heads remain in contact with the tree being processed irrespective of the diameter thereof while said tree is being processed and wherein said feed rollers include three arms, each pivotally mounted to a frame at the apex of a triangle, said arms being directed inwardly toward a respective one of said arms and biased to the center of such triangle, a roller having an arcuate spiked surface rotatably mounted on the free end of a respective one of said arms, and driven to rotate about an axis substantially perpendicular to said feed path, said spiked surfaces being disposed about the periphery of said tree.

39. The machine of claim 26 wherein said processing unit comprises the combination of a delimber and a debarker.

40. The machine of claim 38 wherein said delimber is of the type including a plurality of cutter heads engageable with said tree to delimb said tree and mounted on a member circumferentially about said tree, said member being rotatably about an axis substantially coincident with the longitudinal axis of said tree, and wherein said debarker is of the type including a plurality of tool members engageable with said tree to remove said bark by scraping action or by cambium fracture, said tool members being mounted on a member circumferentially about said tree, said member being rotatable about an axis substantially coincident with the longitudinal axis of said tree.

41. The machine of claim 40 wherein each of the cutter heads of said delimber is pivotally mounted on an arm and positively driven, each of said arms being mounted on said rotatable member to oscillate about an axis generally parallel to the rotation of said member and biased inwardly whereby the cutter heads remain in contact with the tree being processed irrespective of the diameter thereof while said tree is being processed, and wherein the tool members of said debarker consist of a plurality of arcuate arms having tips engageable with said tree, each of said arms being pivotally mounted and biased inwardly so as to remain in contact with said tree during the processing operation.

42. The machine of claim 41 and including receiving and stacking means comprising a main frame rigidly secured to the machine and including uprights providing a pair of vertically disposed, horizontally spaced tracks, a cradle mounted in said tracks, means for sliding said cradle for vertical movement to raise and lower said cradle, said cradle having a trap door in the base thereof and movable from a closed to an open position for release of the processed trees stacked in said cradle.

43. The machine of claim 26 wherein said processing unit comprises the combination of feed rollers and a debarker.

44. The machine of claim 43 wherein said feed rollers are of the type including a plurality of driven rollers each having a circumferential surface grippingly engaging said tree, at least one of said rollers being biased inwardly toward said tree, said rollers being disposed about the periphery of said tree, whereby said rollers clampingly engage said tree therebetween, and wherein said debarker is of the type including a plurality of tool members engageable with said tree to remove said bark by scraping action or by cambium fracture, said tool members being mounted on a member circumferentially about said tree, said member being rotatable about an axis substantially coincident with the longitudinal axis of said tree.

45. The machine of claim 44 wherein said feed rollers include three arms, each pivotally mounted to a frame at the apex of a triangle, said arms being directed inwardly toward a respective one of said arms and biased to the center of such triangle, a roller having an arcuate spiked surface rotatably mounted on the free end of a respective one of said arms, and driven to rotate about an axis substantially perpendicular to said feed path, said spiked surfaces being disposed about the periphery of said tree and wherein the tool members of said debarker consist of a plurality of arcuate arms having tips engageable with said tree, each of said arms being pivotally mounted and biased inwardly so as to remain in contact with said tree during the processing operation.

46. The machine of claim 26 wherein said processing unit comprises the combination of a delimber, feed rollers, and a debarker.

47. The machine of claim 46 wherein said delimber is of the type including a plurality of cutter heads engageable with said tree to delimb said tree mounted on a member circumferentially about said tree, said member being rotatable about an axis substantially coincident with the longitudinal axis of said tree, wherein the feed rollers are of the type including a plurality of driven rollers each having a circumferential surface grippingly engaging said tree, at least one of said rollers being biased inwardly toward said tree, said rollers being disposed about the periphery of said tree whereby said rollers clampingly engage said tree therebetween, and wherein said debarker is of the type including a plurality of tool members engageable with said tree to remove said bark by scraping action or by cambium fracture, said tool member being mounted on a member circumferentially about said tree, said member being rotatable about an axis substantially coincident with the longitudinal axis of said tree.

48. The machine of claim 46, wherein each of the cutter heads of said delimber is pivotally mounted on an arm and positively driven, each of said arms being mounted on said rotatable member to oscillate about an axis generally parallel to the rotation of said member and biased inwardly whereby the cutter heads remain in contact with the tree being processed irrespective of the diameter thereof during processing of said tree and wherein said feed rollers include three arms, each pivotally mounted to a frame at the apex of a triangle, said arms being directed inwardly toward a respective one of said arms and biased to the center of such triangle, a roller, having an arcuate spiked surface, rotatably mounted on the free end of a respective one of said arms and driven to rotate about an axis substantially perpendicular to said feed path, said spiked surfaces being disposed about the periphery of said tree, and wherein the tool members of said debarker consist of a plurality of arcuate arms having tips engageable with said tree, each of said arms being pivotally mounted and biased inwardly so as to remain in contact with said tree during the processing operation.

49. The machine of claim 26 including receiving and stacking means downstream of said processing unit for receiving the processed tree.

50. The machine of claim 49 wherein said receiving and stacking means comprises a cradle associated with said frame and including a base, and posts upstanding from said base adjacent a pair of opposed marginal edges of said base.

51. The machine of claim 50 wherein said cradle is detachably secured to said machine.

52. The machine as claimed in claim 50 wherein said cradle includes support means, and means for elevating and lowering said cradle with respect to said support means.

53. The machine of claim 50 wherein said cradle includes a movable base for unloading said trees received and stacked in said cradle.

54. The machine of claim 50 wherein said receiving and stacking means comprises a main frame rigidly secured to the machine and including uprights providing a pair of vertically disposed, horizontally spaced tracks, a cradle mounted in said tracks, means for sliding said cradle for vertical movement to raise and lower said cradle, said cradle having a trap door in the base thereof and movable from a closed to an open position for release of the processed trees stacked in said cradle.

55. The machine of claim 38 and including receiving and stacking means comprising a main frame rigidly secured to the machine and including uprights providing a pair of vertically disposed, horizontally spaced tracks, a cradle mounted in said tracks, means for sliding said cradle for vertical movement to raise and lower said cradle, said cradle having a trap door in the base thereof and movable from a closed to an open position for release of the processed trees stacked in said cradle.

56. The machine of claim 26 including additional means, downstream of said processing units, for removing the processed tree from said machine.

57. The machine of claim 56 wherein said additional means comprises a speed-up roll journalled on said machine and having the surface thereof disposed for rolling contact with the processed tree, said speed-up roll being driven and having said surface tractively engaging the processed tree.

58. The machine of claim 55 and including a speed-up roll driven at the same peripheral speed as said feed rollers, and wherein the surface of said speed-up roll has a plurality of substantially radially directed projections for engaging the surface of said processed tree.

59. A machine for processing felled trees, said machine comprising:
 (a) a frame;
 (b) a sub-frame assembly mounted on said frame to pivot about a substantially horizontal axis;
 (c) extendable and retractable boom means associated with said machine and having article engaging means mounted thereon;
 (d) at least one tree processing unit mounted on said sub-frame assembly to pivot therewith and operative to delimb or to debark said selected tree;
 (e) means for extending and retracting said boom and for actuating said article engaging means to engage a selected tree from a plurality of prefelled trees and to elevate one end thereof and then directly to introduce said elevated end into said processing unit, the trailing end of said tree at least initially being slidingly supported upon the ground; and
 (f) means for feeding said selected tree along a feed path through said tree processing unit, said feed path being substantially transverse to the pivot axis of said frame, the pivotal movement of said sub-frame assembly permitting said processing unit to maintain alignment with said feed path during changes in its inclination to the horizontal while said tree passes through said processing unit.

60. The machine of claim 44 and including receiving and stacking means comprising a main frame rigidly secured to the machine and including uprights providing a pair of vertically disposed, horizontally spaced tracks, a cradle mounted in said tracks, means for sliding said cradle for vertical movement to raise and lower said cradle, said cradle having a trap door in the base thereof and movable from a closed to an open position for release of the processed trees stacked in said cradle.

61. The machine of claim 59 wherein said sub-frame assembly is freely pivoted on said frame.

62. The machine of claim 61 wherein said sub-frame assembly is freely pivoted on said frame by means of a pair of transversely spaced apart hangers, each being pivotally secured to an A-frame assembly by means of a pin, each said hanger being provided with a collar receiving a longitudinally extending rail for mounting said processing units.

63. The machine of claim 62 wherein means are provided to restrict the pivotal movement of said sub-frame assembly.

64. The machine of claim 63 wherein the initial at rest position of said processing units is with the longitudinal axis thereof inclined downwardly toward the ground.

65. The machine of claim 63 wherein said means provide for minimization of undue pivotal movement of said sub-frame assembly by automatically but temporarily locking said sub-frame assembly in a predetermined inclination after said sub-frame assembly reaches such inclination.

66. The machine of claim 63 wherein the center of gravity of the processing units is initially upstream of the pivotal axis of said sub-frame assembly, and wherein the inclination of said feed path axis changes as the center of gravity of the processing units and the tree fed therethrough proceeds downstream of the pivotal axis of said sub-frame assembly.

67. The machine of claim 59 wherein said extendible and retractable boom means comprises a telescopic boom mounted on said frame to pivot about a horizontal axis located vertically above said processing units, wherein said sub-frame assembly is freely pivoted on said frame by means of a pair of transversely spaced apart hangers, each being pivotally secured to an A-frame assembly by means of a pin, each said hanger being provided with a collar receiving a longitudinally extending rail for mounting said processing units and wherein the center of gravity of the processing units is initially upstream of the pivotal axis of said sub-frame assembly, and wherein the inclination of said feed path axis changes as the center of gravity of the processing units and the tree fed therethrough proceeds downstream of the pivotal axis of said sub-frame assembly.

68. The machine of claim 67 wherein said processing unit comprises a delimber which is of the type including a plurality of cutter heads engageable with said tree to delimb said tree and mounted on a member circumferentially about said tree, said member being rotatable about an axis substantially coincident with the longitudinal axis of said tree and wherein each of the cutter heads of said delimber is pivotally mounted on an arm and positively driven, each of said arms being mounted on said rotatable member to oscillate about an axis generally parallel to the rotation of said member and biased inwardly whereby the cutter heads remain in contact with the tree being processed irrespective of the diameter thereof.

69. The machine of claim 67 wherein said processing unit comprises a debarker which is of the type including a plurality of tool members engageable with said tree to remove said bark by scraping action or by cambium fracture, said tool members being mounted on a member circumferentially about said tree, said member being rotatable about an axis substantially coincident with the longitudinal axis of said tree and wherein the tool members of said debarker consist of a plurality of arcuate arms having tips engageable with said tree, each of said arms being pivotally mounted and biased inwardly so as to remain in contact with said tree during the processing operation.

70. The machine of claim 67 wherein said processing unit comprises the combination of a delimber and feed roller said delimber being of the type including a plurality of cutter heads engageable with said tree to delimb said tree and mounted on a member circumferentially about said tree, said member being rotatable about an axis substantially coincident with the longitudinal axis of said tree and wherein each of the cutter heads of said delimber is pivotally mounted on an arm and positively driven, each of said arms being mounted on said rotatable member to oscillate about an axis generally parallel to the rotation of said member and biased inwardly whereby the cutter heads remain in contact with the tree being processed irrespective of the diameter thereof during processing of the tree, wherein said feed rolls are of the type including a plurality of driven rollers each having a circumferential surface grippingly engaging said tree, at least one of said rollers being biased inwardly toward said tree, said rollers being disposed about the periphery of said tree, whereby said rollers clampingly engage said tree therebetween and wherein said feed rollers include three arms, each pivotally mounted to a frame at the apex of a triangle, said arms being directed inwardly toward a respective one of said arms and biased to the center of such triangle, a roller having an arcuate spiked surface rotatably mounted on the free end of a respective one of said arms, and driven to rotate about an axis substantially perpendicular to said feed path, said spiked surfaces being disposed about the periphery of said tree.

71. The machine of claim 67 wherein said processing unit comprises the combination of a delimber and a debarker, said delimber having a plurality of cutter heads, each pivotally mounted on an arm and positively driven, each of said arms being mounted on a rotatable housing to oscillate about an axis generally parallel to the rotation of said housing and biased inwardly whereby the cutter heads remain in contact with the tree being processed irrespective of the diameter thereof during processing of the tree, and wherein the tool members of said debarker consist of a plurality of arcuate arms having tips engageable with said tree, each of said arms being pivotally mounted and biased inwardly so as to remain in contact with said tree during the processing operation.

72. The machine of claim 71 including feed rollers comprising three arms, each pivotally mounted to a frame at the apex of a triangle, said arms being directed inwardly toward a respective one of said arms and biased to the center of such triangle, a roller, having an arcuate spiked surface, rotatably mounted on the free end of a respective one of said arms, and driven to rotate about an axis substantially perpendicular to said feed path, said spiked surfaces being disposed about the periphery of said tree.

73. The machine of claim 59 wherein said processing unit comprises the combination of a delimber, two sets of feed rolls, and a debarker, one such set of feed rolls being disposed upstream of said debarker, the other set of feed rolls being disposed downstream of said debarker.

74. The machine of claim 73 wherein the two sets of longitudinally spaced apart feed rolls are driven by a common drive shaft.

75. The machine of claim 74 wherein said shaft is driven by a common motor.

76. The machine of claim 48 and including receiving and stacking means comprising a main frame rigidly secured to the machine and including uprights providing a pair of vertically disposed, horizontally spaced tracks, a cradle mounted in said tracks, means for sliding said cradle for vertical movement to raise and lower said cradle, said cradle having a trap door in the base thereof and movable from a closed to an open position for release of the processed trees stacked in said cradle.

77. A machine for processing felled trees, comprising:
(a) a frame;
(b) log handling means associated with said machine, including log engaging means;
(c) at least one processing unit mounted on said frame;
(d) means for operating said log handling means to engage a selected prefelled tree from a plurality of such prefelled trees, and
(e) means for feeding said tree directly into said processing unit by moving said log engaging means along an axial path substantially in alignment with the longitudinal axis of said processing units and guided in its movement along an axis parallel to said longitudinal axis.

78. The machine of claim 77 wherein the processing unit comprises a delimber.

79. The machine of claim 78 including receiving and stacking means located downstream of said processing unit for receiving the processed tree.

80. A machine as defined in claim 61 wherein said sub-frame assembly consists of a pair of transversely spaced substantially parallel beams each pivotally mounted on a support and wherein the processing unit is detachably secured to each of said beams.

81. A machine as defined in claim 80 wherein the processing unit includes the combination of a delimber and a debarker, said delimber having a plurality of cutter heads each pivotally mounted on an arm and positively driven, each of said arms being mounted on a rotatable housing to oscillate about an axis generally parallel to the rotation of said housing and biased inwardly whereby the cutter heads remain in contact with the tree being processed irrespective of the diameter of the tree during processing thereof, and wherein the tool members of said debarker consist of a plurality of arcuate arms having tips engageable with said tree, each of said arms being pivotally mounted and biased inwardly so as to remain in contact with said tree during the processing operation.

82. A machine as defined in claim 78 wherein said delimber is of the type including a plurality of cutter heads engageable with said tree to delimb said tree and mounted on respective ones of members disposed circumferentially about said tree, said members being rotatable about an axis substantially coincident with the longitudinal axis of said tree.

83. A machine as defined in claim 82 wherein said processing unit comprises a delimber which is of the type including a plurality of cutter heads engageable with said tree to delimb said tree and mounted on a member circumferentially about said tree, said member being rotatable about an axis substantially coincident with the longitudinal axis of said tree and wherein each of the cutter heads of said delimber is pivotally mounted on an arm and positively driven, each of said arms being mounted on said rotatable member to oscillate about an axis generally parallel to the rotation of said member and biased inwardly whereby the cutter heads remain in contact with the tree being processed irrespective of the diameter thereof.

84. A machine as defined in claim 83 including feed rolls disposed downwstream of said delimber, said feed rolls including a plurality of driven rollers each having a circumferential surface grippingly engaging said tree, at least one of said rollers being biased inwardly toward said tree, said rollers being disposed about the periphery of said tree, whereby said rollers clampingly engage said tree therebetween.

85. A machine as defined in claim 84 including a debarker located downstream of said feed rolls, said debarker including a plurality of tool members engageable with said tree to remove said bark by scraping action or by cambium fracture, said tool members being mounted on a member circumferentially about said tree, said member being rotatable about an axis substantially coincident with the longudinal axis of said tree.

86. In a machine for processing trees, the combination of:
(a) a frame; and
(b) a sub-frame assembly on said frame, said sub-frame assembly having secured thereon a plurality of processing units including
(1) a delimber
(2) a debarker disposed in spaced relation with respect to said delimber and in axial alignment therewith, and
(3) feed roller means for feeding a tree to be processed through said processing units.

87. In a tree processing apparatus;
(a) a frame (b) a sub-frame assembly including a pair of spaced, substantially parallel beams supported on said frame; and (c) a plurality of processing units disposed between said beams and secured thereto to rigidify said sub-assembly, said processing units being disposed in axial end-to-end alignment relative to the length of said beams, whereby said processing units are adapted simultaneously to process said tree in a sequence of operations as said tree continuously moves therethrough.

88. The machine of claim 87 wherein said sub-frame assembly is pivotally mounted on said frame.

89. The machine of claim 88 wherein said processing units are detachably secured to said sub-frame assembly.

90. The machine of claim 88 wherein said processing units are detachably secured to said beams so that the units may be slid therealong for removal therefrom.

91. The machine of claim 88 wherein said processing units are detachably secured to said beams so that said units may be individually and selectively removed from said beams without removing any non-selected such units.

92. The machine of claim 89 wherein the center of gravity of the processing units is initially upstream of the pivotal axis of said sub-frame assembly, and wherein the inclination of said feed path axis changes as the center of gravity of the processing units and the tree fed therethrough proceeds downstream of the pivotal axis of said sub-frame assembly.

93. The machine of claim 88 wherein said processing units include a delimber of the type including a plurality of cutter heads engageable with said tree to delimb said tree and mounted on a member circumferentially about said tree, said member being rotatable about an axis substantially coincident with the longitudinal axis of said tree and wherein each of the cutter heads of said delimber is pivotally mounted on an arm and positively driven, each of said arms being mounted on said rotatable member to oscillate about an axis generally parallel to the rotation of said member and biased inwardly whereby the cutter heads remain in contact with the tree being processed irrespective of the diameter thereof during processing of said tree.

94. The machine of claim 88 wherein said processing units include debarker of the type including a plurality of tool members engageable with said tree to remove said bark by scraping action or by cambium fracture, said tool members being mounted on a member circumferentially about said tree, said member being rotatable about an axis substantially coincident with the longitudinal axis of said tree and wherein the tool members of said debarker consist of a plurality of arcuate arms having tips engageable with said tree, each of said arms being pivotally mounted and biased inwardly so as to remain in contact with said tree during the processing of said tree.

95. The machine of claim 88 wherein said processing units include feed rolls of the type including a plurality of driven rollers each having a circumferential surface grippingly engaging said tree, at least one of said rollers being biased inwardly toward said tree, said rollers being disposed about the periphery of said tree, whereby said rollers clampingly engage said tree therebetween and wherein said feed rollers include three arms, each pivotally mounted to a frame at the apex of a triangle, said arms being directed inwardly toward a respective one of said arms and biased to the center of such triangle, a roller having an arcuate spiked surface rotatably mounted on the free end of a respective one of said arms, and driven to rotate about an axis substantially perpendicular to said feed path, said spiked surfaces being disposed about the periphery of said tree.

96. The machine of claim 88 wherein said processing units include a delimber of the type including a plurality of cutter heads engageable with said tree to delimb said tree and mounted on a member circumferentially about said tree, said member being rotatable about an axis substantially coincident with the longitudinal axis of said tree and wherein each of the cutter heads of said delimber is pivotally mounted on an arm and positively driven, each of said arms being mounted on said rotatable member to oscillate about an axis generally parallel to the rotation of said member and biased inwardly whereby the cutter heads remain in contact with the tree being processed irrespective of the diameter thereof during processing of a tree; a debarker of the type including a plurality of tool members engageable with said tree to remove said bark by scraping action or by cambium fracture and located upstream of said delimber, said tool members being mounted on a member circumferentially about said tree, said member being rotatable about an axis substantially coincident with the longitudinal axis of said tree and wherein the tool members of said debarker consist of a plurality of arcuate arms having tips engageable with said tree, each of said arms being pivotally mounted and biased inwardly so as to remain in contact with said tree during the processing operation, and feed rolls of the type including a plurality of driven rollers each having a circumferential surface grippingly engaging said tree, at least one of said rollers being biased inwardly toward said tree, said rollers being disposed about the periphery of said tree, whereby said rollers clampingly engage said tree therebetween said feed rollers including three arms, each pivotally mounted to a frame at the apex of a triangle, said arms being directed inwardly toward a respective one of said arms and biased to the center of such triangle, a roller having an arcuate spiked surface rotatably mounted on the free end of a respective one of said arms, and driven to rotate about an axis substantially perpendicular to said feedpath, said spiked surfaces being disposed about the periphery of said tree.

97. The machine of claim 86 wherein said sub-frame assembly is pivotally mounted on said frame.

98. The machine of claim 97 wherein there is provided a pair of said sets of feed rolls, one such set being situated upstream of said debarker, the other such set being situated downstream of said debarker.

99. The machine of claim 88 including receiving and stacking means secured to said frame.

100. The machine of claim 99 wherein said receiving and stacking means comprises a cradle associated with said frame and including a base, and posts upstanding from said base adjacent a pair of opposed marginal edges of said base.

101. The machine of claim 99 wherein said receiving and stacking means comprises a main frame rigidly secured to the machine and including uprights providing a pair of vertically disposed, horizontally spaced tracks, a cradle mounted in said tracks, means for sliding said cradle for vertical movement to raise and lower said cradle, said cradle having a trap door in the base thereof and movable from a closed to an open position for release of the processed trees stacked in said cradle.

102. The machine of claim 99 including additional means, downstream of said processing units, for removing the processed tree from said machine.

103. The machine of claim 102 wherein said additional means comprises a speed-up roll journalled on said frame and having the surface thereof disposed for rolling contact with the processed tree, said roller being driven and having said surface tractively engaging the processed tree.

104. In combination, at least one tree processing unit and a framework for detachably securing said unit, said framework comprising:

(a) a base;

(b) a pair of transversely spaced apart longitudinally extending rails vertically spaced from and secured to said base; and (c) means connected to said processing unit for mounting said unit on and between said rails, thereby rigidifying said framework.

105. The combination of claim 104 wherein a plurality of processing units are secured to said rails.

106. The combination of claim 104 wherein said rails are secured to a hanger assembly freely pivotally mounted on said base.

107. The combination of claim 106 wherein each said hanger is pivotally secured to said frame by means of a pin, and wherein each said hanger is provided with a collar receiving said rails.

108. The combination of claim 107 wherein said processing units are detachably secured to said beams so that the units may be slid therealong for removal therefrom.

109. The combination of claim 107 wherein said processing units are detachably secured to said beams so that said units may be individually and selectively removed from said beams without removing any non-selected such units.

110. The combination of claim 104 wherein said frame includes means for mounting extendible and retractable boom means to said frame to pivot about a horizontal axis located vertically above said processing units.

111. The combination of claim 104 wherein said frame includes a pair of transversely spaced apart A-frames, interconnected at the apex thereof by a pin, and extendible and retractable boom means to said frame about a horizontal axis located vertically above said processing units.

112. The combination of claim 104 wherein said frame includes a pair of transversely spaced apart A-frames, each provided with a notch in its upper surface for accommodating a pin on a hanger assembly secured to said rails on said A-frame for freely pivoting said rails, and a second "A-frame" secured to the top of said first A-frame for pivotally securing thereto extendible and retractable boom means to said frame to pivot about a horizontal axis located vertically above said processing units.

113. A machine for processing a felled tree, said machine comprising:
(a) support means;
(b) feed means associated with said support means for feeding a tree bole axially along a substantially linear feed path;
(c) cutting means on said support means in said feed path for cutting said tree bole fed therealong into a plurality of portions;
(d) extendible and retractable boom means associated with said machine;
(e) article engaging means on said boom;
(f) means for operating said boom and said article engaging means to select a tree bole from a plurality of tree boles and to feed said tree bole to said machine, either directly to said cutting means or to said feed means; and,
(g) mounting means for said cutting means to allow said cutting means to move along said axial path during said cutting operation and for returning said cutting means to its initial position when said cutting operation is terminated.

114. The machine of claim 113 including a frame, and means pivotally mounting said support on said frame.

115. The machine of claim 114 wherein said feed means includes feed rollers downstream of said cutting means.

116. The machine of claim 114 wherein said feed rolls are of the type including a plurality of driven rollers each having a circumferential surface grippingly engaging said tree, at least one of said rollers being biased inwardly toward said tree, said rollers being disposed about the periphery of said tree, whereby said rollers clampingly engage said tree therebetween.

117. The machine of claim 114 wherein said feed means also includes a telescopic boom having two or more movable sectors, said boom being rotatable about a vertical axis and pivotable about a horizontal axis.

118. The machine of claim 117 wherein said boom comprises a first member pivotally mounted on said support, a plurality of members telescoped within said first member, guide means on said first member and said plurality of members telescoped therein for supporting and guiding said plurality of members for movement into and out of said first member, and means interconnecting said first member and said plurality of members for extending said plurality of members outward from said first member to lengthen said boom for moving said members inward to shorten said boom.

119. The machine of claim 117 wherein said article engaging means consists of a grapple suspended from said boom and including a pair of relatively movable jaws for engaging said tree.

120. The machine of claim 117 wherein said cutting means includes a plurality of cutting knives; means for feeding a selected tree in an axial path between said cutting knives; a housing for said knives; and means in said housing for moving said knives toward and away from said axial path to cut said selected tree into logs of a predetermined path.

121. The machine of claim 110 wherein said support means includes a pair of transversely spaced apart longitudinally extending rails vertically spaced from and secured to said frame, said cutting means being mounted thereon and movable axially therealong from a first position to a second position and biased to said first position.

122. The machine of claim 121 wherein said cutting means includes a vertical frame portion for guiding said cutting knives, said vertical frame portion including a pair of horizontally spaced parallel arms cooperating with spring means for guiding said cutting means during its movement along an axial path from said first position to said second position during the cutting operation, and for returning said cutting means to said first position.

123. The machine of claim 122 wherein said parallel arms are telescoped within said longitudinally extending rails.

124. The machine of claim 121 including a delimber upstream of said shear.

125. The machine of claim 124 wherein said delimber is of the type including a plurality of cutter heads engageable with said tree to delimb said tree and mounted on a member circumferentially about said tree, said member being rotatable about an axis substantially coincident with the longitudinal axis of said tree.

126. The machine of claim 124 including a debarker upstream of said shear but downstream of said delimber.

127. The machine of claim 126 wherein said debarker is of the type including a plurality of tool members engageable with said tree to remove said bark by scraping action or by cambium fracture, said tool members being mounted on a member circumferentially about said tree, said member being rotatable about an axis substantially coincident with the longitudinal axis of said tree.

128. The machine of claim 125 wherein each of the cutter heads of said delimber is pivotally mounted on an arm and positively driven, each of said arms being mounted on said rotatable member to oscillate about an axis generally parallel to the rotation of said member and biased inwardly whereby the cutter heads remain in contact with the tree being processed irrespective of the diameter thereof during processing of the tree.

129. A machine as defined in claim 127 wherein the tool members of said debarker consist of a plurality of arcuate arms having tips engageable with said tree, each of said arms being pivotally mounted and biased inwardly so as to remain in contact with said tree during the processing operation.

130. The machine of claim 129 including at least one set of feed rolls upstream of said cutting means.

131. The machine of claim 130 wherein said feed rolls are of the type including a plurality of driven rollers each having a circumferential surface grippingly engaging said tree, at least one of said rollers being biased inwardly toward said tree, said rollers being disposed about the periphery of said tree, whereby said rollers clampingly engage said tree therebetween.

132. The machine of claim 130 including a second set of feed rolls upstream of said cutting means.

133. The machine of claim 132 wherein each of said two sets of feed rollers include three arms, each pivotally mounted to a frame at the apex of a triangle, said arms being directed inwardly toward a respective one of said arms and biased to the center of such triangle, a roller having an arcuate spiked surface rotatably mounted on the free end of a respective one of said arms, and driven to rotate about an axis substantially perpendicular to said feed path, said spiked surfaces being disposed about the periphery of said tree.

134. The machine of claim 124 wherein said delimber includes a plurality of cutter heads engageable with said tree to delimb said tree and mounted on a member circumferentially about said tree, said member being rotatable about an axis substantially coincident with the longitudinal axis of said tree, wherein each of the cutter heads of said delimber is pivotally mounted on an arm and positively driven, each of said arms being mounted on an arm and positively driven, each of said arms being mounted on said rotatable member to oscillate about an axis generally parallel to the rotation of said member and biased inwardly whereby the cutter heads remain in contact with the tree being processed irrespective of the diameter thereof; and a debarker of the type including a plurality of tool members engageable with said tree to remove said bark by scraping action or by cambium fracture, said tool members being mounted on a member circumferentially about said tree, said member being rotatable about an axis substantially coincident with the longitudinal axis of said tree wherein the tool members of sair debarker consist of a plurality of arcuate arms having tips engageable with said tree, each of said arms being pivotally mounted and biased inwardly so as to remain in contact with said tree during the processing operation; each said delimber and debarker being upstream of said cutting means.

135. The machine of claim 134 including a debarker, a set of feed rolls upstream of said debarker, and a set of feed rolls downstream of said debarker, each said set of feed rolls including three arms, each pivotally mounted to a frame at the apex of a triangle, said arms being directed inwardly toward a respective one of said arms and biased to the center of such triangle, a roller having an arcuate spiked surface rotatably mounted on the free end of a respective one of said arms, and driven to rotate about an axis substantially perpendicular to said feed path, said spiked surfaces being disposed about the periphery of said tree.

136. The machine of claim 134 including additional means, downstream of said processing units, for removing the processed tree from said machine.

137. The machine of claim 135 including additional means downstream fo said processing units for removing the processed tree from said machine.

138. The machine of claim 136 wherein said additional means comprises a speed-up roll journaled on said machine and having the surface thereof disposed for rolling contact with the processed tree, said roller being driven and having said surface tractively engaging the processed tree said speed-up roll being driven at the same peripheral speed as said feed rollers, and wherein said surface has a plurality of substantially radially directed projections for engaging the surface of said processed tree.

139. The machine of claim 137 wherein said additional means comprises a speed-up roll journaled on said machine and having the surface thereof disposed for rolling contact with the processed tree, said roller being driven and having said surface tractively engaging the processed tree, said speed-up roll being driven at the same peripheral speed as said feed rollers, and wherein said surface has a plurality of substantially radially directed projections for engaging the surface of said processed tree.

140. The machine of claim 124 including receiving and stacking means downstream of said shear for receiving the processed tree.

141. The machine of claim 135 including receiving and stacking means downstream of said shear for receiving the processed tree.

142. The machine of claim 136 including receiving and stacking means downstream of said shear for receiving the processed tree.

143. The machine of claim 140 wherein said receiving and stacking means comprises a cradle associated with said support means and including a base, and posts upstanding from said base adjacent a pair of opposed marginal edges of said base.

144. The machine of claim 141 wherein said receiving and stacking means comprises a cradle associated with said support means and including a base, and posts upstanding from said base adjacent a pair of opposed marginal edges of said base.

145. The machine of claim 142 wherein said receiving and stacking means comprises a cradle associated with said support means and including a base, and posts upstanding from said base adjacent a pair of opposed marginal edges of said base.

146. The machine of claim 139 including receiving and stacking means downstream of said shear for receiving the processed tree, said receiving and stacking means comprising a cradle associated with said support means and including a base, and posts upstanding from said base adjacent a pair of opposed marginal edges of said base.

147. The machine according to claim 114 wherein said support is freely pivoted on said frame to pivot about a horizontal axis by means of a pair of transversely spaced apart hangers, each being pivotally secured to an A-frame assembly by means of a pin, each said hanger being provided with a collar receiving a longitudinally extending rail.

148. A method of logging in which at least two operations are performed on a tree which method comprises continuously feeding said tree along a feed path, continuously performing a first operation on said tree while it is moving along said feed path, and sequentially performing a second operation on one portion of said tree while it is moving along said path while substantially simultaneously performing said first operation on another portion of said tree.

149. The method of claim 148 including the steps of delimbing and debarking.

150. The method of claim 148 including the step of chipping.

151. The method of claim 148 including the steps of delimbing and severing into bolts of predetermined length as said tree is moved along said feed path.

152. The method of claim 148 including the steps of debarking and severing into bolts of predetermined length as said tree is moved along said feed path.

153. The method of claim 148 including the steps of delimbing, debarking and severing into bolts of predetermined length as said tree is moved along said feed path.

154. The method of claims 148 including the step of receiving and piling the processed trees.

155. A method of logging in which felled trees are subdivided into pieces of predetermined length, which process comprises: selecting a pre-felled tree from a plurality of pre-felled trees; relatively moving said tree along a feed path; removing the limbs from said tree as it is relatively moved along said feed path; sensing the diameter of said tree as it is relatively moved along said feed path; activating a shear including a pair of relatively movable knives intersecting said feed path by the relative movement of said tree along said feed path; severing said tree by said knives as said tree is relatively moved along said feed path; and returning said knives to an unactivated position in which the vertical spacing between said knives is dependent upon the diameter of the tree sensed and said actuation being controlled by said switches.

156. The method of claim 155 wherein said tree is moved along said feed path.

157. The method of claim 156 wherein said shear is activated by actuation of a switch by said tree.

158. The method of claim 157 wherein said sensing switches control opening of said knives to maximum spacing.

159. The method of claim 157 wherein said sensing switches control opening of said knives to an intermediate spacing.

160. The method of claim 155 wherein said tree is moved along said feed path, and wherein said sensing switches activate actuation of said knives according to a predetermined time sequence.

161. A method of tree processing which comprises feeding a tree to be processed to a processing unit by a tree engaging means along an axis coincident with the longitudinal axis of said tree processing unit while guiding said tree engaging means along an axis parallel to said longitudinal axis thereby aligning said tree to be processed.

162. The method of claim 161 wherein the processing step to be carried out comprises delimbing said tree.

163. A machine for delimbing and debarking felled trees, said machine comprising a tractor; extendible boom means on said tractor; means for extending said boom outwardly from said tractor for engaging a selected pre-felled tree from a plurality of pre-felled trees and for lifting the selected tree and feeding said lifted tree along an elevated feed path to said tractor; delimbing and debarking means on said tractor along said feed path for removing the limbs and bark from said tree; means for actuating said engaging and feed means and said delimbing and debarking means for selectively feeding said pre-felled tree into said delimbing and debarking means to remove the limbs and bark therefrom.

164. A machine for delimbing and debarking felled trees, said machine comprising, a tractor, an extendible and retractable boom mounted on said tractor; means for extending said boom outwardly from said tractor and for retracting said boom inwardly toward said tractor; means on said boom for engaging a selected pre-felled tree from a plurality of such pre-felled trees; delimbing means on a said tractor; debarking means on said tractor; means for raising and lowering the tree engaging means thereon, said boom and said means for engaging a pre-felled tree being selectively operative as said boom is retracted to feed said pre-felled tree into said delimbing means; means for receiving the delimbed tree from said delimber and for feeding the delimbed tree into said debarker, and means for removing the delimbed and debarked tree from said debarker.

165. A machine for delimbing, debarking and cutting felled trees, said machine comprising a tractor, an extendible and retractable boom on said tractor; means on said boom for extending said boom outwardly away from said tractor and for retracting said boom inwardly toward said tractor; a grapple on said boom, a delimber on said tractor, a debarker on said tractor and means on said tractor for cutting a felled tree into pre-selected lengths, said boom being operative to engage said grapple on the trunk of a selected pre-felled tree from a plurality of such pre-felled trees and to feed said tree toward said tractor and into said delimber; means for receiving the delimbed tree from said delimber and for feeding the delimbed tree to said debarker and means for receiving the delimbed and debarked tree from said debarker and feeding said delimbed and debarked tree to said cutting means.

166. A machine for delimbing and debarking felled trees and for cutting a delimbed and debarked tree into lengths, said machine comprising a support, an extendible and retractable boom mounted on said support for limited pivotal movement about a horizontal axis, means for extending said boom for moving said grapple outwardly away from said tractor and for retracting said boom for moving said grapple inwardly toward said tractor, a grapple fixed to one end of said boom; adjustable jaws on said grapple; means for opening and closing said adjustable jaws for selectively engaging a pre-felled tree from a plurality of pre-felled trees, means for lowering the grapple end of said boom by pivoting said boom about said horizontal axis for positioning said grapple for engagement with the selected pre-felled tree and for raising the grapple end of said boom for lifting said selected pre-felled tree, delimbing means, debarking means and knife means; mounting means for mounting said delimbing means, said debarking means and said knife means in tandem alignment along a linear path and means for feeding said pre-felled tree engaged and fed to said tractor by said boom and said adjustable jaws along said linear path through said delimbing means, said debarking means and said knife means.

167. In a machine as recited in claim 166, said boom comprising a first member pivotally mounted on said support, a plurality of members telescoped within said first member, guide means on said first member and said plurality of members telescoped therein for supporting and guiding said plurality of members for movement into and out of said first member and means interconnecting said first member and said plurality of members for extending said plurality of members outward from said first member to lengthen said boom and for moving said members inward to shorten said boom.

168. A machine for delimbing and debarking felled trees and for cutting a delimbed and debarked tree into lengths, said machine comprising a frame, a support mounted on said frame, a boom mounted for pivotal movement about a horizontal axis on said support, a grapple affixed to one end of said boom, means for pivoting said boom about its horizontal axis to raise and lower the grapple end of said boom, adjustable jaws on said grapple, means for opening and closing said adjustable jaws, delimbing means, debarking means, a cut-off knife means, means for mounting said delimbing means, said debarking means and said cut-off knife means in tandem axial alignment along a horizontal path, means connecting said mounting means to said support for pivotal movement about a horizontal axis thereon, a first feed means mounted on said mounting means between said delimbing means and said debarking means for feeding a tree being processed along a feed path in axial alignment therewith, a second feed means mounted on said mounting means between said debarker and said cut-off knife to continue feeding said tree being processed along said path, and means for selectively operating said boom, said adjustable jaws, said delimbing means, said debarking means, said first and second feed means and said cut-off knife to process a felled tree by feeding the felled tree engaged by said grapple sequentially into said delimbing means, said debarking means and said cut-off knife which respectively remove the limbs and the bark from said tree and cut the delimbed and debarked tree into logs of pre-selected length.

169. In a machine as recited in claim 167, said second feed means including a feed roll adapted to engage a tree fed through said delimber and means on said feed roll for operating said cut-off knife after a preset length of tree has been fed through said feed roll.

170. In a machine for processing a felled tree in situ in a forest, support means, means connected to said support means for delimbing a tree fed therethrough, means for debarking a tree connected to said support means on the outfeed side of said delimbing means, cutting means for cutting a tree fed through said delimbing and debarking means into bolts of predetermined length, means movably connecting said cutting means to said support means on the outfeed side of said debarking means so that said cutting means is free to move in the direction of feed of a tree engaged thereby, means for feeding a tree through said delimbing, debarking and cutting means along a substantially linear feed path, and means pivotally supporting said support means for limited vertical rotation about a horizontal axis transverse to said feed path.

171. In a machine for processing a felled tree in situ in a forest, support means, means connected to said support means for delimbing a tree fed therethrough, means for debarking a tree connected to said support means on the outfeed side of said delimbing means, cutting means for cutting a tree fed through said delimbing and debarking means into bolts of predetermined length, means movably connecting said cutting means to said support means on the outfeed side of said debarking means so that said cutting means is free to move in the direction of feed of a tree engaged thereby, means for feeding a tree through said delimbing, debarking and cutting means along a substantially linear feed path, means pivotally supporting said support means for limited vertical rotation about a horizontal axis transverse to said feed path, and means for restricting rotation of said support means about said horizontal transverse axis at the time when said cutting means severs a bolt from said tree.

172. A machine for delimbing and debarking felled trees and for cutting a delimbed and debarked tree into lengths, said machine comprising a tractor, a frame mounted for rotation about a vertical axis on said tractor, a boom mounted on said frame for limited pivotal movement about a horizontal axis, a grapple fixed to one end of said boom, adjustable jaws on said grapple, means for opening and closing said adjustable jaws, means for lowering and raising the grapple end of said boom by pivoting said boom about said horizontal axis, delimbing means, debarking means and a cut-off knife, mounting means for mounting said delimbing means, said debarking means and said cut-off knife on said frame, a first feeding means between said delimber means and said debarker means, a second feed means between said debarker means and said cut-off knife, means for mounting said cut-off knife for axial movement with respect to said delimber and said debarker, a guide between said grapple and said delimber, means for adjusting said guide, means for receiving and stacking tree sections from said cut-off knife, and means for selectively operating said boom, said grapple jaws, said guide, said delimber, said debarker and said cut-off knife, whereby a felled tree engaged by said grapple is fed by said boom into said delimber and from said delimber into said debarker and said cut-off knife to remove the limbs and bark from said tree and to cut the delimbed and debarked tree into logs of pre-selected length.

173. A machine for delimbing and debarking felled trees, said machine comprising a tractor, extendible boom means on said tractor and having an article gripping member on the end thereof, means for extending said boom outwardly from said tractor for engaging a selected pre-felled tree from a plurality of pre-felled trees by said article engaging member and for lifting at least a portion of the selected tree, means for retracting said boom for feeding said tree along a feed path toward said tractor, delimbing and debarking means on said tractor located in said feed path for removing in sequence respectively the limbs and bark from said tree, means for actuating said delimbing and debarking means, means for retracting said boom and selectively feeding said pre-felled tree into said delimbing and debarking means to remove the limbs and bark therefrom.

174. A machine for processing felled trees, said machine comprising a frame, extendible and retractable boom means mounted on said frame and having an article engaging member thereon, means for extending said boom outwardly from said frame to engage a selected pre-felled tree from a plurality of pre-felled trees by said article engaging member and for lifting at least a portion of the selected tree and feeding said selected tree along a feed path, at least one processing unit for delimbing, or debarking or chipping mounted on said frame and located on said feed path respectively for removing the limbs, or bark or severing said selected tree, means for actuating said delimbing, or debarking, or chipping means, and means feeding said selected tree into said delimbing, or debarking, or chipping means.

175. A machine for processing felled trees as defined in claim 1 wherein said frame is supported upon a self-propelled mobile unit.

176. A machine as defined in claim 175 wherein the frame supporting the processing units is pivotally mounted on the self-propelled mobile unit and selectively pivotable about a vertical axis.

177. A machine as defined in claim 58 wherein said frame is supported upon a self-propelled mobile unit.

178. A machine as defined in claim 77 wherein said processing unit includes the combination of a delimber, a set of feed rolls and a debarker disposed respectively in axial alignment on the feed path, said delimber being located upstream of said debarker.

179. A machine as defined in claim 178 wherein said delimber is of the type including a plurality of cutter heads engageable with said tree to delimb said tree and mounted on respective ones of members disposed circumferentially about said tree, said members being rotatable about an axis substantially coincident with the longitudinal axis of said tree, said debarker being of the type including a plurality of tools engageable with said tree to remove said bark by scraping action or cambium fracture, said tool members being mounted on a member circumferentially about said tree, said member being rotatable about an axis substantially coincident with the longitudinal axis of said tree and said feed rolls being of the type including a plurality of driven rollers each having a circumferential surface grippingly engaging said tree, at least one of said rollers being biased inwardly toward said tree, said rollers being disposed about the periphery of said tree whereby said rollers clampingly engage said tree therebetween.

180. A machine as defined in claim 77 wherein said processing unit includes the combination of a delimber, a first set of feed rolls, a debarker, a second set of feed rolls, and a shear, said processing unit being disposed in axial alignment one after the other in the direction of a tree being fed along said feed path.

181. The machine of claim 76 including receiving and stacking means disposed downstream of said processing units for receiving the processed tree, said receiving and stacking means comprising a cradle associated with said frame and including support means and means for elevating and lowering said cradle with respect to said support means.

182. A machine as defined in claim 181 wherein the base of said cradle is movable for unloading trees received and stacked therein.

183. A machine as defined in claim 181 wherein said cradle includes a trap door in the base thereof and movable from a closed to an open position for release of the processed trees stacked in said cradle.

184. A machine as defined in claim 181 wherein said frame is supported upon a self-propelled mobile unit.

185. A machine as defined in claim 146 wherein said frame is supported upon a self-propelled mobile unit.

186. A machine as defined in claim 12 wherein said processing unit is pivotally mounted on said frame to pivot about a substantially horizontal axis disposed transverse to said feed path.

187. A machine as defined in claim 13 wherein said processing unit is pivotally mounted on said frame to pivot about a substantially horizontal axis disposed transverse to said feed path.

188. A machine as defined in claim 183 wherein said cradle is moved vertically during processing operation whereby the logs stacked therein are continually maintained at a level slightly below that of logs being fed from the processing machine into the cradle.

189. A machine as defined in claim 77 including additional means disposed downstream of said processing units for removing the processed tree from said machine.

190. A machine as defined in claim 189 wherein said additional means comprises a speed-up roll journalled on said machine and having the surface thereof disposed for rolling contact with the processed tree, said speed-up roll being driven and having said surface tractively engaging the processed tree.

191. A machine as defined in claim 190 wherein said speed-up roll is driven at a peripheral speed substantially the same as that of said feed rolls, and wherein the surface of said speed-up roll consists of a plurality of substantially radially directed projections engaging the surface of said processed tree.

192. A machine as defined in claim 12 wherein said frame is supported upon a self-propelled mobile unit.

193. A machine as defined in claim 192 wherein said frame is pivotally mounted and selectively pivotable about a vertical axis.

194. A machine as defined in claim 26 wherein said frame is supported upon a self-propelled mobile unit.

195. A machine as defined in claim 194 wherein said frame is pivotally mounted upon said self-propelled unit and selectively pivotable about a vertical axis.

196. A machine as defined in claim 46 wherein said frame is supported upon a self-propelled mobile unit.

197. A machine as defined in claim 196 wherein said frame supporting the processing units is pivotally mounted upon said self-propelled mobile unit and selectively pivotable about a vertical axis.

198. A machine as defined in claim 49 wherein said frame is supported upon a self-propelled mobile unit.

199. A machine as defined in claim 198 wherein said frame is pivotally mounted upon the self-propelled unit and selectively pivotable about a vertical axis.

200. A machine as defined in claim 59 wherein said frame is supported upon a self-propelled mobile unit.

201. A machine as defined in claim 200 wherein said frame is pivotally mounted upon the self-propelled unit and selectively pivotable about a vertical axis.

202. A machine as defined in claim 201 wherein the sub-frame assembly is freely pivoted on the frame so as to pivot about a substantially horizontal axis disposed transverse to the feed path.

203. A machine as defined in claim 72 wherein the frame is pivotally mounted upon a self-propelled mobile unit, said frame being selectively pivotable about a vertical axis.

204. A machine as defined in claim 73 wherein the frame supporting the processing units is pivotally mounted upon a self-propelled mobile unit, said frame being selectively pivotable about a vertical axis.

205. A machine as defined in claim 86 wherein said frame is supported upon a self-propelled mobile unit.

206. A machine as defined in claim 205 wherein said frame is pivotally mounted upon said self-propelled mobile unit, said frame being selectively pivotable about a substantially vertical axis.

207. A machine as defined in claim 88 wherein said frame is pivotally mounted upon a self-propelled mobile unit, said frame being selectively pivotable about a substantially vertical axis.

208. A machine as defined in claim 103 wherein said frame is pivotally mounted upon a self-propelled mobile tractor unit, said frame being selectively pivotable about a substantially vertical axis.

209. A machine as defined in claim 114 wherein said frame is supported upon a self-propelled mobile unit.

210. A machine as defined in claim 209 wherein said frame is pivotally mounted on the self-propelled unit and selectively pivotable about a vertical axis.

211. A machine as defined in claim 124 wherein said frame is mounted upon a self-propelled mobile tractor unit.

212. A machine as defined in claim 137 wherein said frame is pivotally mounted upon a self-propelled mobile tractor unit, said frame being selectively pivotable about a substantially vertical axis.

213. A machine as defined in claim 140 wherein said frame is mounted upon a self-propelled mobile tractor unit.

214. A machine as defined in claim 174 wherein said frame is mounted upon a self-propelled mobile unit.

215. A machine as defined in claim 212 wherein said frame is pivotally mounted upon the self-propelled mobile unit and selectively pivotable about a vertical axis.

216. A machine for performing in sequence a series of operations on a felled tree while the tree moves continuously therethrough, said machine comprising:
 (a) a self-propelled mobile tractor unit;
 (b) a frame pivotally mounted on said tractor unit, said frame being selectively pivotable about a substantially vertical axis;
 (c) a sub-frame assembly, mounted on said frame, and freely pivotable about a substantially horizontal second axis and pivotally movable within selected limits, said sub-frame assembly including a plurality of processing units mounted thereon in alignment axially along a third generally horizontal axis disposed normal to said second axis;
 (d) a telescopic boom mounted on said frame to pivot about a horizontal axis substantially parallel to said second axis, said boom having a grapple adjacent the free end thereof and extendable and retractable in a plane substantially parallel to said third axis;
 (e) motive means for said tractor unit, said processing units and said boom; and,
 (f) means for controlling said motive means for selective operation of said tractor unit, said processing units and said boom.

217. A machine as defined in claim 216 wherein said motive means comprises hydraulic motors driven by hydraulic pumps and said control means consists of a plurality of valves controlling fluid from said pump to said motors.

218. A processing machine as defined in claim 217 wherein said processing units include in combination; a delimber, a first set of feed rolls, a debarker, a second set of feed rolls, a shear and receiving and stacking means, said processing units being in alignment in a direction of the path of travel of a tree being fed through the processing units and the shear being mounted to move along with the tree whereby it may be severed while the tree moves continuously through the processing units.

219. A processing machine as defined in claim 216 wherein said tractor is a crawler type of unit.

220. The method as defined in claim 149 including the step of receiving and piling the processed trees.

221. The method as defined in claim 151 including the step of receiving and piling said processed trees.

222. The method as defined in claim 152 including the step of receiving and piling said processed trees.

223. The method as defined in claim 153 including the step of receiving and piling said processed trees.

224. The method as defined in claim 161 wherein the processing step to be carried out comprises delimbing and debarking said tree.

225. The method as defined in claim 161 wherein the processing step to be carried out comprises delimbing and severing said tree.

226. The method as defined in claim 161 wherein the processing step to be carried out comprises delimbing, debarking and severing said tree.

227. A method of processing trees comprising:
(a) positioning a processing plant and a concentration of full trees in a selected relative position with respect to one another;
(b) extending a boom and grapple outwardly from said processing plant;
(c) selecting and grasping an individual tree in said concentration of trees;
(d) retracting said boom and grapple along with the tree along a selected path in a direction toward the processing plant;
(e) introducing the tree to a processing unit of said plant; and
(f) processing said tree.

228. A method as defined in claim 227 wherein said processing plant is mounted on a mobile vehicle and said relative position of the plant and felled trees is effected by maneuvering said vehicle relative to the trees.

229. A method as defined in claim 228 further including the step of discharging the processed trees and debris at a position out of the path of travel of further movement of the processing plant relative to the trees.

References Cited

UNITED STATES PATENTS

| | | | |
|---|---|---|---|
| Re. 23,934 | 2/1955 | Rees | 214—147 |
| 2,635,659 | 4/1953 | Gerdine | 144—309 |
| 2,825,405 | 3/1958 | Maas | 83—623 |
| 2,843,165 | 7/1958 | Sherron | 144—3 |
| 2,845,101 | 7/1958 | Hoadley | 144—34 |
| 2,882,941 | 4/1959 | Pope | 144—3 X |
| 2,921,701 | 1/1960 | Ireland | 214—147 |
| 2,955,631 | 10/1960 | Hoadley | 144—34 |
| 3,029,848 | 4/1962 | Bombardier | 144—3 |
| 3,030,986 | 4/1962 | Longert | 144—2 |
| 3,059,677 | 10/1962 | Busch et al. | 144—309 |
| 3,066,566 | 12/1962 | Bottenhorn | 83—623 |
| 3,067,885 | 12/1962 | Kohler | 214—8.5 |
| 3,070,241 | 12/1962 | Johnston | 214—8.5 |
| 3,074,446 | 1/1963 | Earl | 144—3 |
| 3,183,949 | 5/1965 | Larson | 144—2 |
| 3,196,911 | 7/1965 | Busch et al. | 144—34 |

WILLIAM W. DYER, JR., *Primary Examiner.*

W. D. BRAY, *Assistant Examiner.*